US010349700B2

(12) United States Patent
Amis et al.

(10) Patent No.: US 10,349,700 B2
(45) Date of Patent: Jul. 16, 2019

(54) COMPOSITE PLATE FOR AN ARTICLE OF FOOTWEAR OR EQUIPMENT

(71) Applicant: NIKE, Inc., Beaverton, OR (US)

(72) Inventors: Sam Amis, Portland, OR (US); Aaron Bartel, Beaverton, OR (US); Stefan E. Guest, Portland, OR (US); Sam Lacey, Beaverton, OR (US); William C. McFarland, II, Portland, OR (US); Christian Alexander Steinbeck, Portland, OR (US); Yoav Sterman, Portland, OR (US); Adam Thuss, Portland, OR (US); Todd A. Waatti, Battle Ground, WA (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/574,933

(22) PCT Filed: Jul. 20, 2017

(86) PCT No.: PCT/US2017/043167
§ 371 (c)(1),
(2) Date: Nov. 17, 2017

(87) PCT Pub. No.: WO2018/017890
PCT Pub. Date: Jan. 25, 2018

(65) Prior Publication Data
US 2019/0059510 A1 Feb. 28, 2019

Related U.S. Application Data

(60) Provisional application No. 62/474,030, filed on Mar. 20, 2017, provisional application No. 62/364,585, (Continued)

(51) Int. Cl.
A43B 13/04 (2006.01)
A43B 13/02 (2006.01)
(Continued)

(52) U.S. Cl.
CPC .............. *A43B 13/026* (2013.01); *A42B 1/00* (2013.01); *A42B 3/06* (2013.01); *A43B 5/02* (2013.01);
(Continued)

(58) Field of Classification Search
CPC ......... A43B 13/026; A43B 13/04; A43B 5/02; A43C 15/02; A43C 15/161; B29D 35/122; B29D 35/124; B29D 35/126
See application file for complete search history.

(56) References Cited

U.S. PATENT DOCUMENTS 2,391,564 A * 12/1945 Gregg ................... A43B 13/12
12/146 B
5,142,797 A 9/1992 Cole, III
(Continued)

FOREIGN PATENT DOCUMENTS

DE 2736974 A1 3/1979
EP 0931470 A2 7/1999
(Continued)

OTHER PUBLICATIONS

European Patent Office as the International Searching Authority, International Search Report and Written Opinion for Application No. PCT/US2016/030759, dated Jul. 12, 2016.
(Continued)

Primary Examiner — Ted Kavanaugh
(74) Attorney, Agent, or Firm — Honigman LLP; Matthew H. Szalach; Jonathan P. O'Brien

(57) ABSTRACT

A method for forming a plate includes attaching a first strand portion to a flexible substrate to form a first layer on the substrate and positioning a second strand portion on the first layer to form a second layer on the first layer in a plurality of discrete regions on the substrate. The method also includes positioning a plurality of traction elements into
(Continued)

corresponding cavities formed into a first mold surface and positioning the substrate on the first mold surface to change a shape of the substrate. At least one of heat and pressure is applied to the first strand portion, the second strand portion, the substrate, and the traction elements to conform the substrate to the shape of the first mold surface and form the traction elements into the substrate at each of the discrete regions. The method also includes incorporating the substrate into an article of footwear.

15 Claims, 38 Drawing Sheets

Related U.S. Application Data filed on Jul. 20, 2016, provisional application No. 62/364,594, filed on Jul. 20, 2016.

(51) Int. Cl.

| | | |
|---|---|---|
| A43C 15/02 | (2006.01) | |
| A43C 15/16 | (2006.01) | |
| A43B 5/02 | (2006.01) | |
| A42B 1/00 | (2006.01) | |
| A42B 3/06 | (2006.01) | |
| D05C 17/00 | (2006.01) | |
| A63B 71/12 | (2006.01) | |
| B29D 35/12 | (2010.01) | |

(52) U.S. Cl.
CPC .............. *A43B 13/04* (2013.01); *A43C 15/02* (2013.01); *A43C 15/161* (2013.01); *A63B 71/1225* (2013.01); *B29D 35/122* (2013.01); *B29D 35/126* (2013.01); *D05C 17/00* (2013.01); *A63B 2071/125* (2013.01); *A63B 2071/1241* (2013.01); *A63B 2071/1258* (2013.01)

(56) References Cited

U.S. PATENT DOCUMENTS

| | | | |
|---|---|---|---|
| 5,918,338 | A | 7/1999 | Wong |
| 6,199,303 | B1 | 3/2001 | Luthi et al. |
| 7,062,865 | B1 | 6/2006 | Nordt, III |
| 7,401,422 | B1 | 7/2008 | Scholz et al. |
| 2002/0152642 | A1 | 10/2002 | Chu |
| 2002/0178615 | A1 | 12/2002 | Saillet et al. |
| 2003/0051372 | A1 | 3/2003 | Lyden |
| 2003/0069807 | A1 | 4/2003 | Lyden |
| 2003/0121179 | A1* | 7/2003 | Chen ...................... A43B 13/04 36/30 R |
| 2003/0221337 | A1 | 12/2003 | Farys et al. |
| 2004/0205983 | A1 | 10/2004 | Talbott |
| 2007/0043630 | A1 | 2/2007 | Lyden |
| 2009/0288312 | A1 | 11/2009 | Dua |
| 2011/0078923 | A1 | 4/2011 | Bartholet et al. |
| 2012/0137544 | A1 | 6/2012 | Rosa et al. |
| 2012/0266500 | A1 | 10/2012 | Cobb |
| 2012/0297641 | A1 | 11/2012 | Pfister |
| 2013/0125421 | A1 | 5/2013 | Stegmaier et al. |
| 2014/0059895 | A1 | 3/2014 | Arciuolo |
| 2014/0259462 | A1* | 9/2014 | Taylor ..................... A43B 13/20 12/146 R |
| 2015/0040428 | A1* | 2/2015 | Davis ..................... A43B 13/14 36/83 |
| 2015/0107133 | A1 | 4/2015 | Ganuza et al. |
| 2016/0206046 | A1* | 7/2016 | Cross ...................... A43B 1/04 |
| 2017/0006962 | A1* | 1/2017 | Tanabe .................. A43B 13/12 |
| 2017/0071291 | A1* | 3/2017 | Follet ........................ A43D 8/24 |
| 2017/0095033 | A1* | 4/2017 | Farina .................. A43B 13/188 |
| 2017/0095034 | A1* | 4/2017 | Dupre .................. A43B 13/141 |

FOREIGN PATENT DOCUMENTS

| | | |
|---|---|---|
| EP | 1249184 A1 | 10/2002 |
| EP | 1405577 A2 | 4/2004 |
| EP | 1857005 A1 | 11/2007 |
| EP | 1869989 A1 | 12/2007 |
| EP | 2105058 A1 | 9/2009 |
| EP | 2105058 B1 | 12/2011 |
| EP | 2462827 A2 | 6/2012 |
| EP | 3075277 A2 | 10/2016 |
| WO | WO-9101660 | 2/1991 |
| WO | WO-9421454 A1 | 9/1994 |
| WO | WO-0041544 | 7/2000 |
| WO | WO-2009069871 A1 | 6/2009 |
| WO | WO-2011043507 A1 | 4/2011 |
| WO | WO-2016179265 A1 | 11/2016 |

OTHER PUBLICATIONS

Stefanyshyn, D.J. et al., "Energy Aspects Associated with Sports Shoes," Sportverl Sportschad, vol. 14, pp. 82-89, Georg Thieme Verlag, Stuttgart, DE, 2000.

Stefanyshyn, D.J. et al., "Influence of a midsole bending stiffness on joint energy and jump height performance," Medicine & Science in Sports & Exercise, vol. 32, No. 2, pp. 471-476, American College of Sports Medicine, 2000.

Stefanyshyn, D.J. et al., "Mechanical Energy Contribution of the Metatarsophalangeal Join to Running and Sprinting," J. Biomechanics, vol. 30, Nos. 11-12, pp. 1081-1085, Elsevier Science Ltd, 1997.

Nigg, Benno M. et al., "Shoes Inserts and Orthotics for Sport and Physical Activities," Medicine & Science in Sports & Exercise, vol. 31, Issue 7, pp. S421-S428, Jul. 1999.

Roy, Jean-Pierre R. et al., "Shoes Midsole Longitudinal Bending Stiffness and Running Economy, Joint Energy, and EMG," Medicine & Science in Sports & Excercise, vol. 38, No. 3, pp. 562-569, American College of Sports Medicine, 2006.

European Patent Office as the International Searching Authority, International Search Report and Written Opinion for Application No. PCT/US2016/048859, dated Nov. 7, 2016.

European Patent Office as the International Searching Authority, International Search Report and Written Opinion for Application No. PCT/US2016/048854, dated Nov. 25, 2016.

European Patent Office as the International Searching Authority, International Search Report and Written Opinion for Application No. PCT/US2017/043170, dated Oct. 27, 2017.

European Patent Office as the International Searching Authority, International Search Report and Written Opinion for Application No. PCT/US2017/043164, dated Oct. 24, 2017.

European Patent Office as the International Searching Authority, International Search Report and Written Opinion for Application No. PCT/US2017/043160, dated Oct. 24, 2017.

European Patent Office as the International Searching Authority, International Search Report and Written Opinion for Application No. PCT/US2017/043167, dated Oct. 27, 2017.

European Patent Office (ISA), International Preliminary Report on Patentabilty for Application No. PCT/2017/043160, dated Jul. 24, 2018.

European Patent Office (ISA), International Preliminary Report on Patentabilty for Application No. PCT/2017/043164, dated Jul. 24, 2018.

European Patent Office (ISA), International Preliminary Report on Patentabilty for Application No. PCT/2017/043170, dated Jul. 24, 2018.

European Patent Office (ISA), International Preliminary Report on Patentabilty for Application No. PCT/2017/043167, dated Jul. 24, 2018.

United States Patent and Trademark Office, Office Action for U.S. Appl. No. 15/248,051, dated Dec. 10, 2018.

European Patent Office (ISA), International Preliminary Report on Patentability for International Application No. PCT/US2016/048854, dated Apr. 12, 2018.

(56) References Cited

OTHER PUBLICATIONS

European Patent Office (ISA), International Preliminary Report on Patentability for International Application No. PCT/US2016/048859, dated Apr. 12, 2018.

* cited by examiner

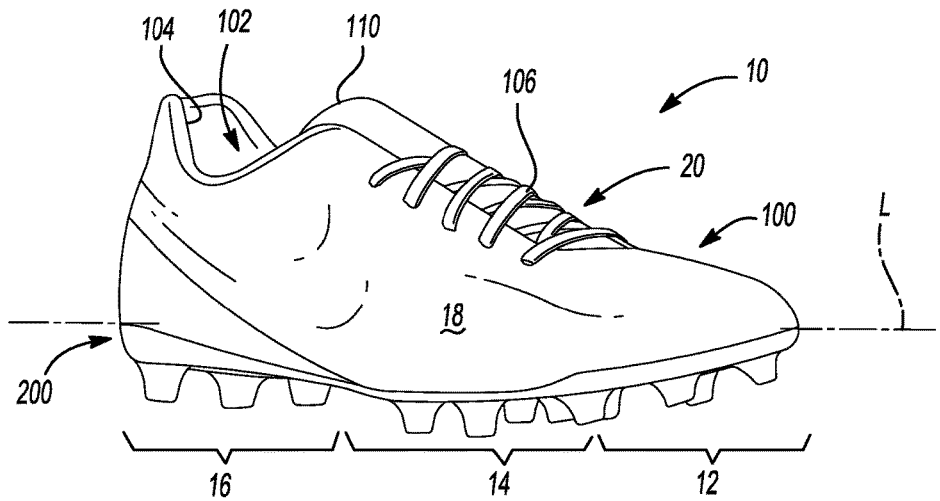
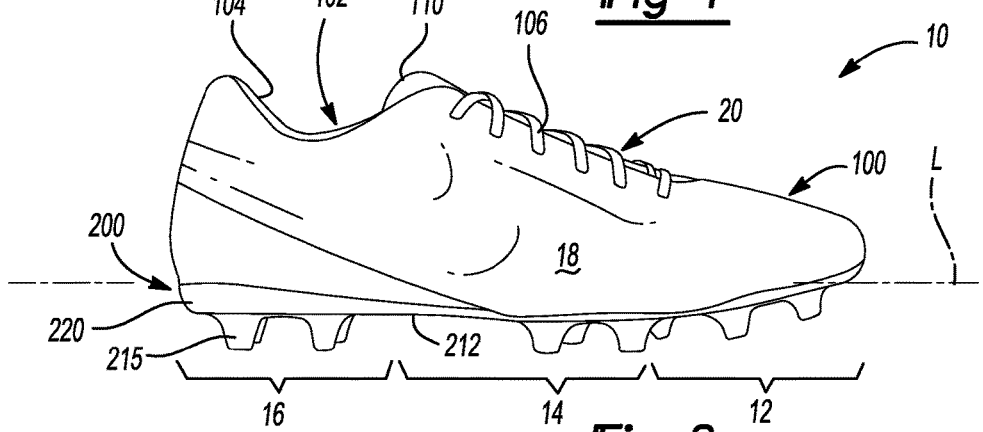
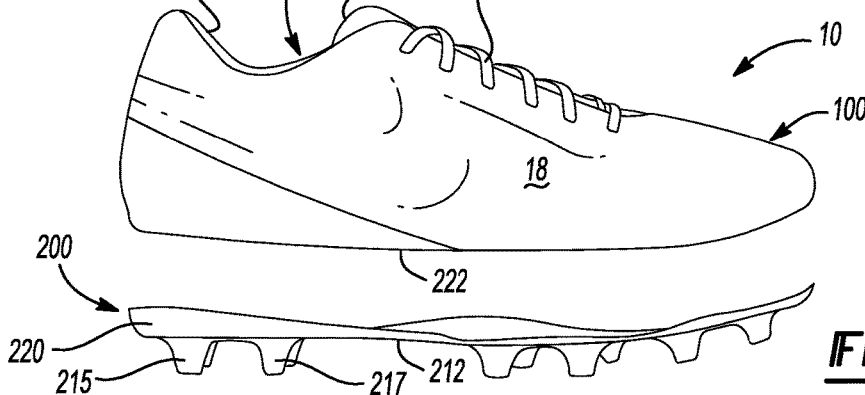

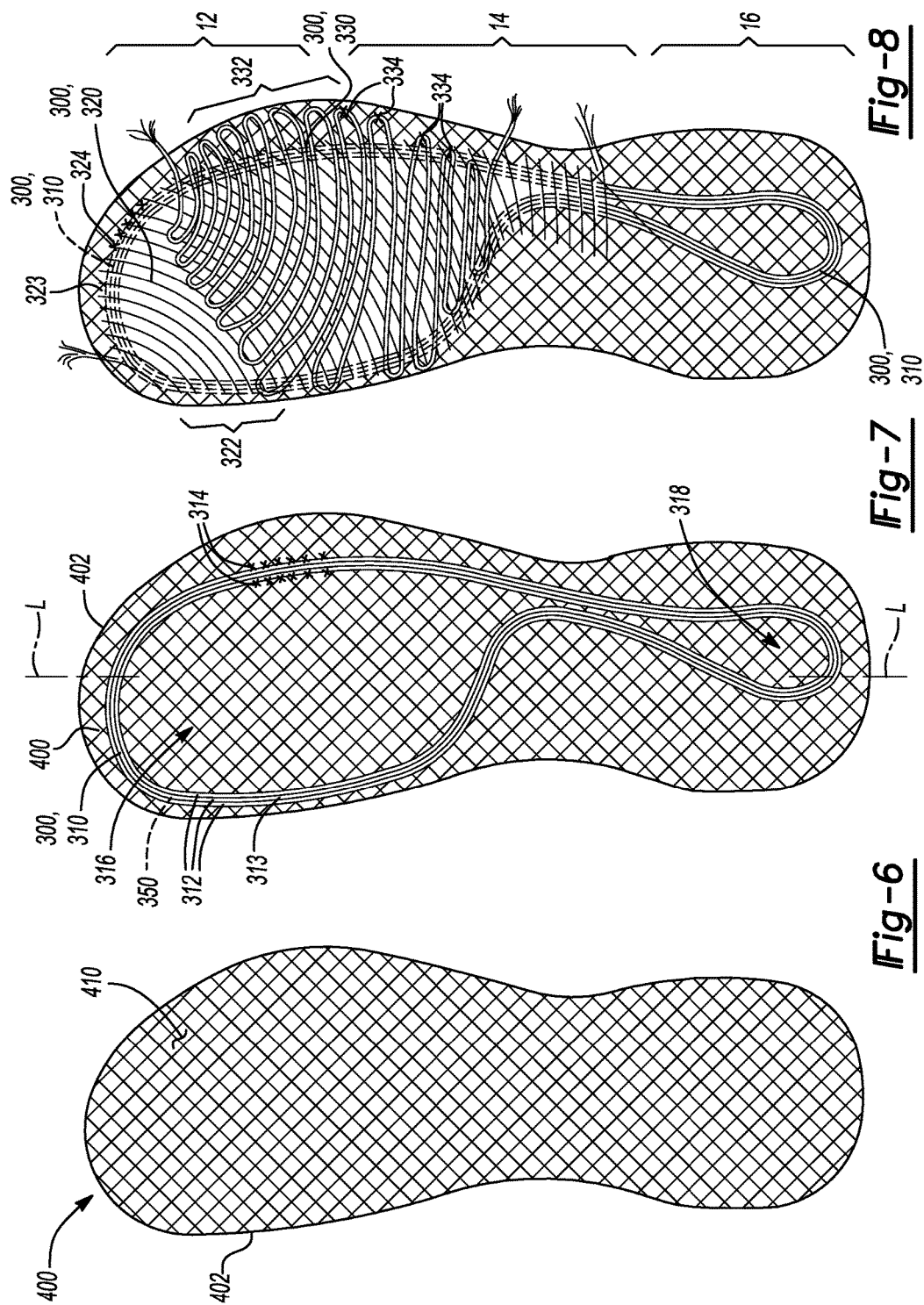

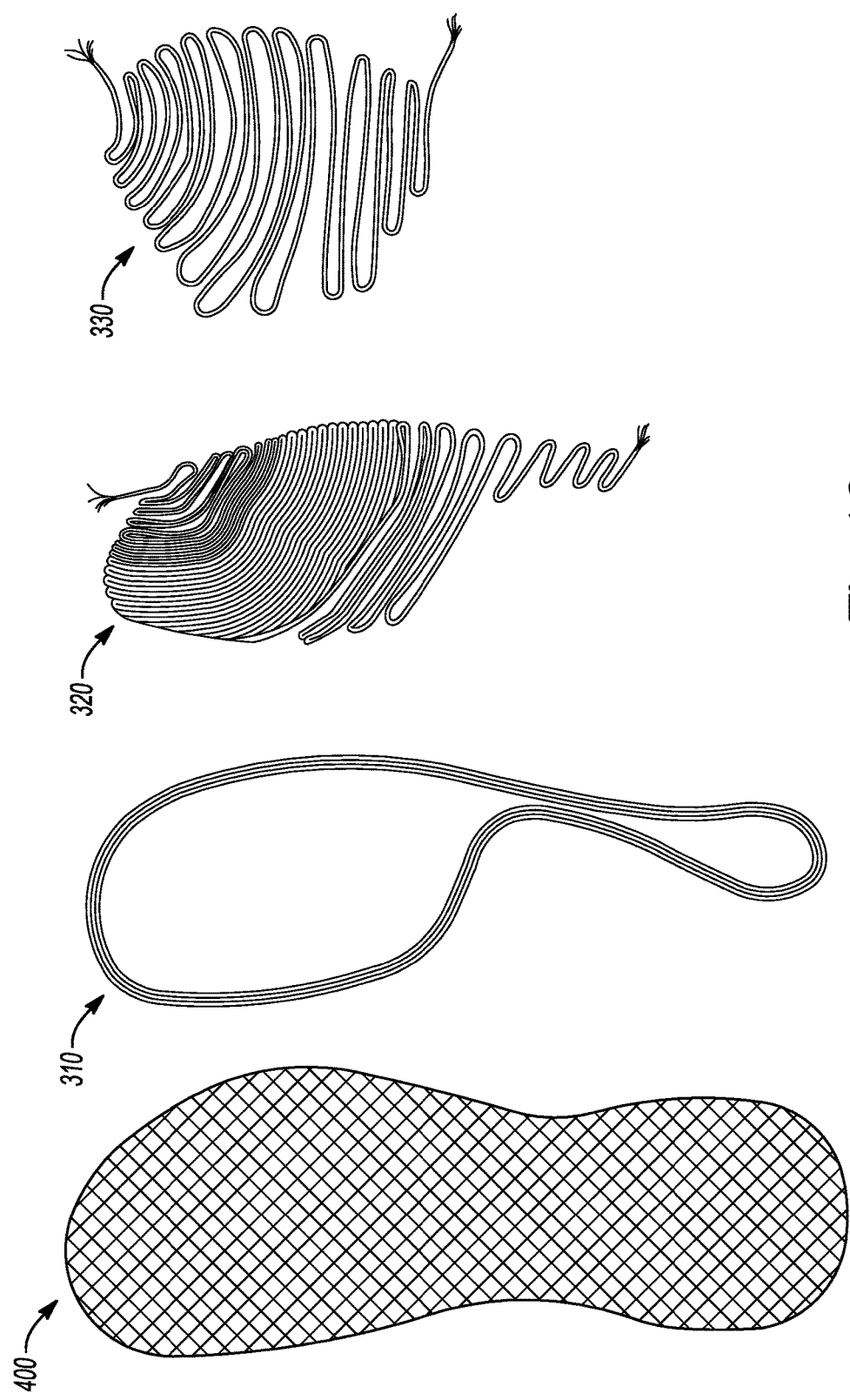

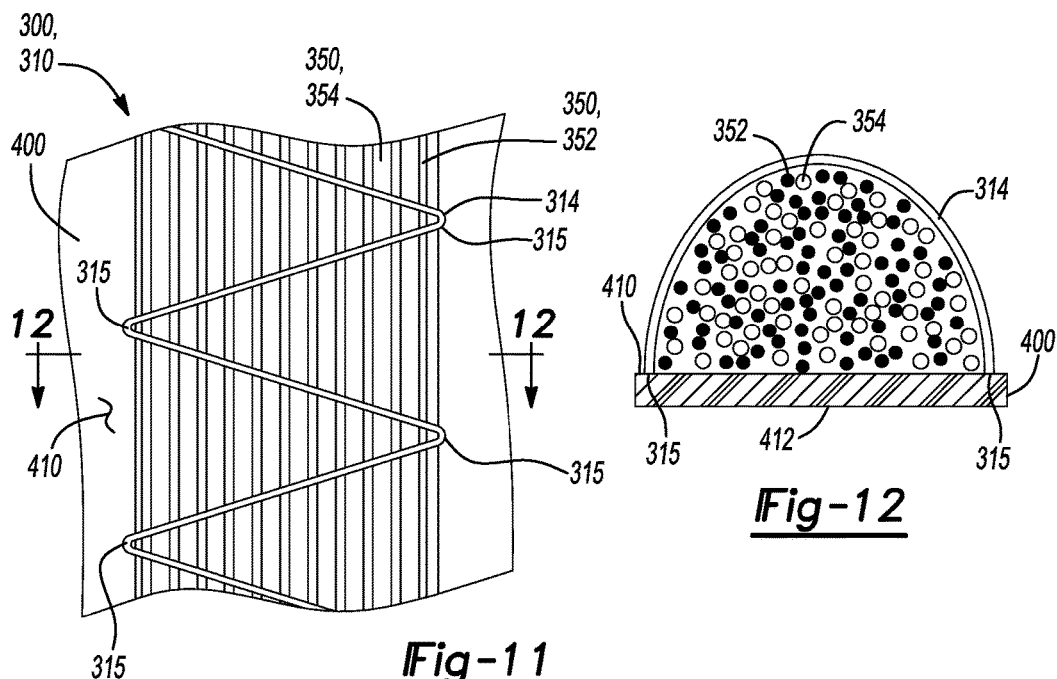
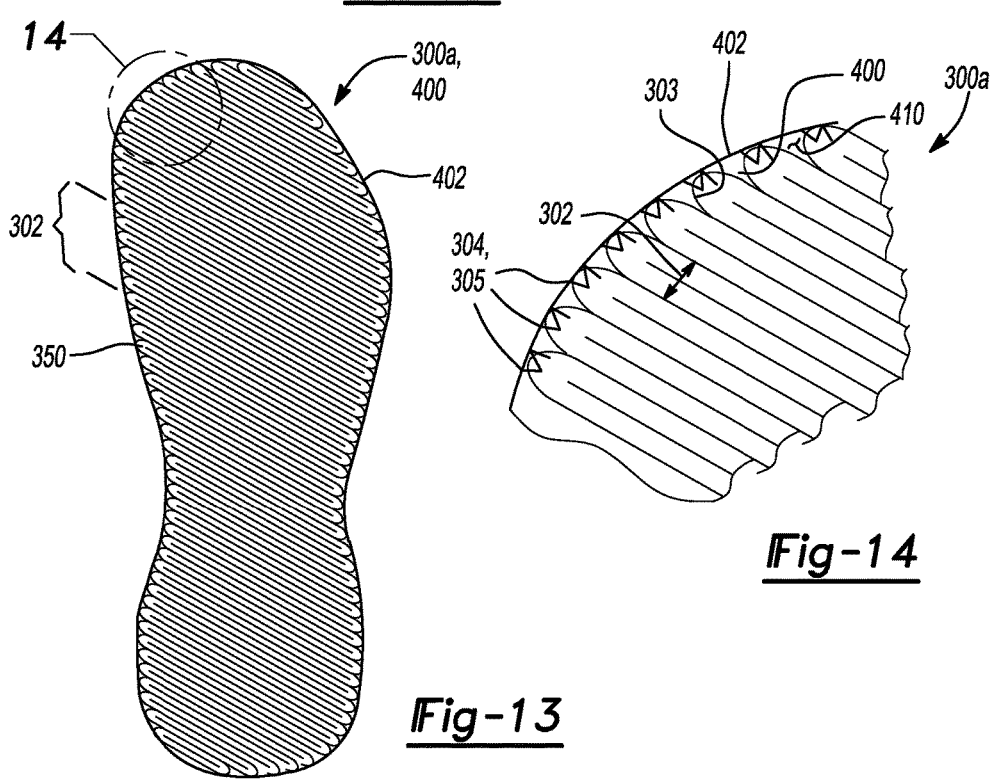

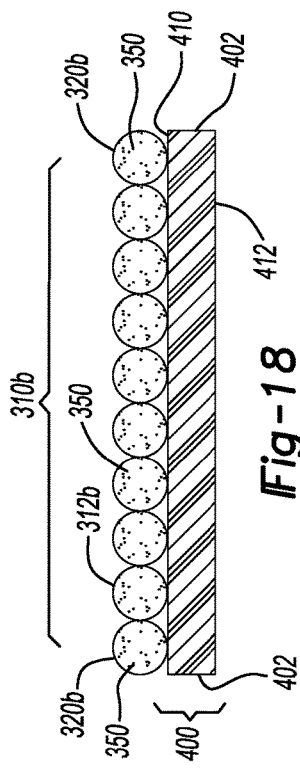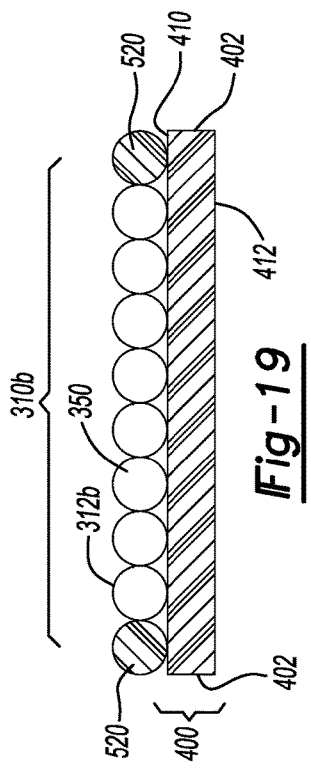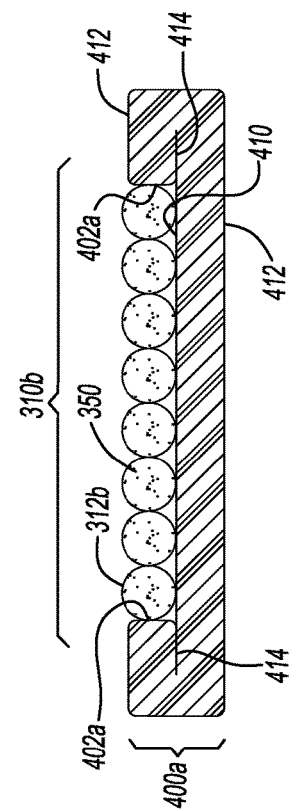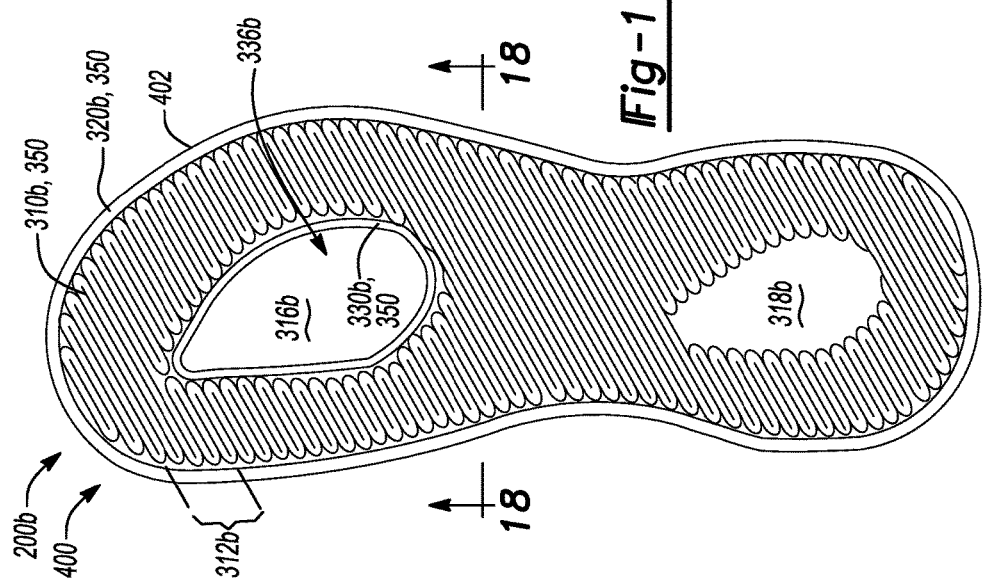

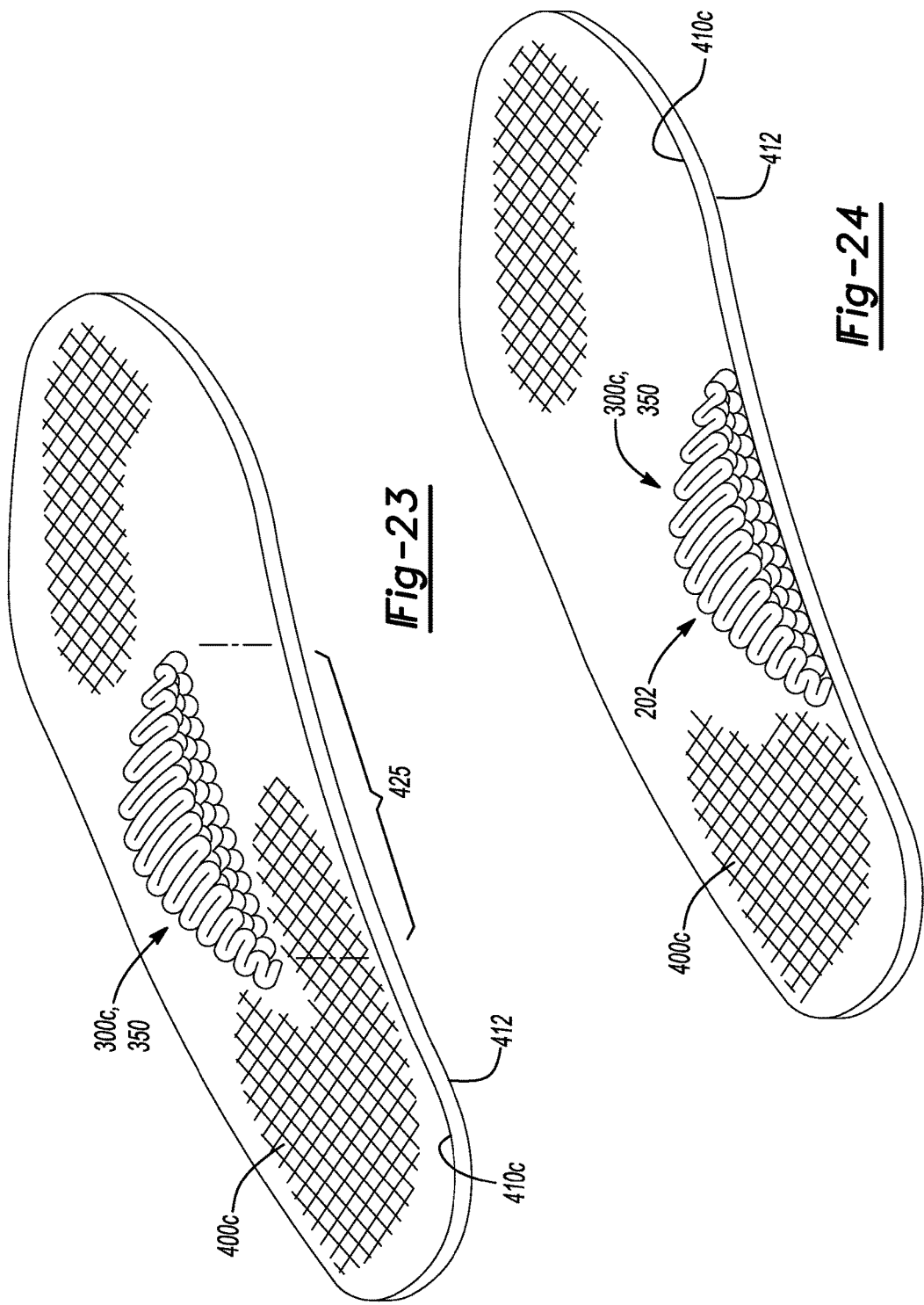

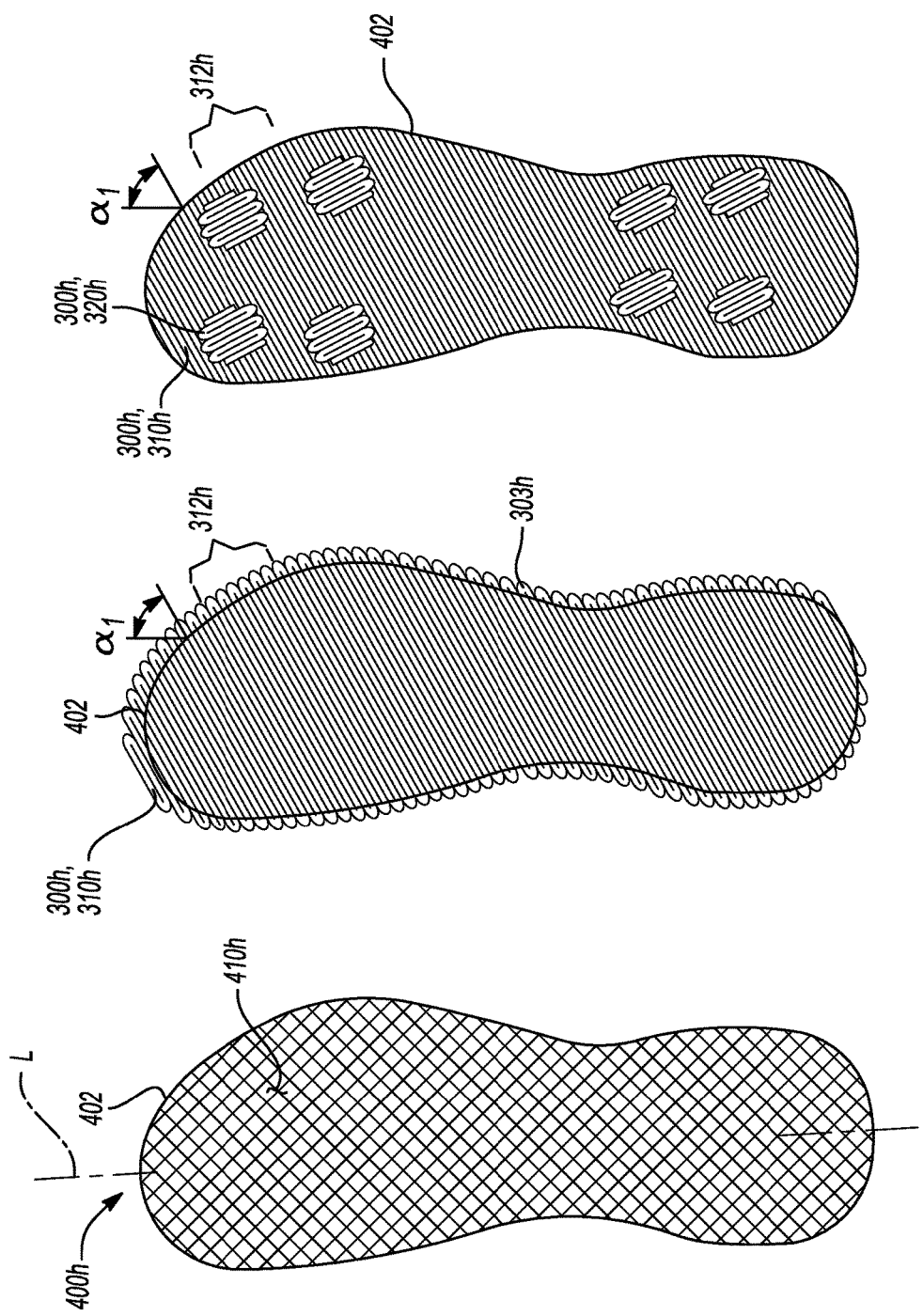

COMPOSITE PLATE FOR AN ARTICLE OF FOOTWEAR OR EQUIPMENT

CROSS REFERENCE TO RELATED APPLICATIONS

This application is the national phase of International Application No. PCT/US2017/043167, filed Jul. 20, 2017, which claims priority to U.S. Provisional Application Ser. No. 62/364,594, filed Jul. 20, 2016, to U.S. Provisional Application Ser. No. 62/364,585, filed Jul. 20, 2016, and to U.S. Provisional Application Ser. No. 62/474,030, filed Mar. 20, 2017, which are hereby incorporated by reference in their entirety.

FIELD

The present disclosure relates generally to composite plates and more particularly to a composite plate for use with equipment or an article of footwear.

BACKGROUND

This section provides background information related to the present disclosure which is not necessarily prior art.

Footwear and other athletic equipment is generally designed with an emphasis on optimizing performance without increasing the overall weight of the footwear or equipment beyond a threshold amount. For example, increasing a specific stiffness and durability of a footwear plate generally results in an increase in weight due to the additional materials required to provide the increased stiffness. Conversely, reducing the weight of the footwear generally requires reducing the materials used to form the footwear plate, thereby sacrificing the strength of the plate. In order to meet the need to increase strength and durability of footwear plates, while at the same time reducing the weight thereof, the foregoing drawbacks can be overcome using composite materials exhibiting high strength-to-weight ratios to form the footwear plate.

Generally, composite footwear plates are formed from unidirectional tapes or plates only capable of offering stiffness and load path properties that are unidirectional. While a unidirectional stiffness and load path may be suitable in one region of footwear, the same unidirectional stiffness and load path may not be suitable in other regions of the footwear. Moreover, composite footwear plates are typically formed from a substantially rigid, flat preform with a uniform thickness that is difficult to shape into a three-dimensional (e.g., non-flat) shape having a variable thickness. Accordingly, composite footwear plates are generally limited to flat surface profiles with a uniform thickness that do not conform to the surface profiles of the bottom surface of a foot. In view of the foregoing drawbacks of unidirectional tapes or plates used in the formation of composite footwear plates, such composite plates are usually only incorporated into one portion of the footwear, (e.g., one of the heel region and the forefoot region). As such, conventional footwear plates do not afford maximum support in both the heel region and the mid-foot region of the footwear and, further, cannot be tailored for the particular region of the footwear.

DRAWINGS

The drawings described herein are for illustrative purposes only of selected configurations and not all possible implementations, and are not intended to limit the scope of the present disclosure.

FIG. 1 is a perspective view of an article of footwear in accordance with principles of the present disclosure;

FIG. 2 is a side view of the article of footwear of FIG. 1;

FIG. 3 is an exploded view of the article of footwear of FIG. 1 showing an upper and a substantially rigid, three-dimensional composite footwear plate affixed to a footbed surface of the upper;

FIG. 6 is a top view of a substrate used to form a composite footwear plate for the article of footwear of FIG. 1;

FIG. 7 is a top view of a first tow of fibers attached to a top surface of the substrate of FIG. 1 to form a first layer on the substrate;

FIG. 8 is a top view of an embroidered preform including first, second, and third tows of fibers attached to the top surface of the substrate of FIG. 1 to form corresponding first, second, and third layers on the substrate;

Figure 15:
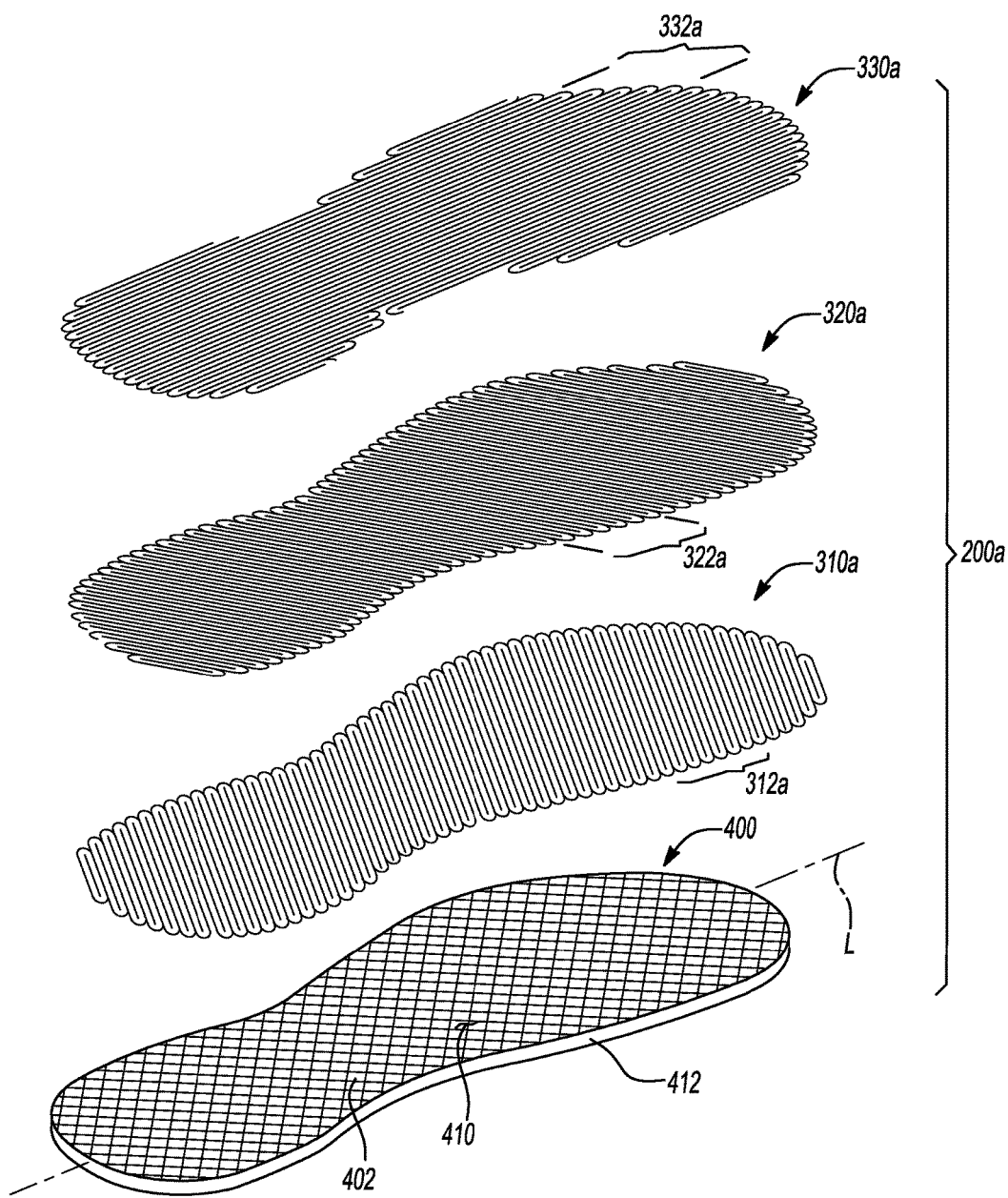
Figure 16:
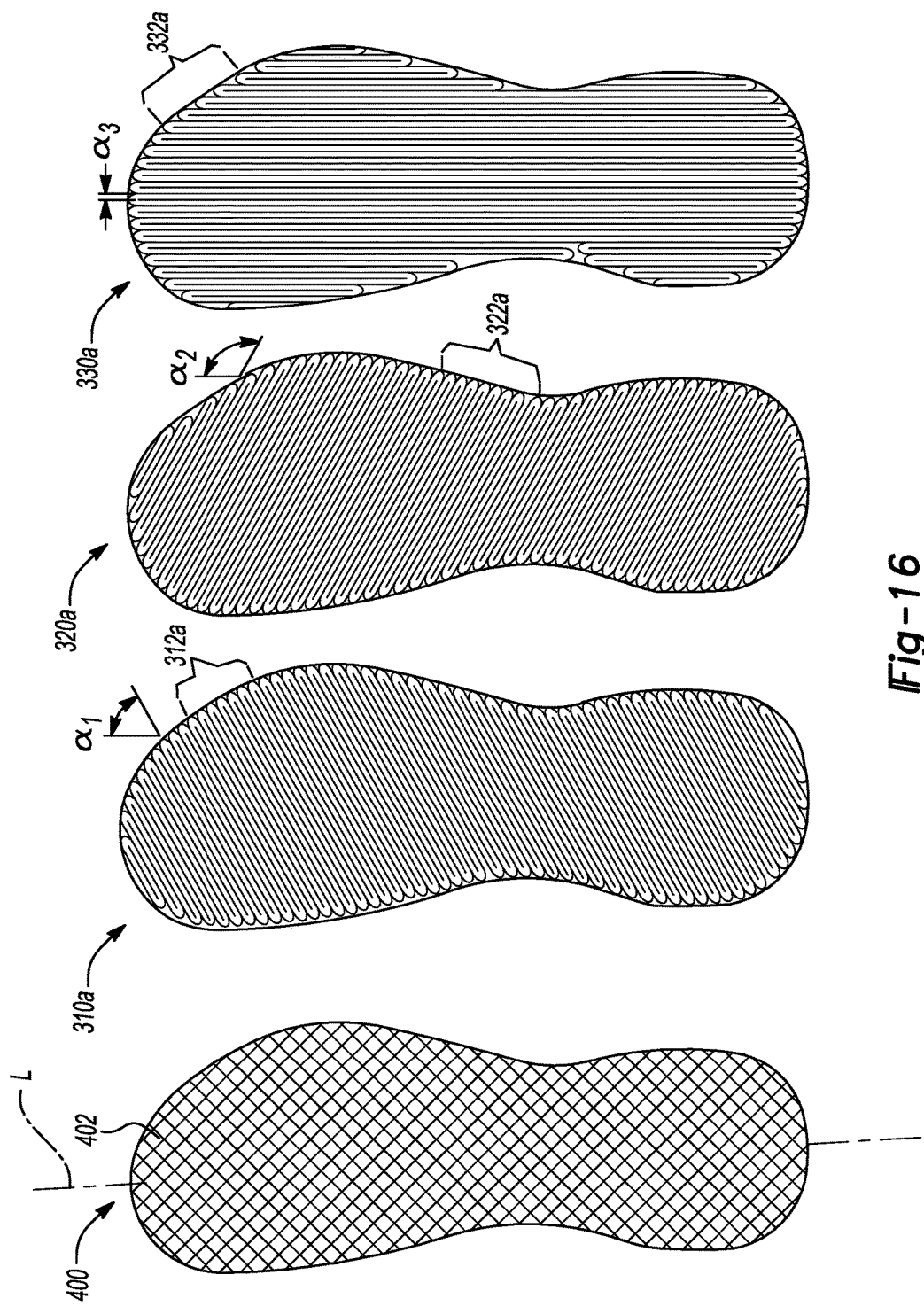
Figure 21:
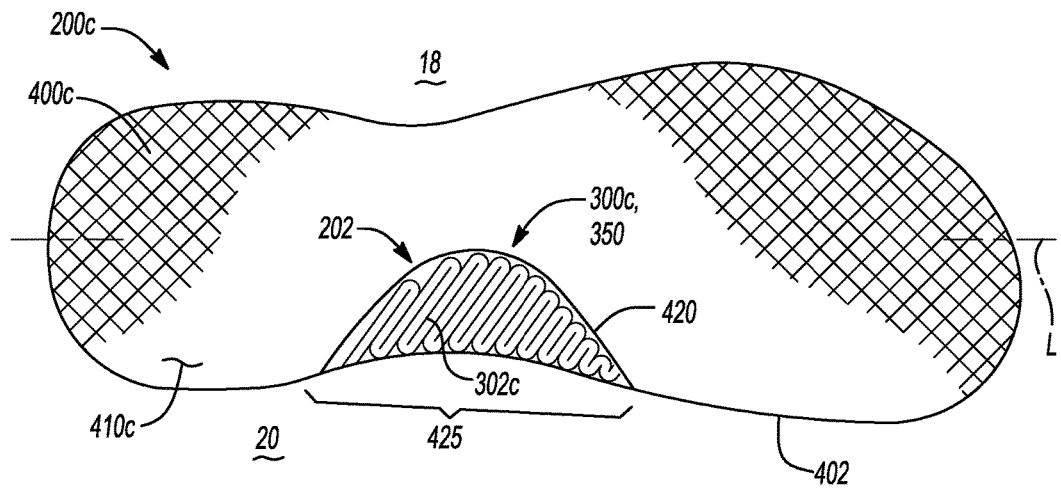
Figure 22:
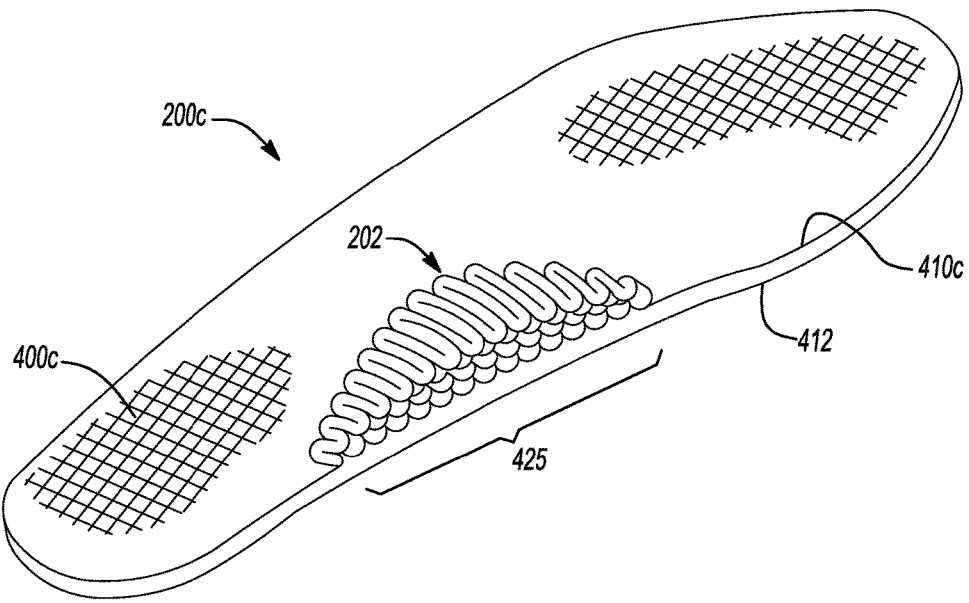
Figure 25:
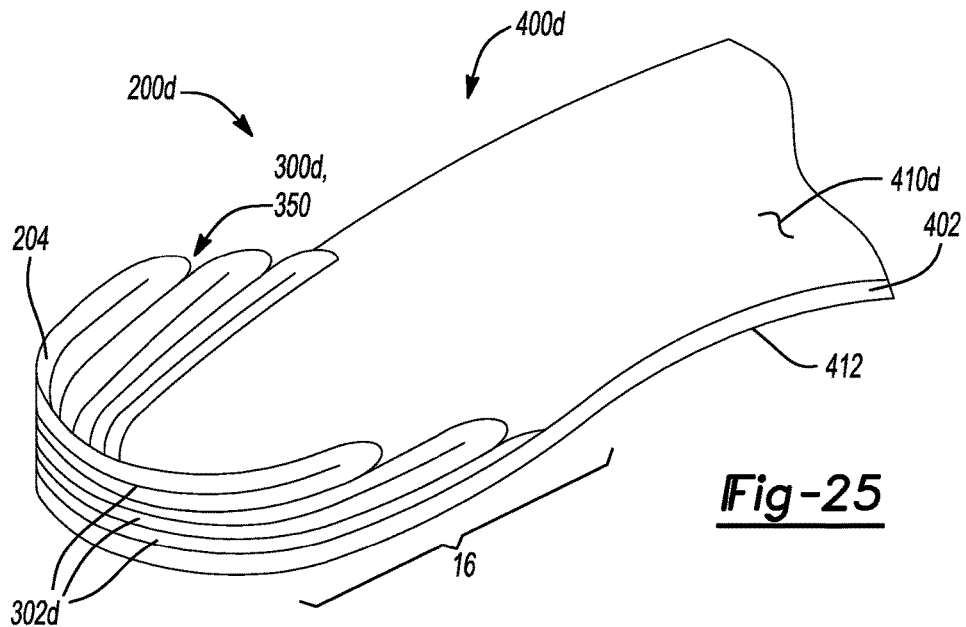
Figure 26:
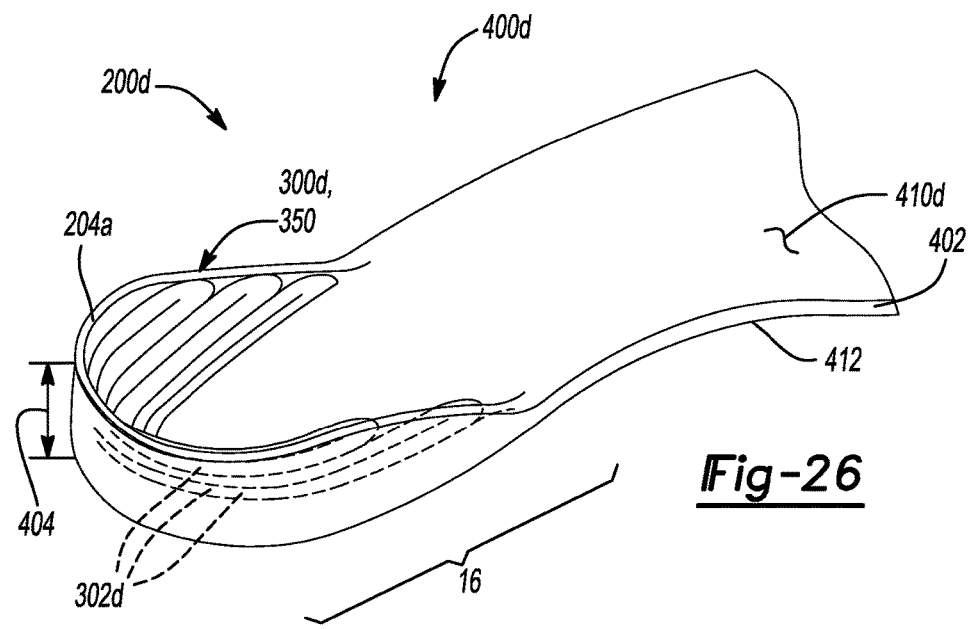
Figure 27:
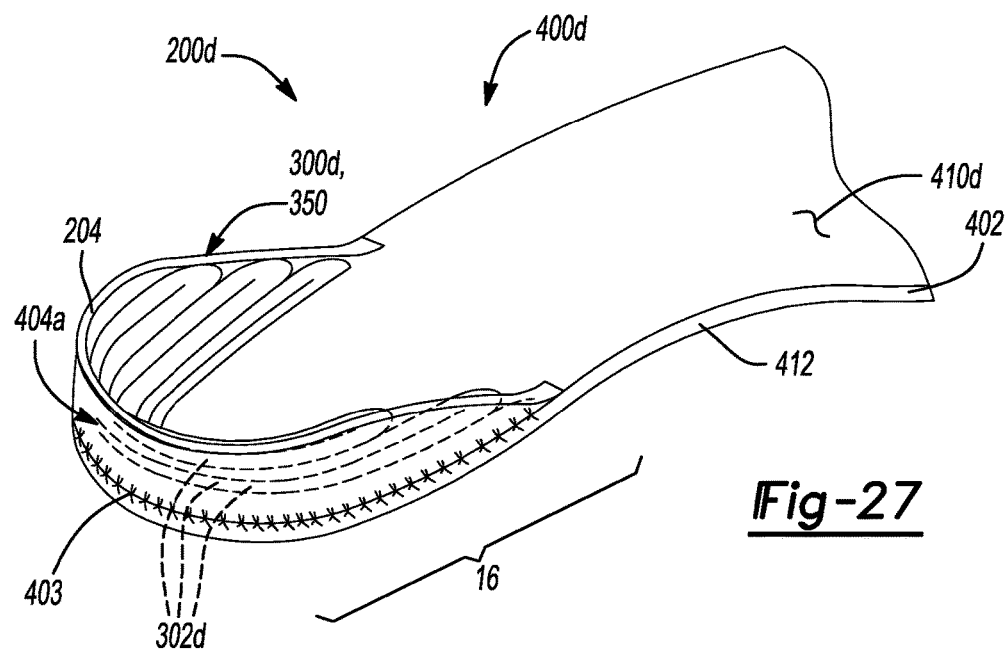
Figure 28:
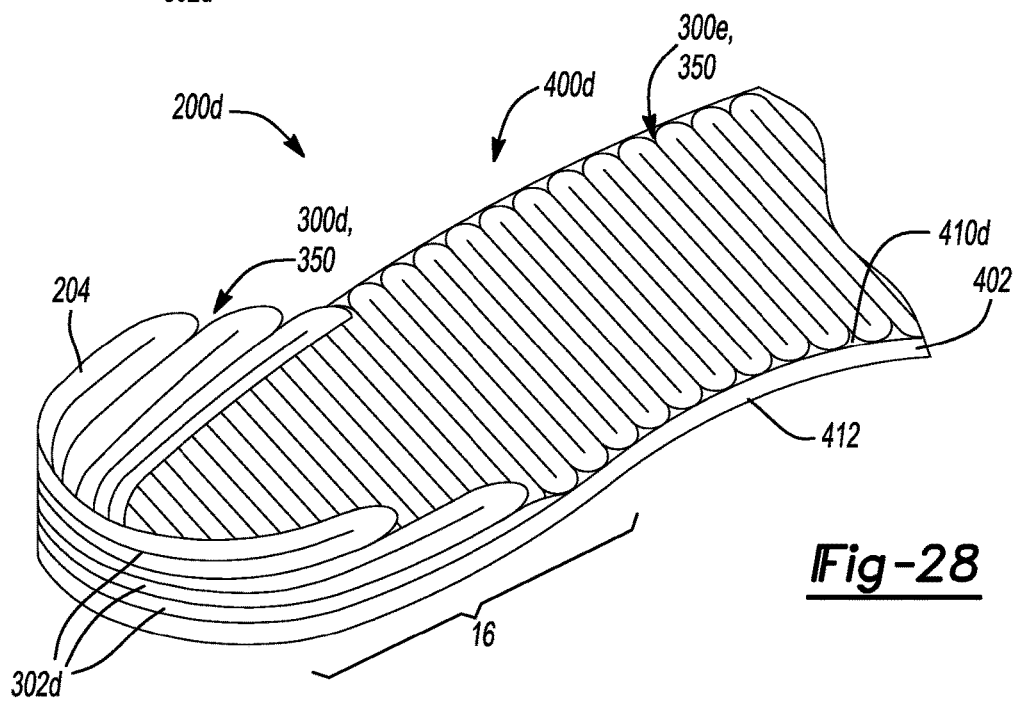
Figure 29:
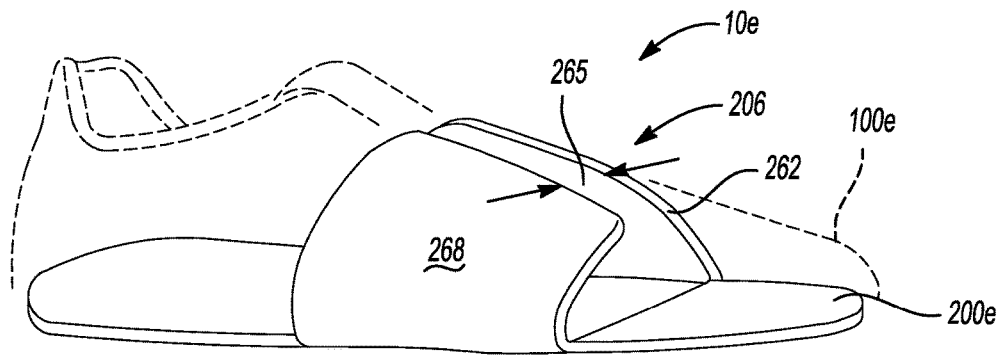
Figure 30:
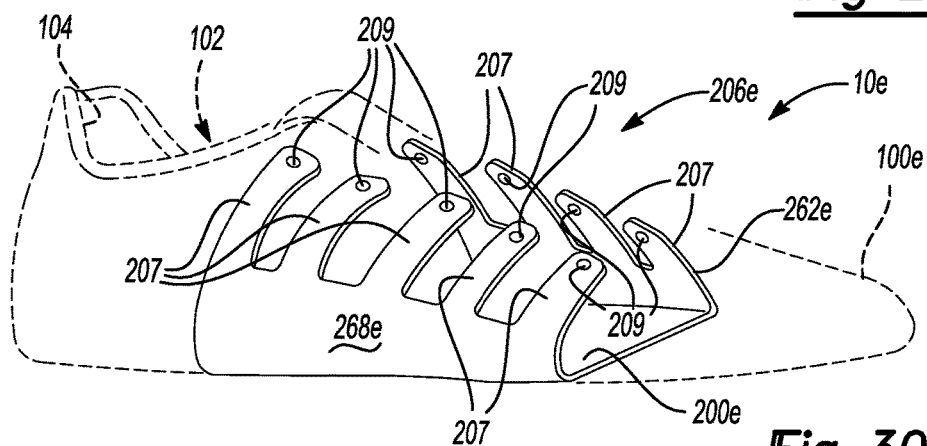
Figure 31:
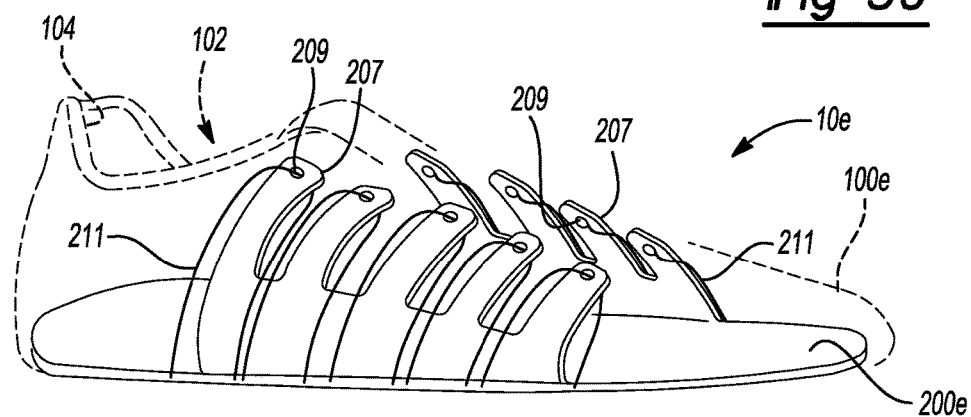
Figure 32:
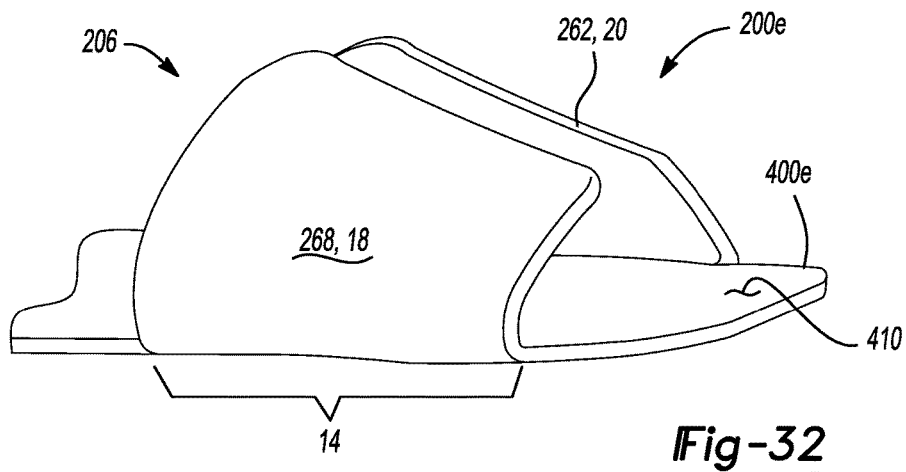
Figure 33:
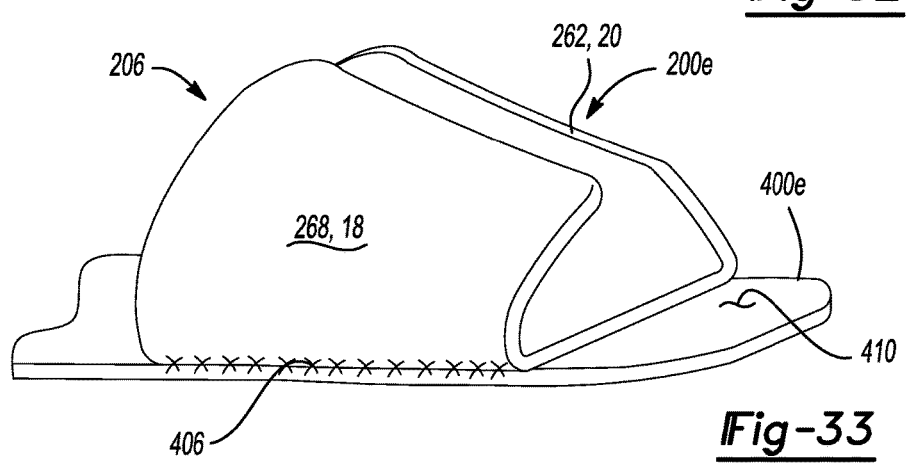
Figure 34:
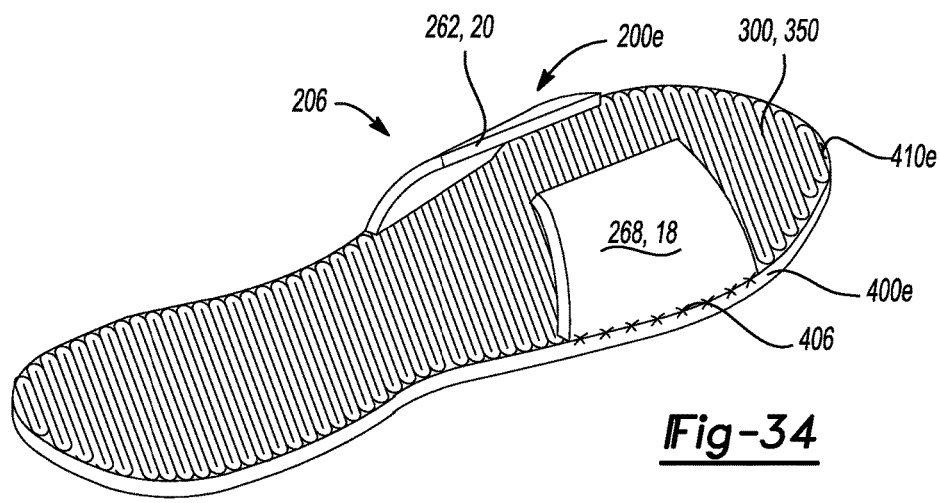
Figure 35:
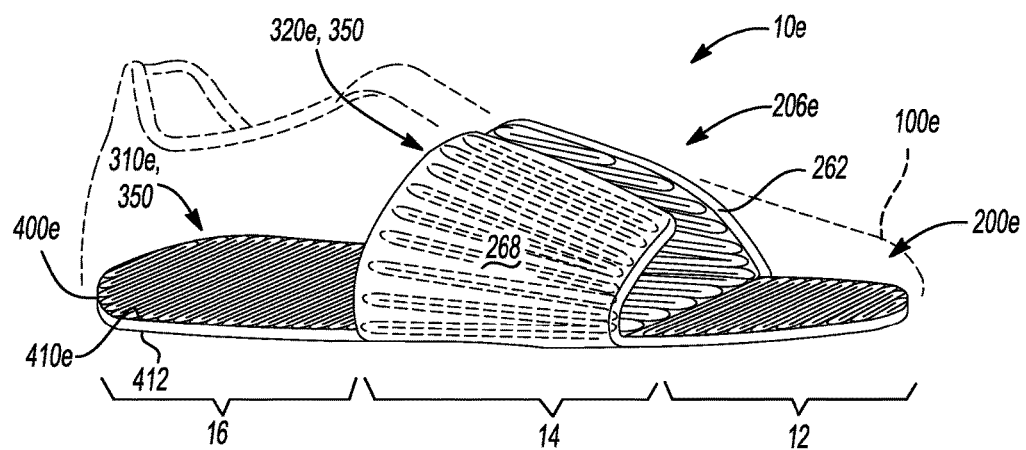
Figure 36:
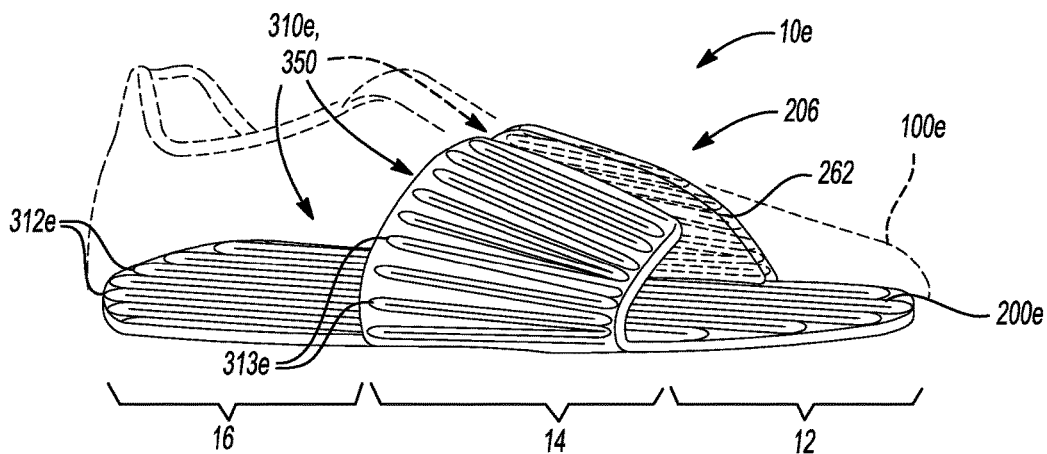
Figure 37:
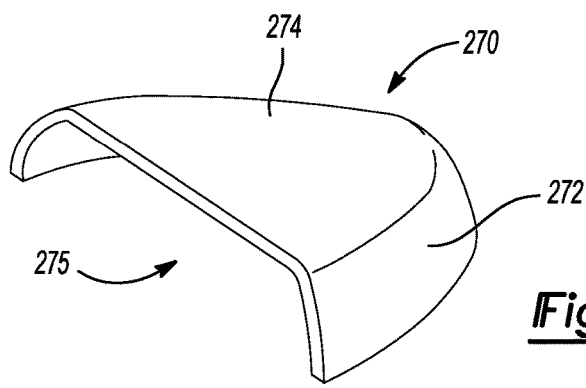
Figure 38:
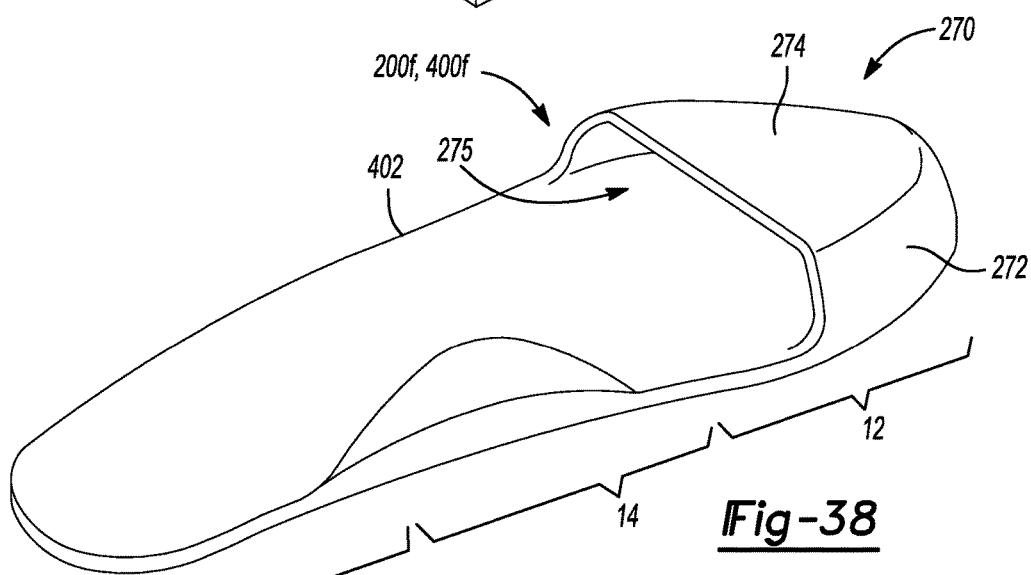
Figure 39:
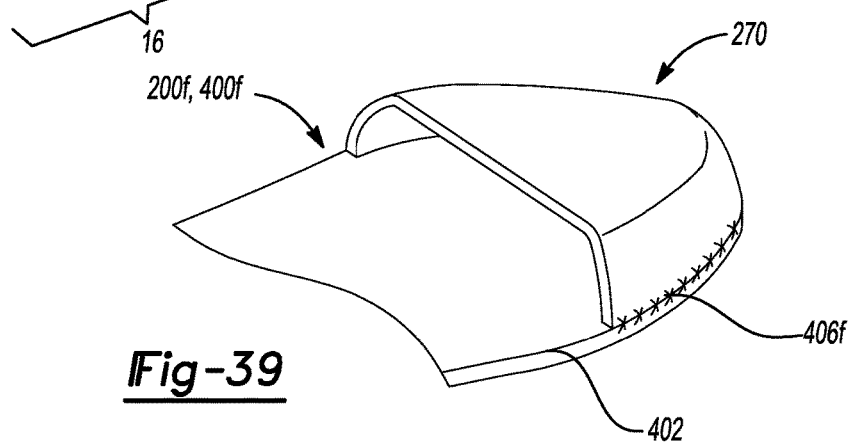
Figure 40:
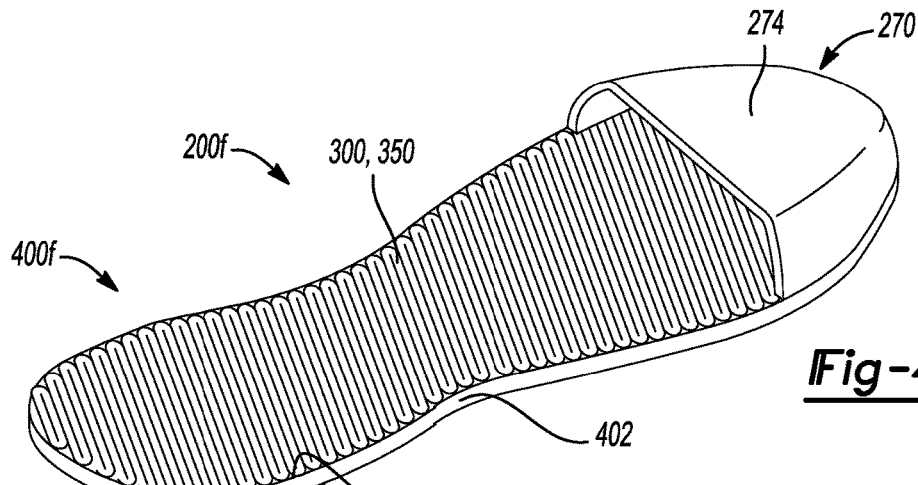
Figure 41:
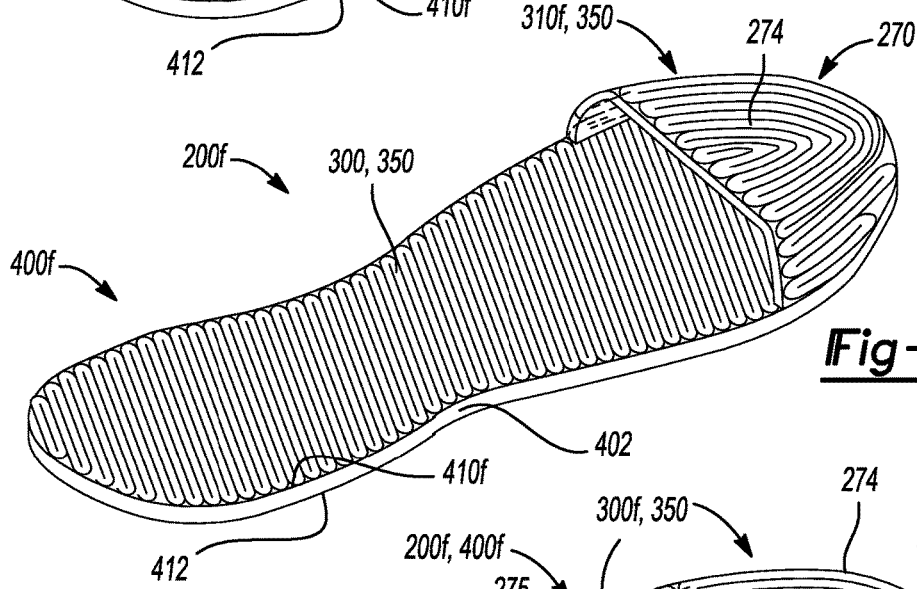
Figure 42:
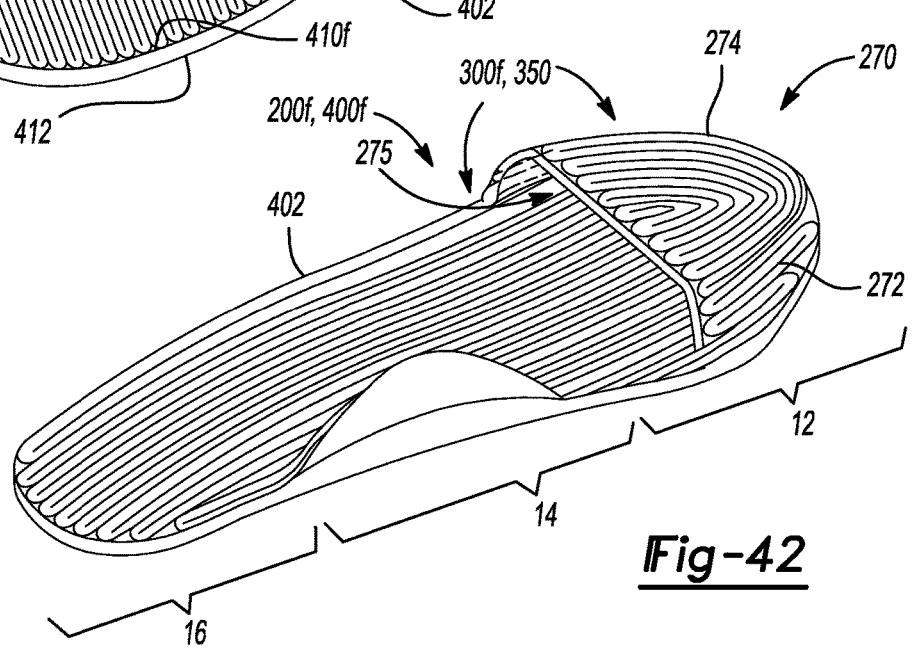
Figure 43:
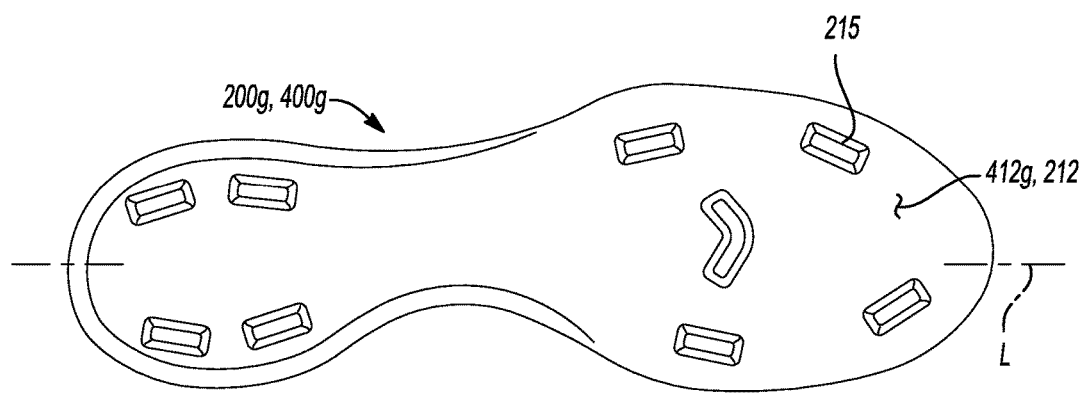
Figure 44:
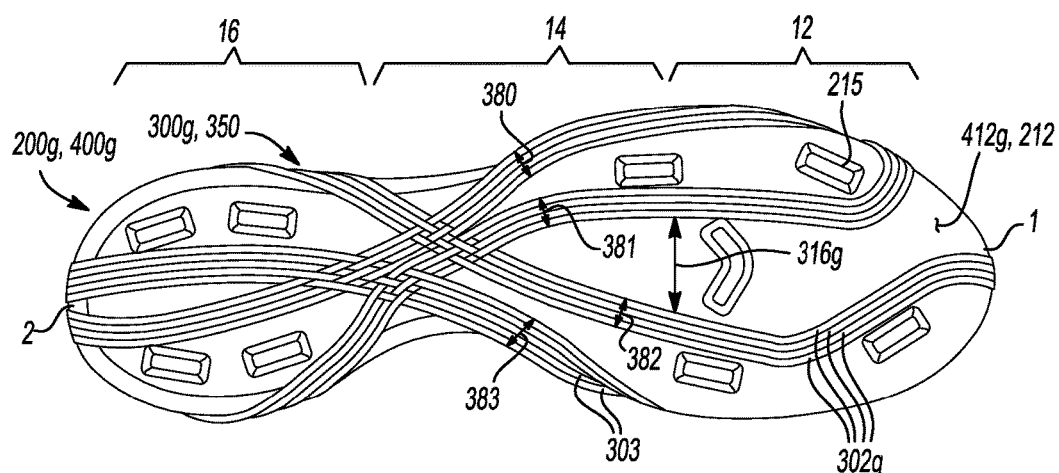
Figure 45:
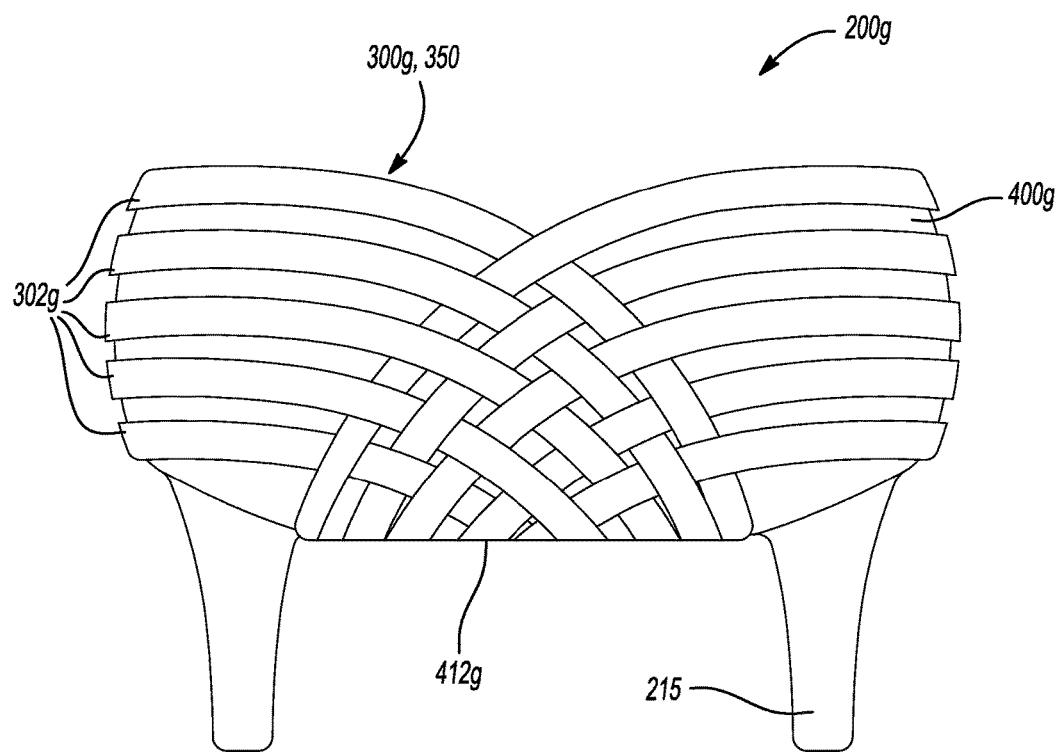
Figure 46:
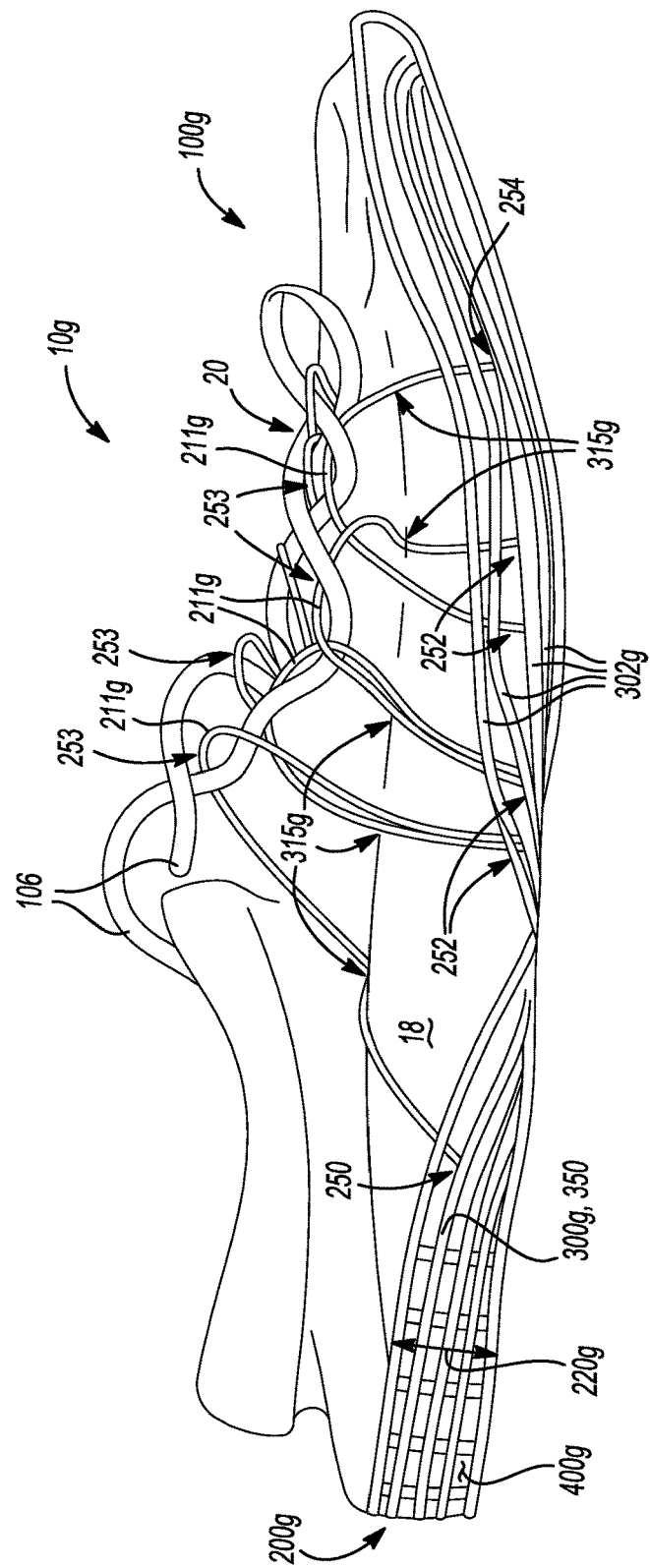
Figure 47:
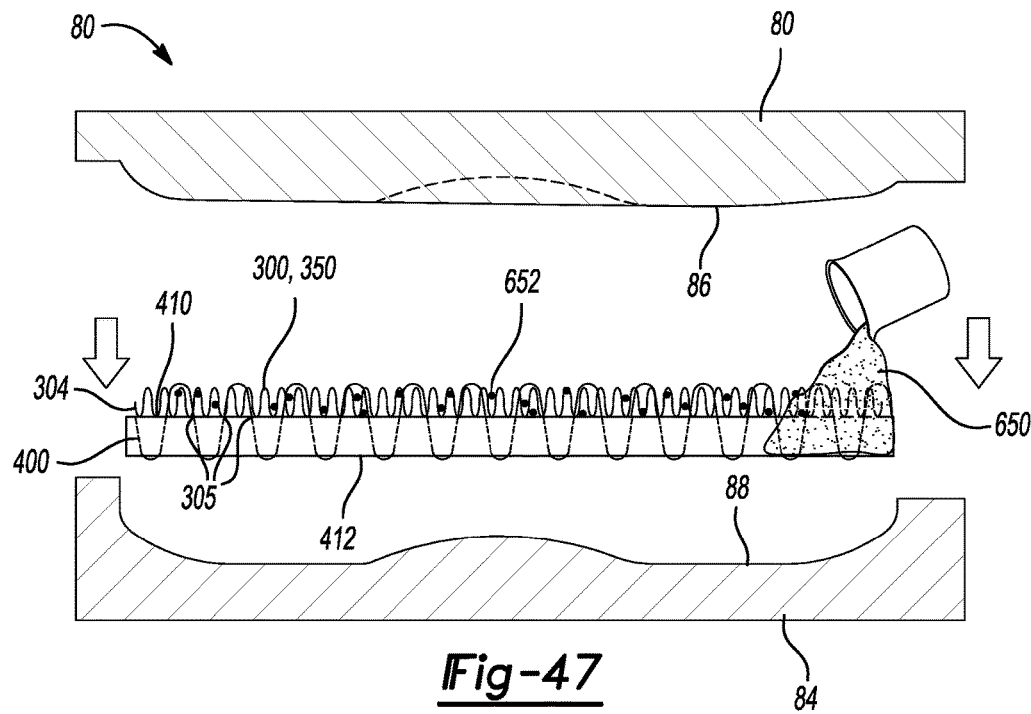
Figure 48:
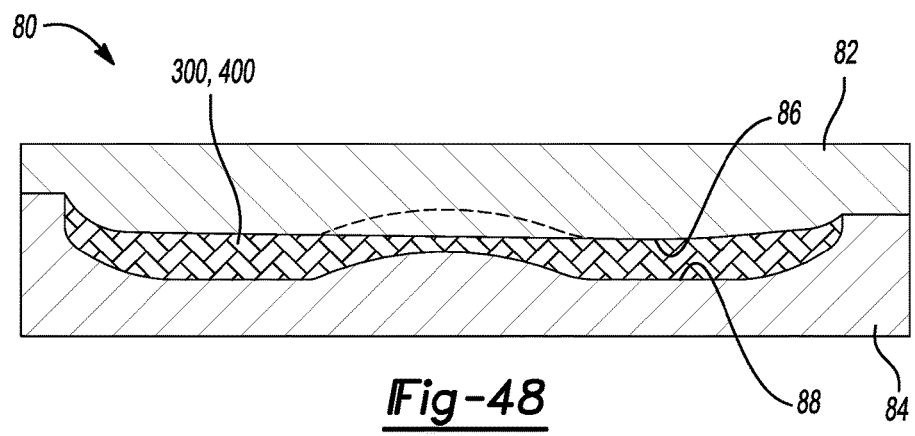
Figure 49:
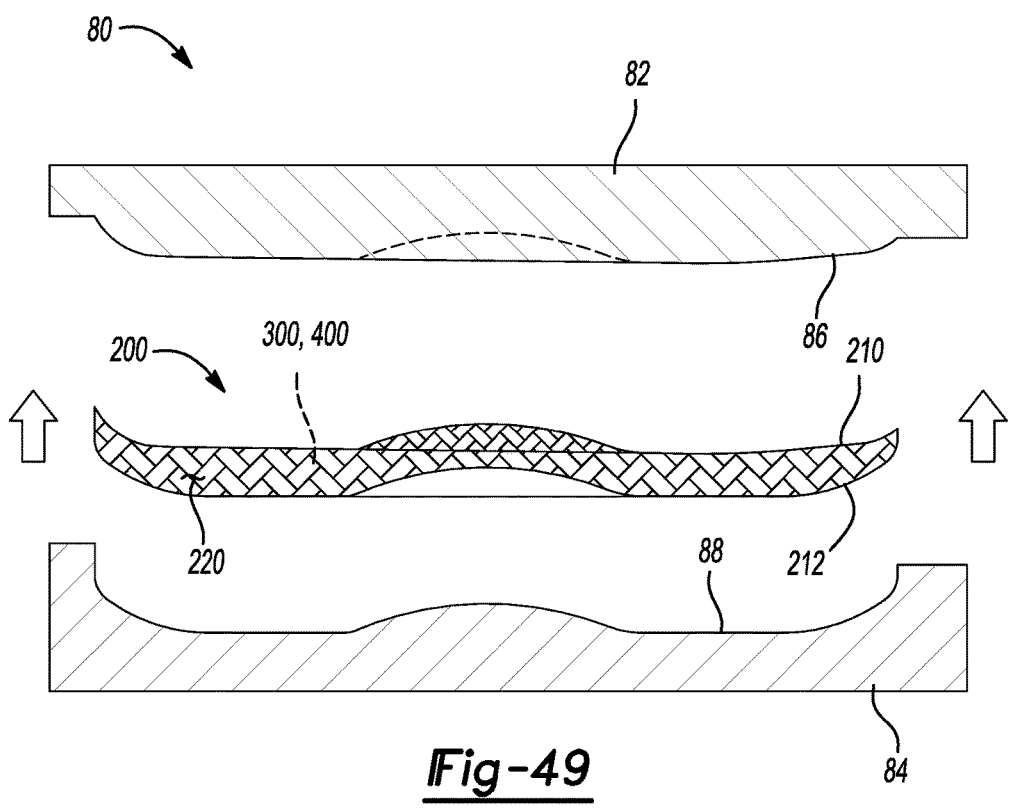
Figure 50:
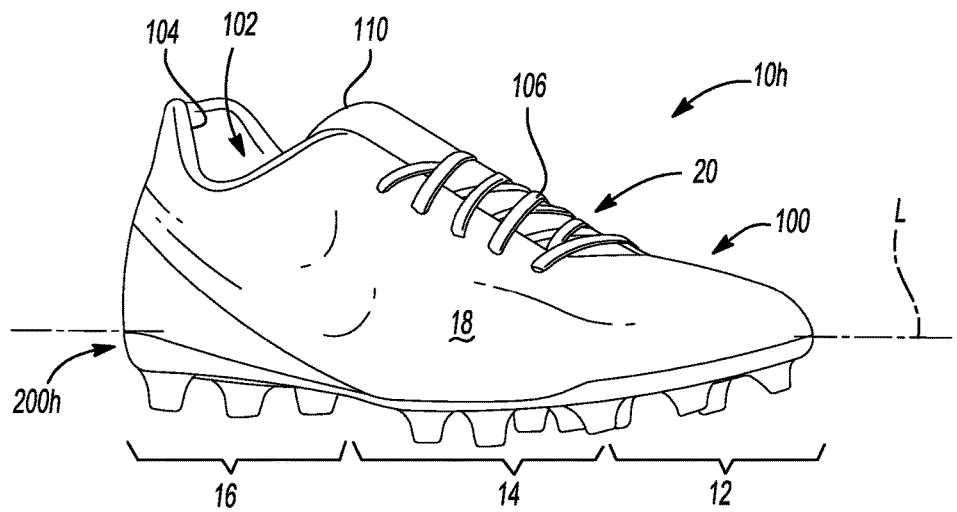
Figure 51:
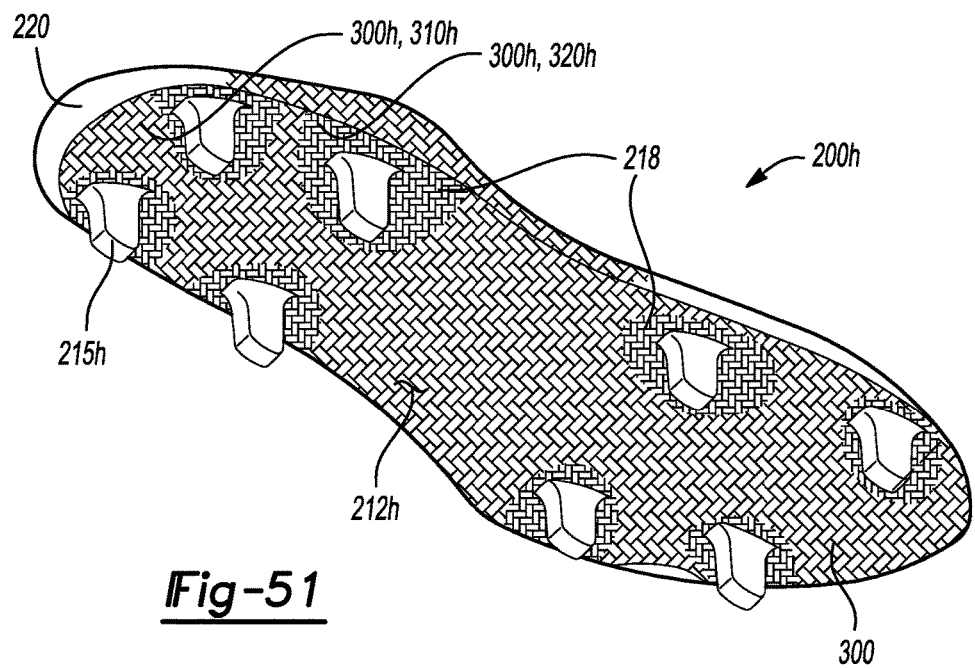
Figure 55:
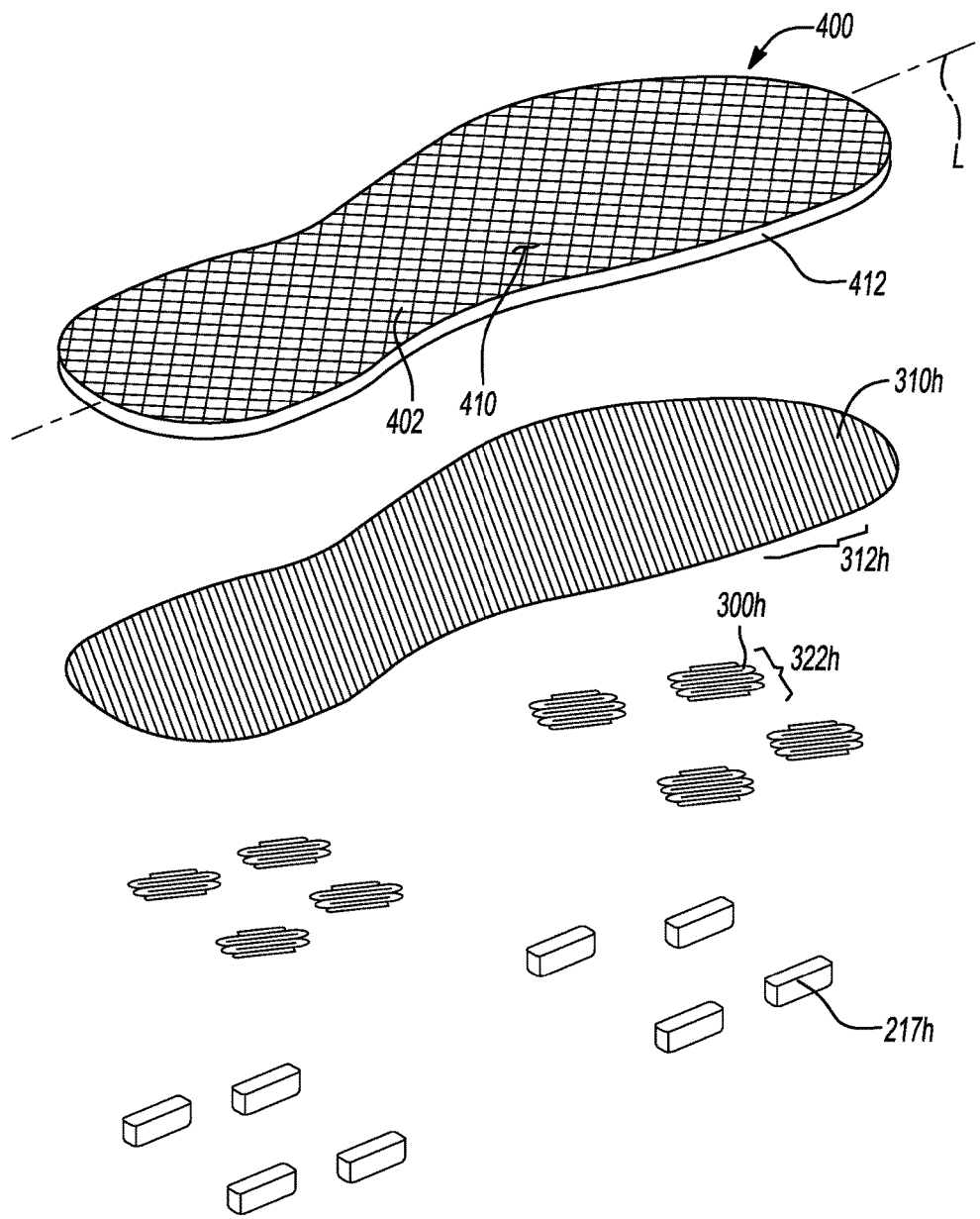
Figure 56:
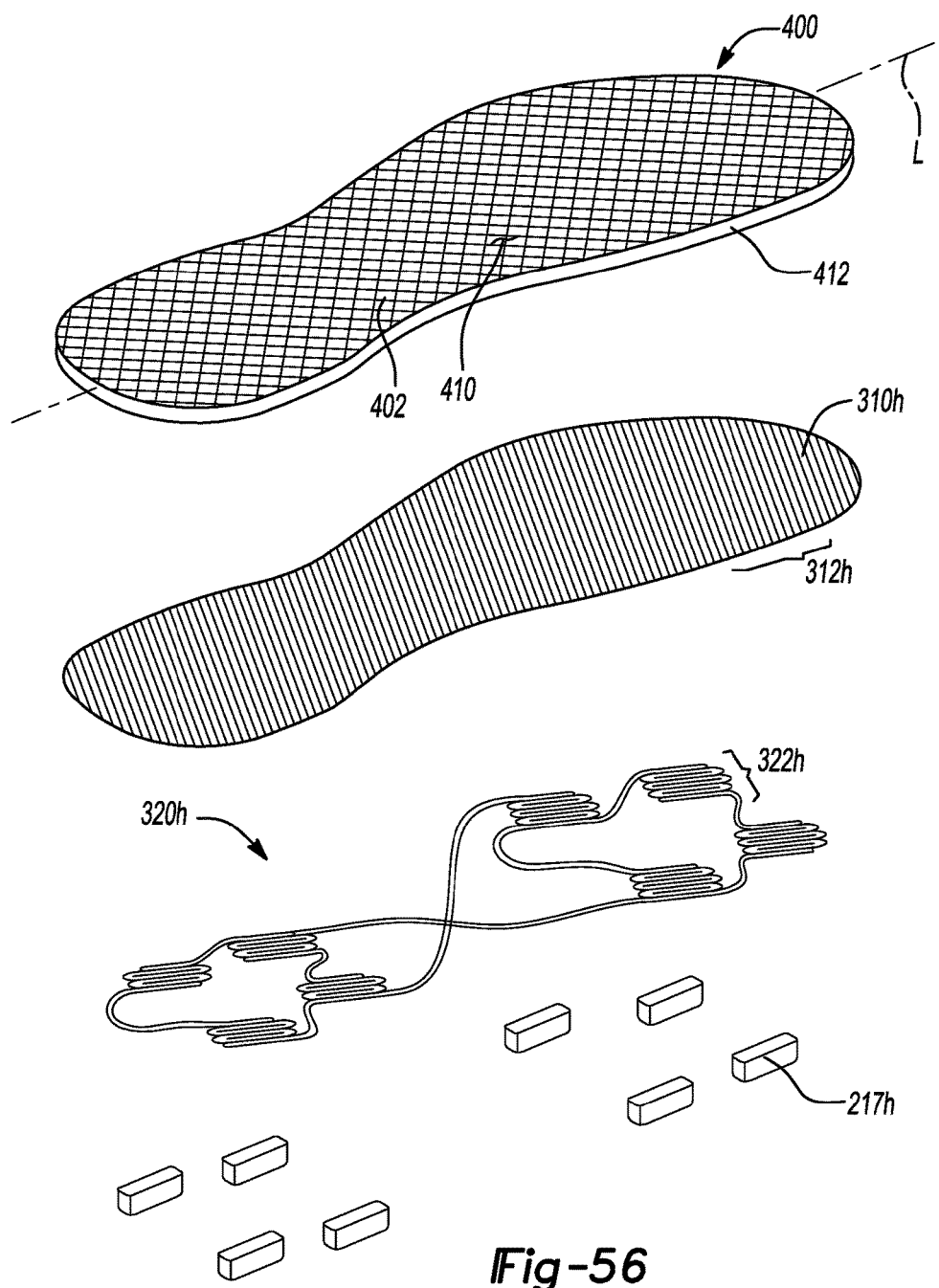
Figure 57:
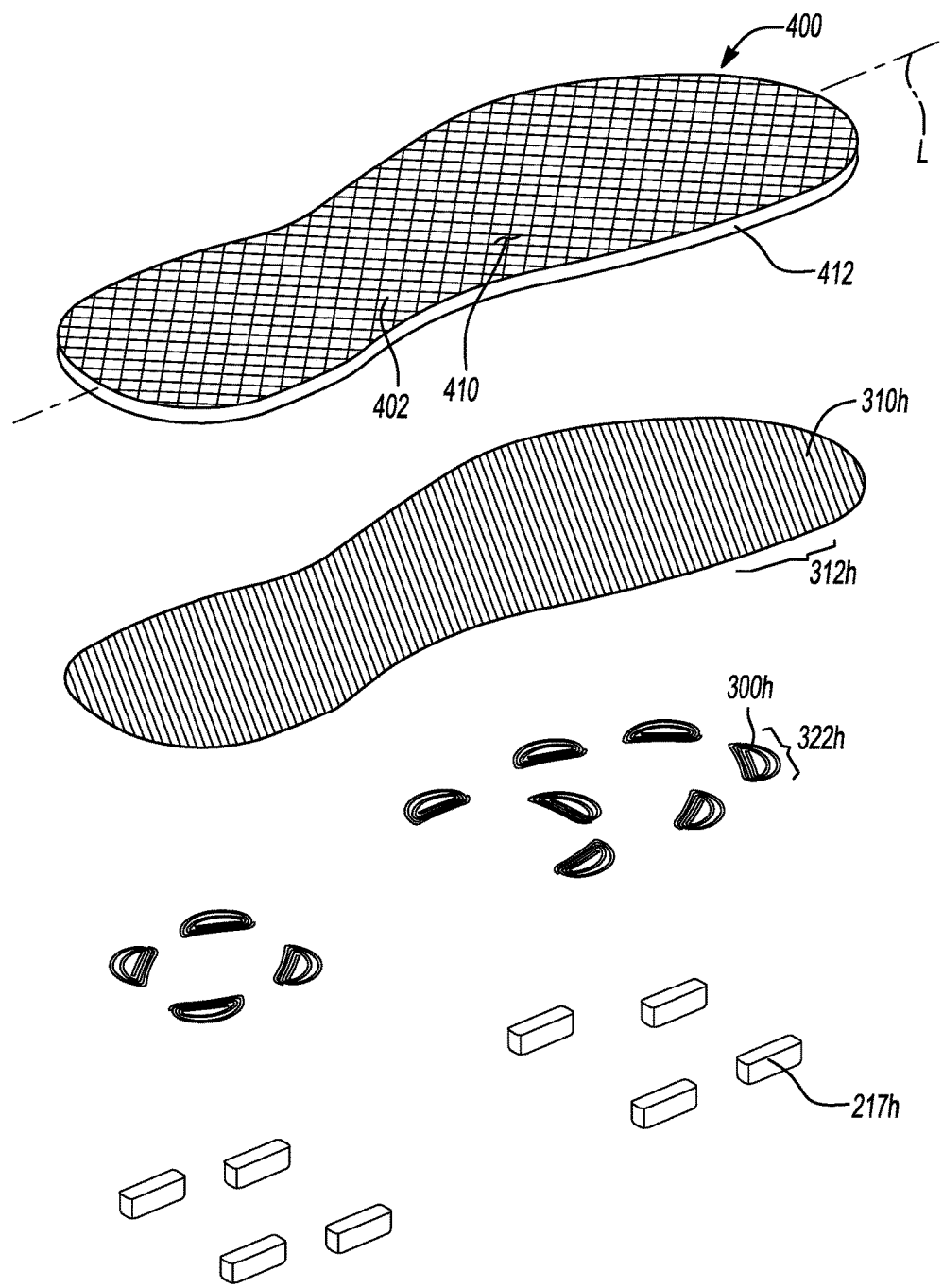
Figure 58:
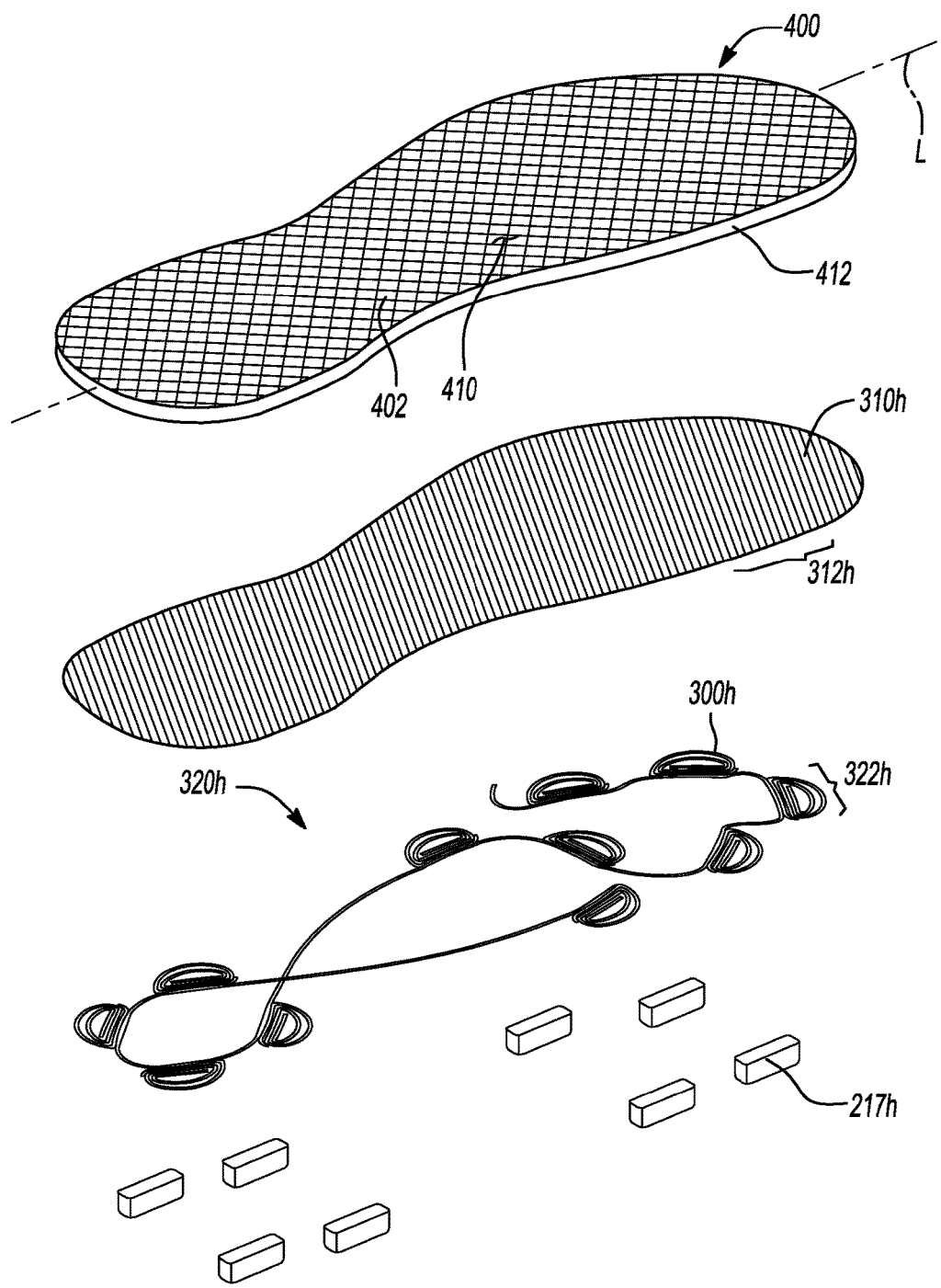
Figure 59:
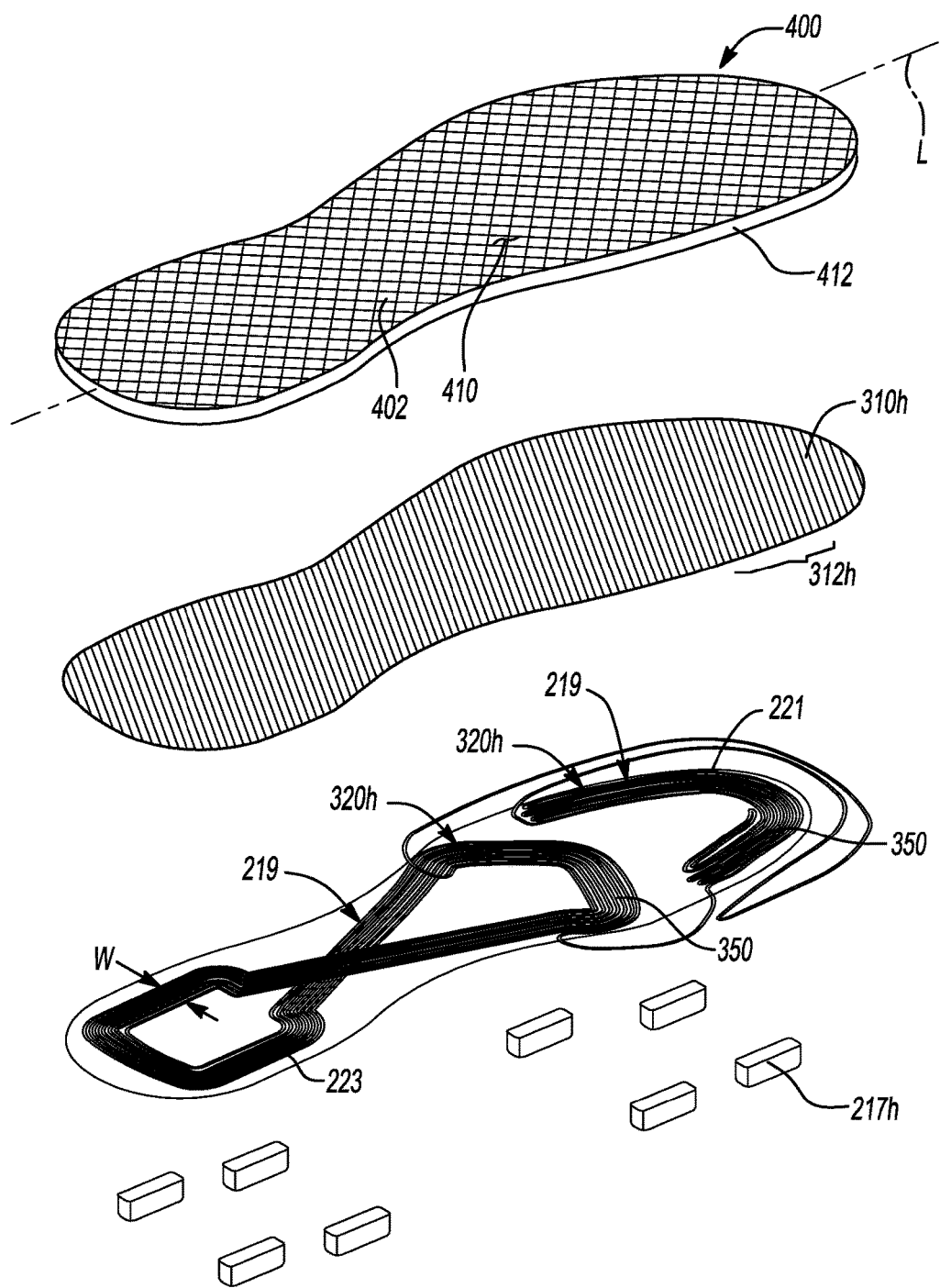
Figure 60:
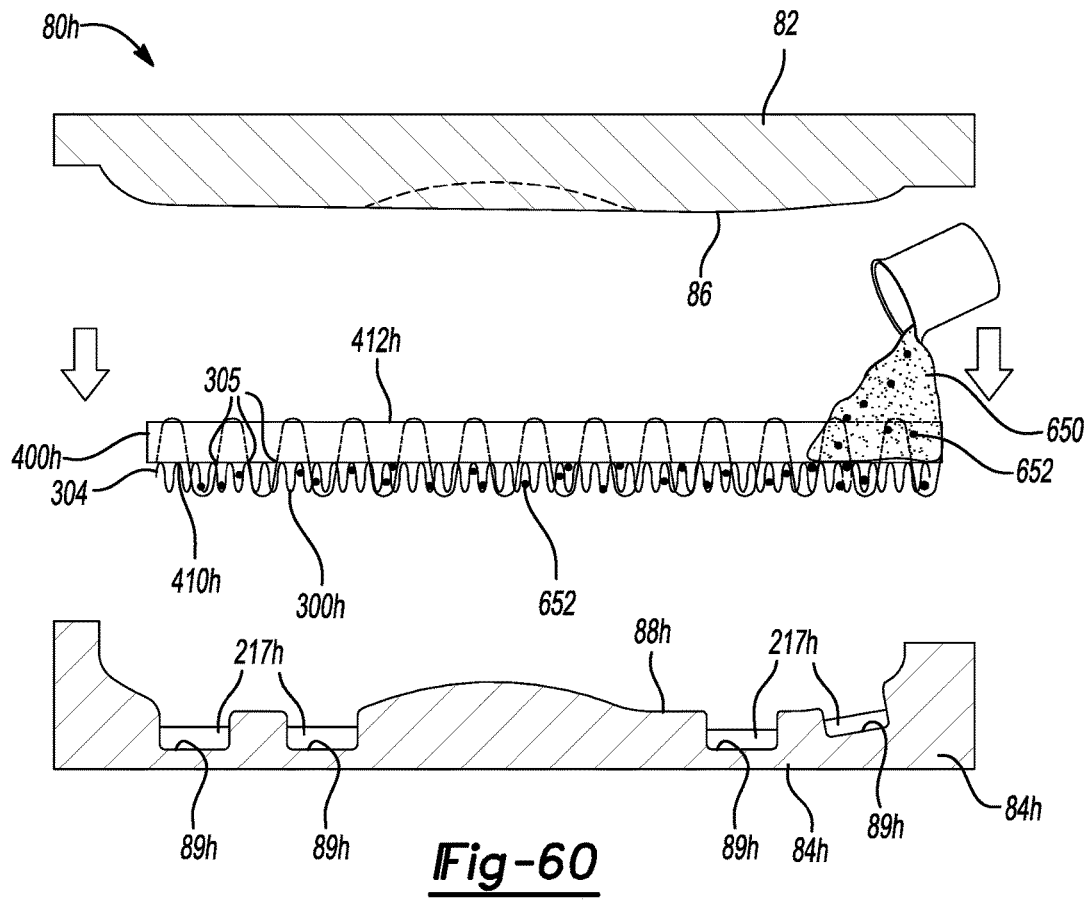
Figure 61:
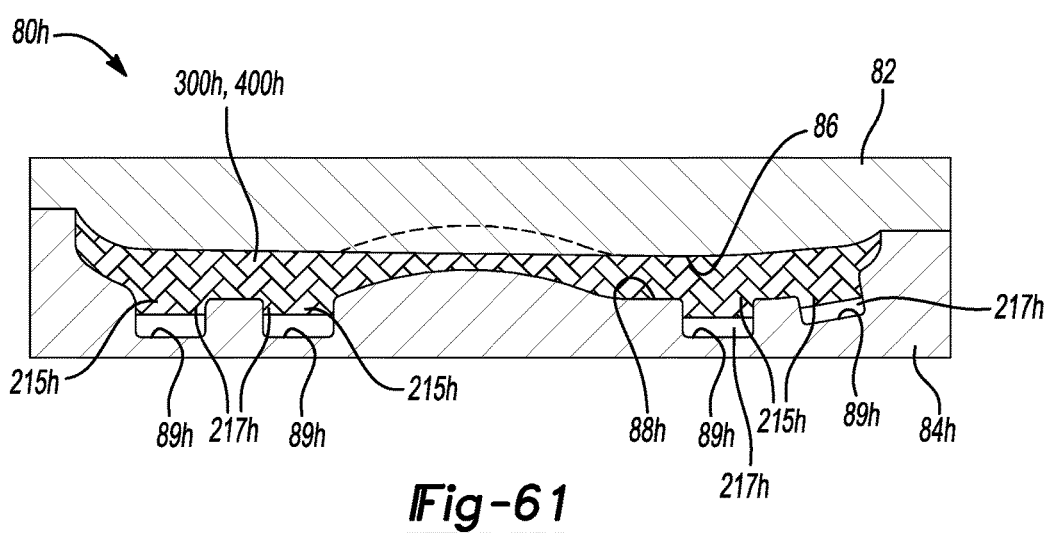
Figure 62:
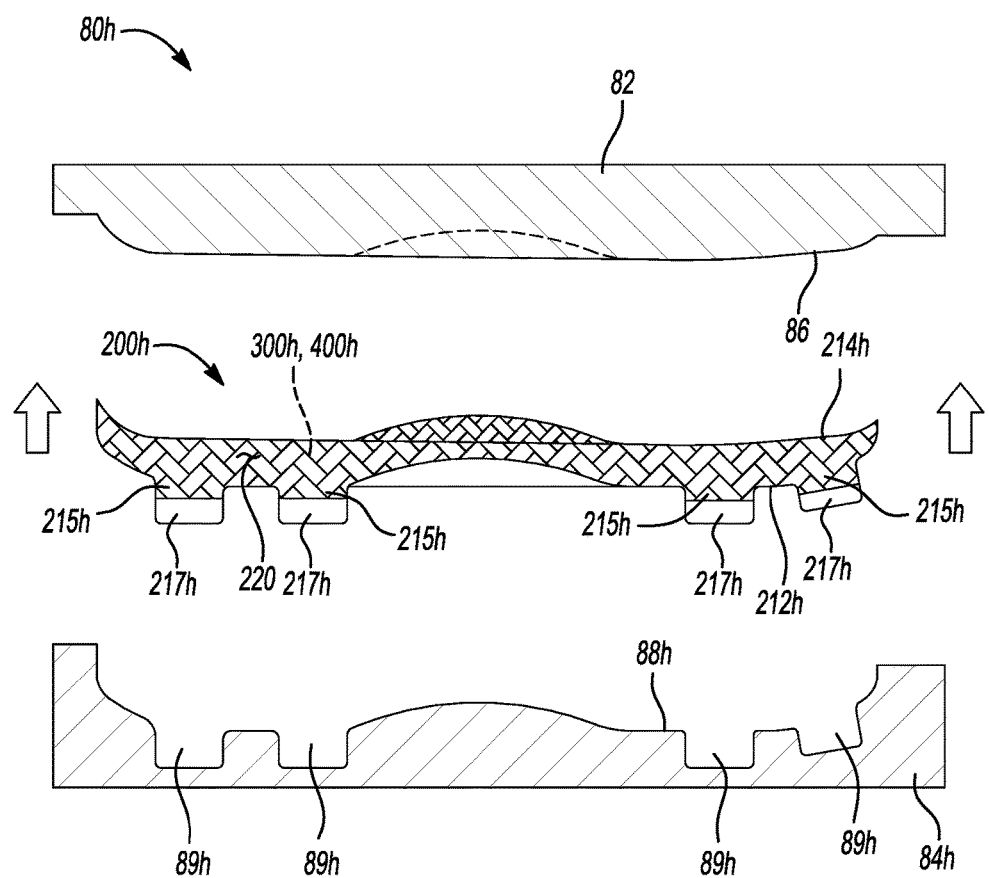
Figure 63:
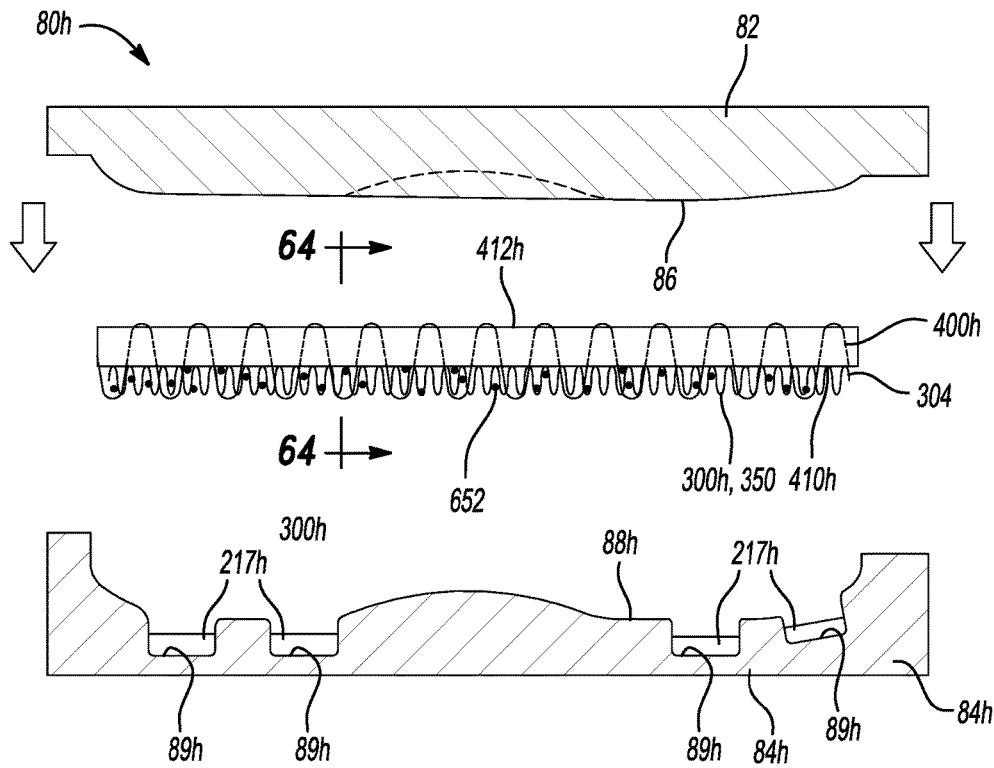
Figure 64:
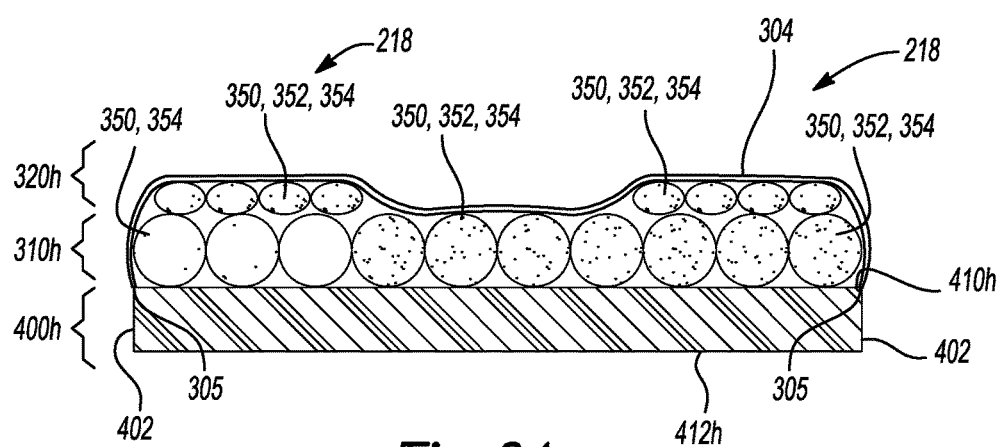
Figure 65:
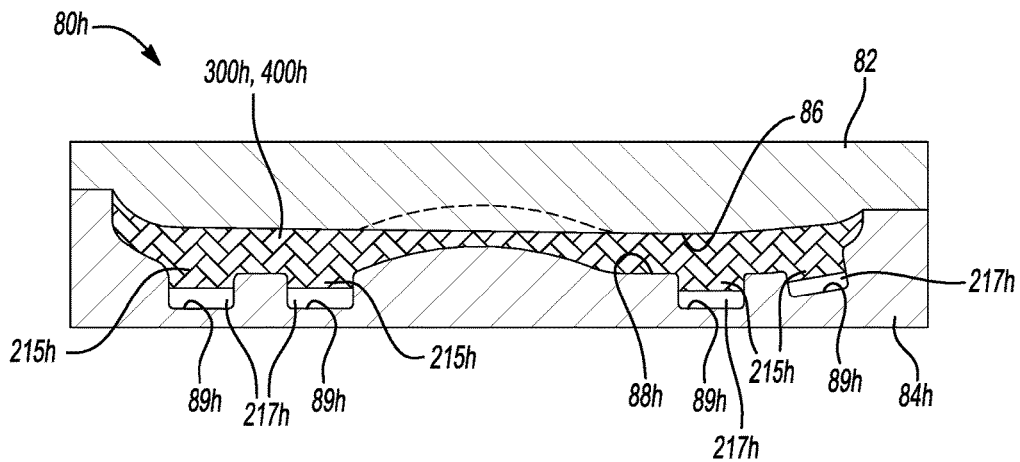
Figure 66:
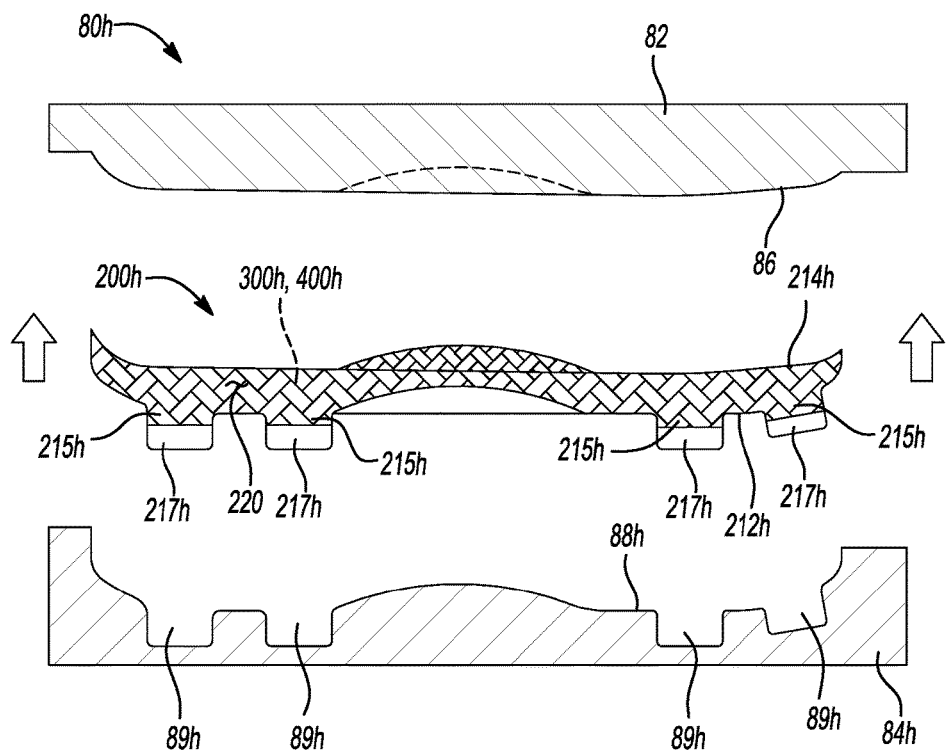
Figure 67:
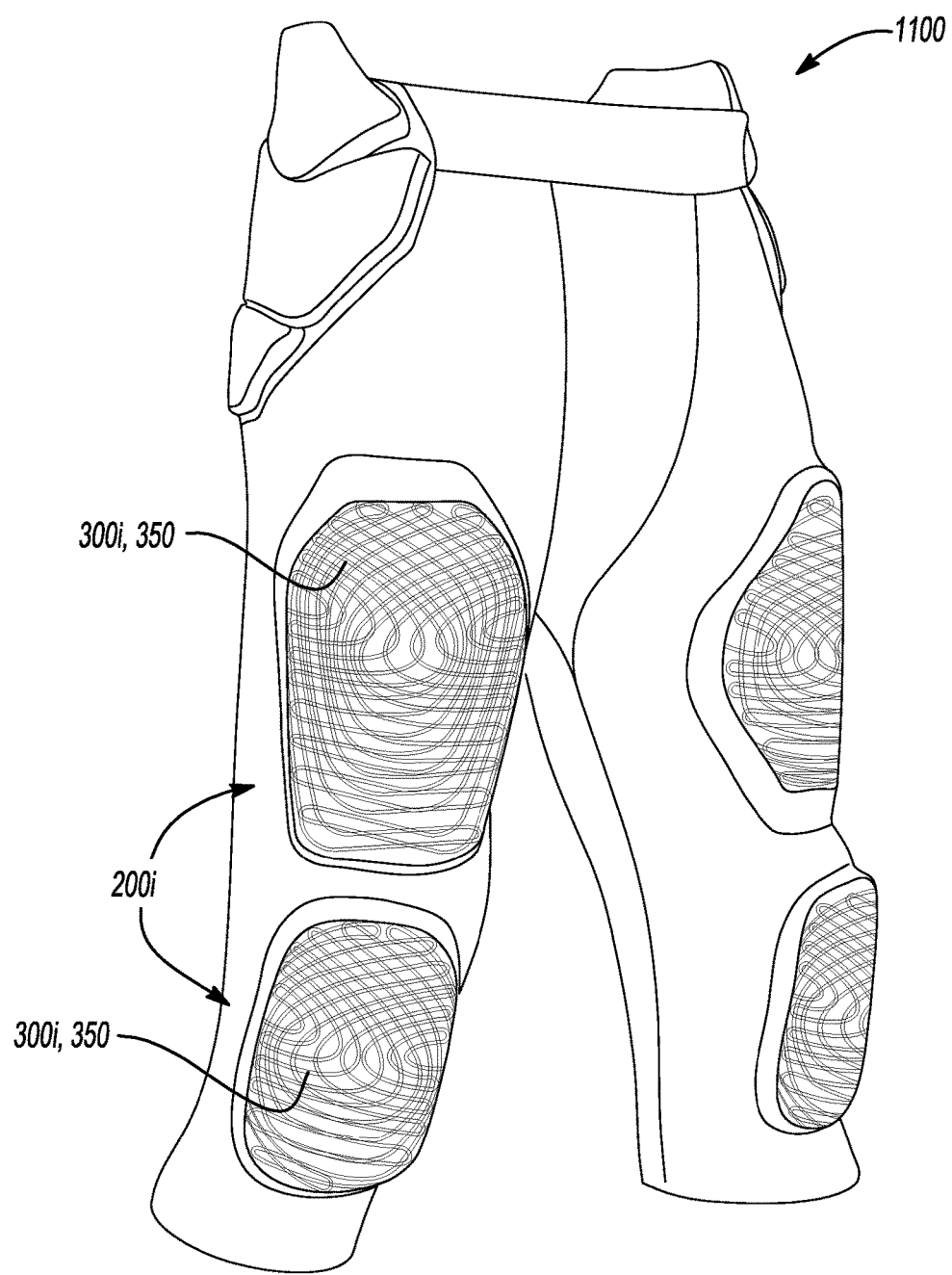
Figure 68:
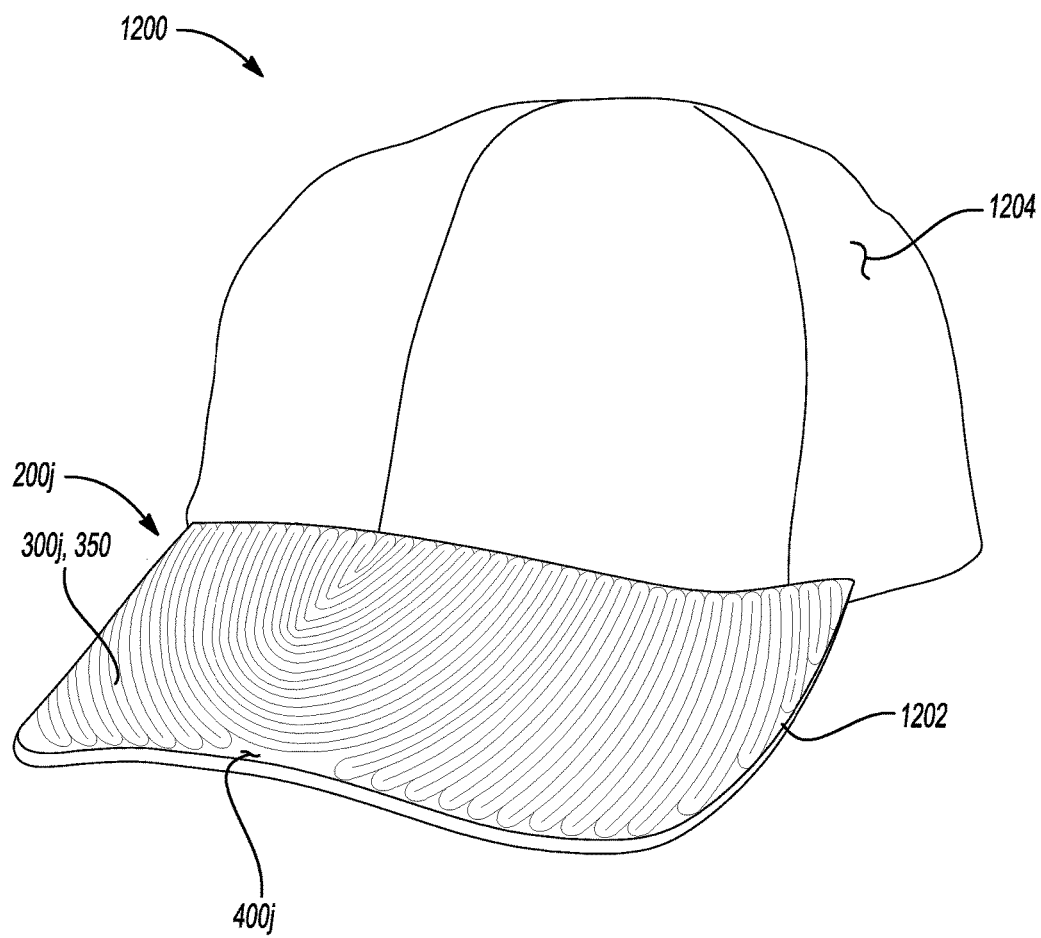
Figure 69:
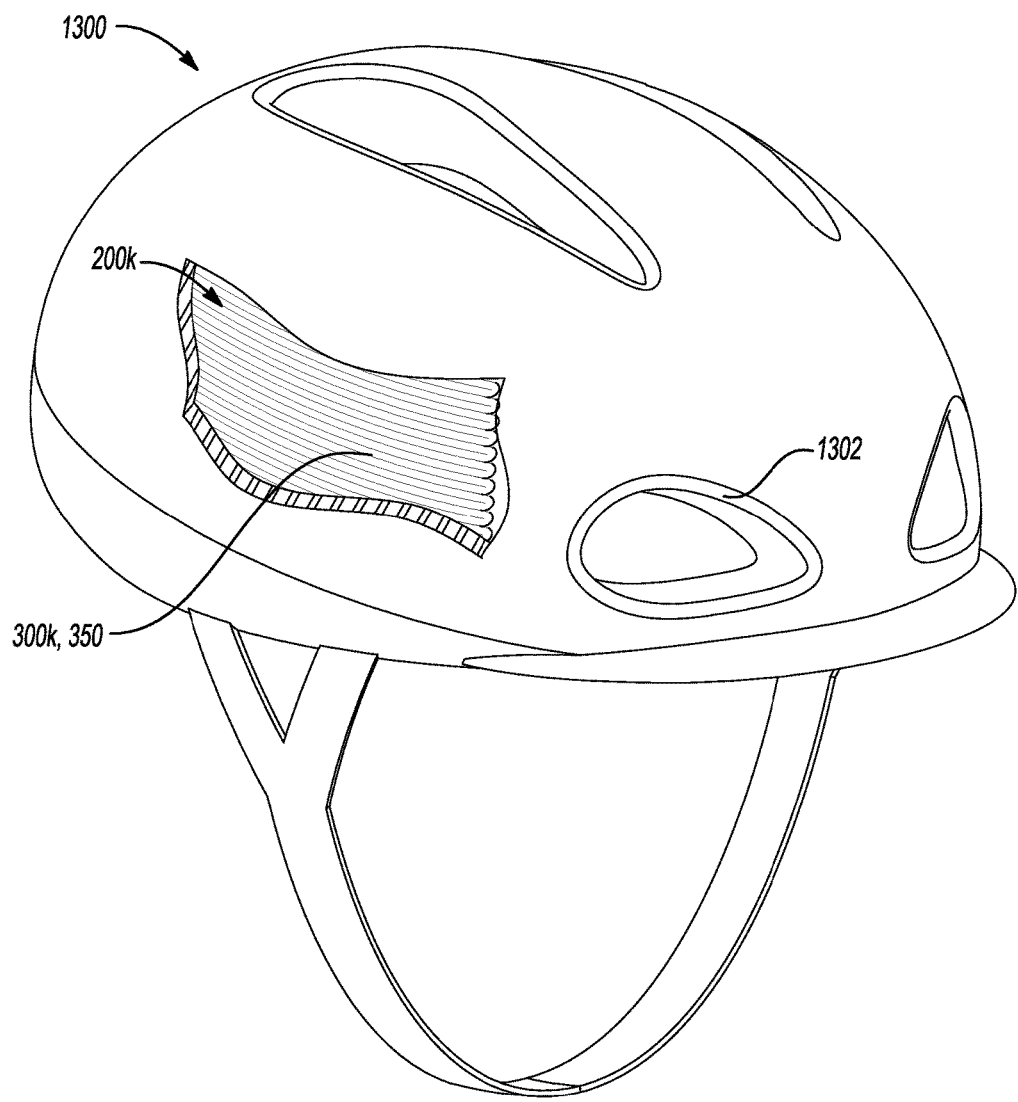
Figure 70:
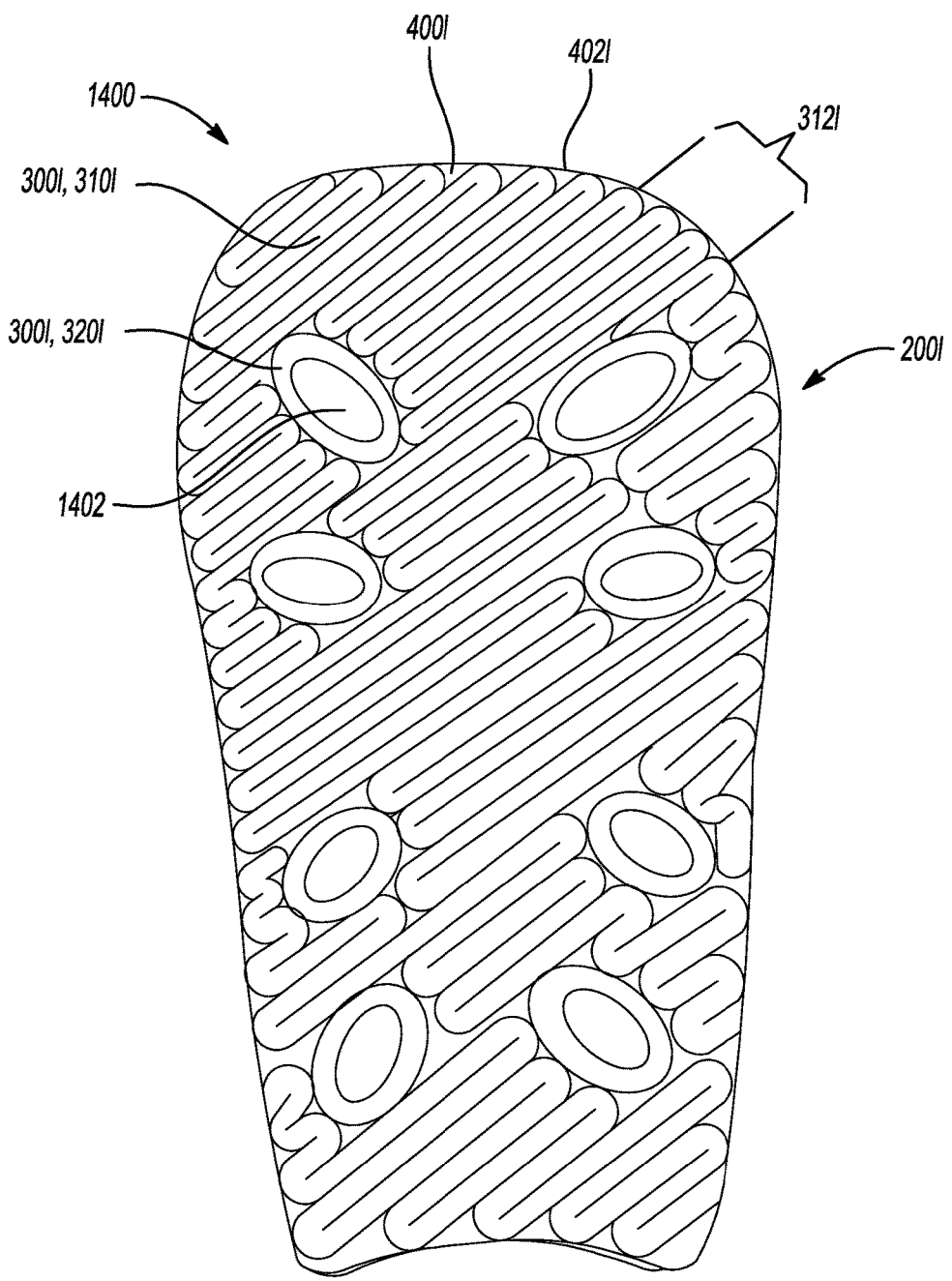

FIG. 10 provides a side-by-side top view of the first, second, and third tows of fibers and the substrate of FIG. 8;

FIG. 11 is a close up view of the first tow of fibers of FIG. 7 attached to the substrate via first stitching;

FIG. 12 is a cross-sectional view taken along line 12-12 of FIG. 11 showing the first stitching attaching the first tow of fibers to a top surface of the substrate and the fibers including non-polymer fibers and polymer fibers;

FIG. 13 provides a top view of a tow of fibers attached to a substrate and forming a first layer on the substrate in accordance with principles of the present disclosure;

FIG. 14 provides a detailed view of a portion of FIG. 13 showing the tow including looped portions disposed proximate a peripheral edge of the substrate for connecting adjacent segments of the first tow;

FIG. 15 provides an exploded view of an embroidered preform including a substrate and first, second, and third tows of fibers attached to the substrate to form corresponding first, second, and third layers on the substrate in accordance with principles of the present disclosure;

FIG. 16 provides a side-by-side top view of the substrate and the first, second, and third tows of fibers attached to the substrate of FIG. 15;

FIG. 17 provides a top view of a preform plate including a first tow of fibers and a second tow of fibers disposed upon a top surface of a substrate in accordance with principles of the present disclosure;

FIG. 18 provides a cross-sectional view taken along line 18-18 of FIG. 17 showing the second tow of fibers disposed along a perimeter edge of the substrate to provide an outer reinforcement area for the first tow of fibers;

FIG. 19 provides an alternate cross-sectional view taken along line 18-18 of FIG. 17 showing a polymeric material replacing the second tow of fibers to provide an outer reinforcement area for the first tow of fibers;

FIG. 20 provides an alternate cross-sectional view taken along line 18-18 of FIG. 17 showing a perimeter edge of the substrate including a fold to provide an outer reinforcement area for the first tow of fibers;

FIG. 21 provides a top view of a preform plate including a tow of fibers disposed on a substrate local to an arch area of the plate to provide an arch support for a foot in accordance with principles of the present disclosure;

FIG. 22 provides a rear perspective view of a continuous substrate integrally forming the arch support of FIG. 21 by folding material of the substrate local to the arch area;

FIG. 23 provides an exploded view of the arch support of FIG. 21 showing the tow of fibers attached directly to the top surface of the substrate without using an intermediary arch-shaped substrate;

FIG. 24 provides a top view of the arch support of FIG. 21 showing the tow of fibers attached directly to the top surface of the substrate without using an intermediary arch-shaped substrate;

FIG. 25 provides a partial rear perspective view of an embroidered preform including a heel counter formed from a tow of fibers attached to a top surface of substrate in accordance with principles of the present disclosure;

FIG. 26 provides a partial rear perspective view of the embroidered preform of FIG. 25 including a raised back portion of the substrate operative as an outer reinforcement for the tow of fibers forming the heel counter;

FIG. 27 provides a partial rear perspective view of the embroidered preform of FIG. 25 including a raised back portion formed from a separate piece of material that attaches to the substrate to provide an outer reinforcement for the tow of fibers forming the heel counter;

FIG. 28 provides a partial rear perspective view of the embroidered preform of FIG. 25 showing the tow of fibers attaching to the substrate to form the heel counter around the perimeter edge of the substrate and a separate tow of fibers attached to the top surface of the substrate;

FIG. 29 provides a side perspective view of an article of footwear including a reinforcing cage affixed to a footwear plate in accordance with principles of the present disclosure;

FIG. 30 provides a side perspective view of the article of footwear of FIG. 29 including an alternate reinforcing cage affixed to the footwear plate of FIG. 29 and including lateral and medial portions each defining a plurality of extensions that extend along lateral and medial sides of an upper;

FIG. 31 provides a side perspective view of the article of footwear of FIG. 30 showing a corresponding tensile strand attached to the footwear plate and extending through each of a plurality of apertures formed through the extensions defined by the corresponding lateral and medial portions of the reinforcing cage;

FIG. 32 provides a front perspective view of the reinforcing cage of FIG. 29 integrally formed with a substrate used to form a footwear plate;

FIG. 33 provides a front perspective view of the reinforcing cage of FIG. 29 and a substrate of the footwear plate formed separately and attached to one another;

FIG. 34 provides a rear perspective view of the reinforcing cage of FIG. 29 attached to a substrate of the footwear plate and one or more tows of fibers attached to a top surface of the substrate;

FIG. 35 provides a side perspective view of the reinforcing cage of FIG. 29 showing a tow of fibers attaching to the reinforcing cage and a separate tow of fibers attached to a top surface of a substrate of the footwear plate;

FIG. 36 provides a side perspective view of the reinforcing cage of FIG. 29 showing a tow of fibers attaching to both a top surface of a substrate and the reinforcing cage;

FIG. 37 provides a rear perspective view of a toe cap associated with a footwear plate of an article of footwear in accordance with principles of the present disclosure;

FIG. 38 provides a rear perspective view of the toe cap of FIG. 37 integrally formed with a substrate used to form the footwear plate;

FIG. 39 provides a partial rear perspective view of the toe cap of FIG. 37 formed separately and attached to a substrate used to form the footwear plate;

FIG. 40 provides a rear perspective view of the toe cap of FIG. 37 attached to a substrate of the footwear plate and a tow of fibers attached to a top surface of the substrate;

FIG. 41 provides a rear perspective view of the toe cap of FIG. 37 attached to a substrate of the footwear plate, a tow of fibers attached to a top surface of the substrate, and a separate tow of fibers attached to the toe cap;

FIG. 42 provides a rear perspective view of the toe cap of FIG. 37 integrally formed with a substrate used to form the footwear plate and a tow of fibers attaching to both a top surface of the substrate and the toe cap;

FIG. 43 provides a bottom view of a footwear plate for an article of footwear including one or more protruding elements extending from a bottom surface of the footwear plate in accordance with principles of the present disclosure;

FIG. 44 provides a bottom perspective view of the footwear plate of FIG. 43 showing a tow of fibers attached to the footwear plate and crossing one another in a mid-foot region of the footwear plate;

FIG. 45 provides a partial rear perspective view of the footwear plate of FIG. 43 showing a tow of fibers including a plurality of segments woven together and around a second end of the footwear plate to form a heel counter;

FIG. 46 provides a side perspective view of the article of footwear of FIG. 43 showing a tow of fibers attached to the footwear plate and extending onto exterior surfaces of an upper of the article of footwear;

FIG. 47 is a schematic view of a mold showing an embroidered preform including a tow of fibers attached to a substrate positioned between an upper mold portion of the mold and a lower mold portion of the mold when the mold is open in accordance with principles of the present disclosure;

FIG. 48 is a schematic view of the mold of FIG. 47 showing the embroidered preform between the upper mold portion and the lower mold portion when the mold is closed;

FIG. 49 is a schematic view of the mold of FIG. 47 showing the mold open and the embroidered preform molded and cured to form a substantially rigid footwear plate having a three-dimensional shape imparted by the upper mold portion and the lower mold portion;

FIG. 50 is a perspective view of an article of footwear in accordance with principles of the present disclosure;

FIG. 51 is a bottom perspective view of a composite footwear plate of FIG. 50 showing a plurality of protruding elements integrally formed into a ground-engaging surface of the footwear plate;

FIG. 52 is a top view of a substrate used to form a composite footwear plate for the article of footwear of FIG. 50;

FIG. 53 is a top view of a first tow of fibers attached to a top surface of the substrate of FIG. 50 to form a first layer on the substrate;

FIG. 54 is a top view of an embroidered preform including first and second tows of fibers attached to the top surface of the substrate of FIG. 52 to form corresponding and second layers on the substrate in a plurality of discrete regions associated with the location of the protruding elements of FIG. 51;

FIG. 55 is an exploded view of the embroidered preform of FIG. 54 showing the first and second tows of fibers, the substrate, and the plurality of protruding elements of FIG. 51;

FIG. 56 is an exploded view of an alternate embroidered preform of FIG. 54 showing the first tow of fibers, a second tow of fibers formed from a continuous strand of fibers, the substrate, and the plurality of protruding elements of FIG. 51;

FIG. 57 is an exploded view of an alternate embroidered preform of FIG. 54 showing the first tow of fibers, a second tow of fibers having a spiral configuration, the substrate, and the plurality of protruding elements of FIG. 51;

FIG. 58 is an exploded view of an alternate embroidered preform of FIG. 54 showing the first tow of fibers, a second tow of fibers having a spiral configuration and formed from a continuous strand of fibers, the substrate, and the plurality of protruding elements of FIG. 51;

FIG. 59 is an exploded view of an alternate embroidered preform of FIG. 54 showing the first tow of fibers, a second tow of fibers defining a fiber path, the substrate, and the plurality of protruding elements of FIG. 51;

FIG. 60 is a schematic view of a mold showing an embroidered preform including a tow of fibers attached to a substrate and positioned between an upper mold portion of the mold and a lower mold portion of the mold and a plurality of protruding elements received within cavities defined by the lower mold portion when the mold is open in accordance with principles of the present disclosure;

FIG. 61 is a schematic view of the mold of FIG. 60 showing the embroidered preform and the protruding elements between the upper mold portion and the lower mold portion when the mold is closed;

FIG. 62 is a schematic view of the mold of FIG. 60 showing the mold open and the embroidered preform molded and cured to form a substantially rigid footwear plate having the protruding elements integrally formed into the footwear plate;

FIG. 63 is a schematic view of a mold showing an embroidered preform including a tow of fibers attached to a substrate and positioned between an upper mold portion of the mold and a lower mold portion of the mold and a plurality of protruding elements received within cavities defined by the lower mold portion when the mold is open in accordance with principles of the present disclosure;

FIG. 64 is a cross-sectional view taken along line 64-64 of FIG. 63 showing a first tow of fibers attached to the substrate to form a first layer and a second tow of fibers applied to the first tow of fibers to form a second layer in discrete regions of the embroidered preform associated with locations of corresponding protruding elements;

FIG. 65 is a schematic view of the mold of FIG. 63 showing the embroidered preform and the protruding elements between the upper mold portion and the lower mold portion when the mold is closed;

FIG. 66 is a schematic view of the mold of FIG. 63 showing the mold open and the embroidered preform molded and cured to form a substantially rigid footwear plate having the protruding elements integrally formed into the footwear plate;

FIG. 67 provides a perspective view of composite plates including at least one tow of fibers disposed on a substrate to provide athletic padding for a leg in accordance with principles of the present disclosure;

FIG. 68 provides a perspective view of a baseball cap including a brim formed from a tow of fibers attached to a substrate in accordance with principles of the present disclosure;

FIG. 69 provides a perspective view of a helmet incorporating a composite plate formed from at least one tow of fibers in accordance with principles of the present disclosure; and FIG. 70 provides a top view of a preform plate including a first tow of fibers and a second tow of fibers disposed upon a top surface of a substrate to form a shin guard in accordance with principles of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides a method of forming an article of footwear that includes attaching a first strand portion to a flexible substrate to form a first layer on the substrate and positioning a second strand portion on the first layer to form a second layer on the first layer in a plurality of discrete regions on the substrate. The method also includes positioning a plurality of traction elements into corresponding cavities formed into a first mold surface and positioning the substrate on the first mold surface to change a shape of the substrate. The method also includes applying at least one of heat and pressure to the first strand portion, the second strand portion, the substrate, and the traction elements to conform the substrate to the shape of the first mold surface and form the traction elements into the substrate at each of the discrete regions. The method also includes incorporating the substrate into an article of footwear.

In some implementations, positioning the substrate on the first mold surface includes aligning the cavities formed into the first mold surface with the discrete regions of the substrate. Attaching the first strand portion to the flexible substrate may include attaching the first strand portion to the flexible substrate via first stitching that crosses over the first strand portion and penetrates the substrate at first attachment locations that are spaced apart from the first strand portion. Additionally or alternatively, positioning the second portion on the first layer may include attaching the first strand portion to the flexible substrate via second stitching that crosses over the second strand portion, extends through the first strand portion, and penetrates the substrate at second attachment locations disposed in the discrete regions of the substrate.

In some examples, the method also includes forming the second strand portion from a plurality of different strands of fibers each corresponding to one of the discrete regions. The method may include forming at least one of the first strand portion and the second strand portion of the same, continuous strand. The first strand portion may be formed from a first tow of fibers and/or the second strand portion may be formed from a second tow of fibers. The first and second tow of fibers each include at least one of carbon fibers, boron fibers, glass fibers, and polymeric fibers.

In some configurations, the method also includes providing the first strand portion with looped portions disposed proximate to a peripheral edge of the substrate and connecting adjacent first segments. In these configurations, the method also includes removing at least one of the looped portions that extends outside the peripheral edge of the substrate to define an outer edge of the plate. Additionally or alternatively, the method may also include providing the first layer and the second layer with segments having different densities. In some implementations, attaching the first strand portion includes applying first segments of the first strand portion to the substrate in a first shape and positioning the second strand portion includes applying second segments of the second strand portion to the first layer in a second shape different than the first shape.

In some examples, applying at least one of heat and pressure includes at least one of activating a polymeric resin incorporated into the first strand portion and the second strand portion and infusing the first strand portion, the second strand portion, and the substrate with a liquid material. In these examples, the liquid material is a thermoset material. The applying at least one of heat and pressure may include subjecting the first strand portion, the second strand portion, the substrate, and the plurality of traction elements to at least one of vacuum molding and compression molding. The method may also include forming the substrate from a thermoplastic film. In some configurations, incorporating the substrate into the article of footwear includes attaching the substrate to an upper of the article of footwear.

Further areas of applicability will become apparent from the description provided herein. The description and specific examples in this summary are intended for purposes of illustration only and are not intended to limit the scope of the present disclosure.

Referring to FIGS. 1-12, in some implementations, an article of footwear 10 includes an upper 100 and a footwear plate 200 attached to the upper 100. FIGS. 1 and 2 provide front (FIG. 1) and side (FIG. 2) perspective views of the footwear 10 divided into one or more portions. The portions may include a forefoot portion 12, a mid-foot portion 14 and a heel portion 16. The forefoot, mid-foot, and heel portions 12, 14, 16 may alternatively be referred to as forefoot, mid-foot, and heel regions 12, 14, 16, respectively. The forefoot portion 12 may correspond with toes and joints connecting metatarsal bones with phalanx bones of a foot. The mid-foot portion 14 may correspond with an arch area of the foot, and the heel portion 16 may correspond with rear portions of the foot, including a calcaneus bone. The footwear 10 may include lateral and medial sides 18, 20, respectively, corresponding with opposite sides of the footwear 10 and extending through the portions 12, 14, 16.

The upper 100 includes interior surfaces that define an interior void 102 configured to receive and secure a foot for support on the sole structure 200. Ankle opening 104 in the heel portion 16 may provide access to the interior void 102. For example, the ankle opening 104 may receive a foot to secure the foot within the void 102 and facilitate entry and removal of the foot from and to the interior void 102. In some examples, one or more fasteners 106 extend along the upper 100 to adjust a fit of the interior void 102 around the foot while concurrently accommodating entry and removal of the foot therefrom. The upper 100 may include apertures such as eyelets and/or other engagement features such as fabric or mesh loops that receive the fasteners 106. The fasteners 106 may include laces, straps, cords, hook-and-loop, or any other suitable type of fastener.

The upper 100 may include a tongue portion 110 that extends between the interior void 102 and the fasteners 106. The upper 100 may be formed from one or more materials that are stitched or adhesively bonded together to form the interior void 102. Suitable materials of the upper may include, but are not limited, textiles, foam, leather, and synthetic leather. The materials may be selected and located to impart properties of durability, air-permeability, wear-resistance, flexibility, and comfort.

Referring to FIG. 3, an exploded view of the article of footwear 10 of FIG. 2 shows a footbed surface 222 disposed between the plate 200 and the upper 100 for receiving a bottom surface (e.g., plantar) of the foot within the interior void 102. The footbed surface 222 may be integrally formed with the upper 100 in some configurations, or the footbed surface 222 may correspond to a separately formed layer that attaches to the upper 100 in other configurations. In some examples, the footbed surface 222 is contoured to conform to a profile of the plantar of the foot. Additionally or alternatively, an insole or sockliner may be disposed upon the footbed surface 222 under the foot within at least a portion of the interior void 102 of the upper 100 to enhance comfort of the footwear 10. The footbed surface 222 may correspond to a conventional strobel attached to the upper 100 or integrally formed with the upper 100.

Figure 4:
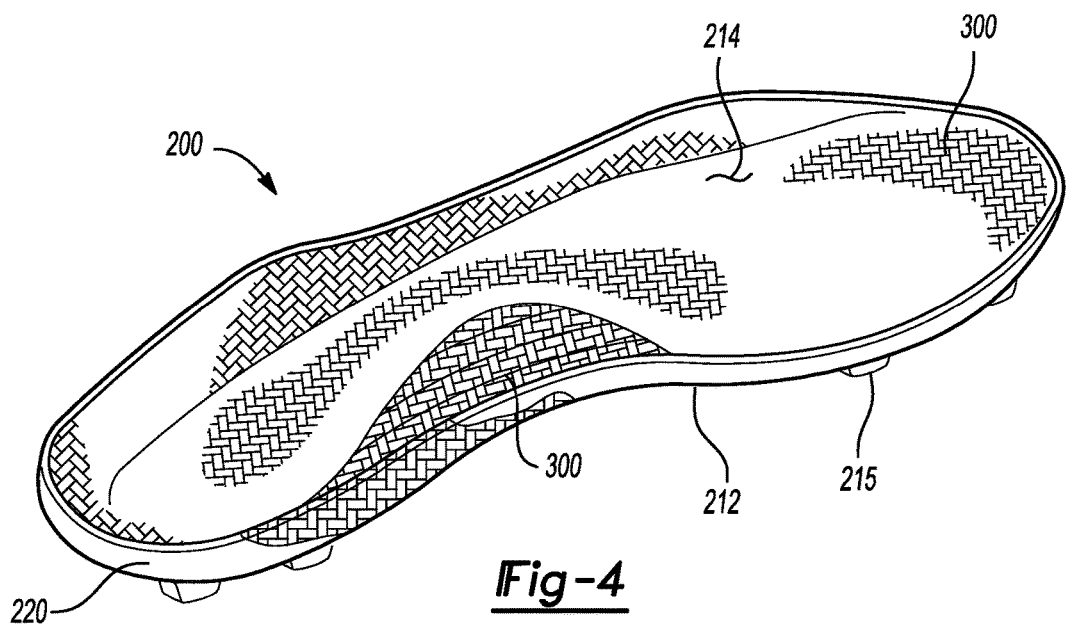
FIG. 4 is a top perspective view of a composite footwear plate of FIG. 1 showing an inner surface of the footwear plate having a shape that conforms to a surface profile of a bottom surface of a foot.
Figure 5:
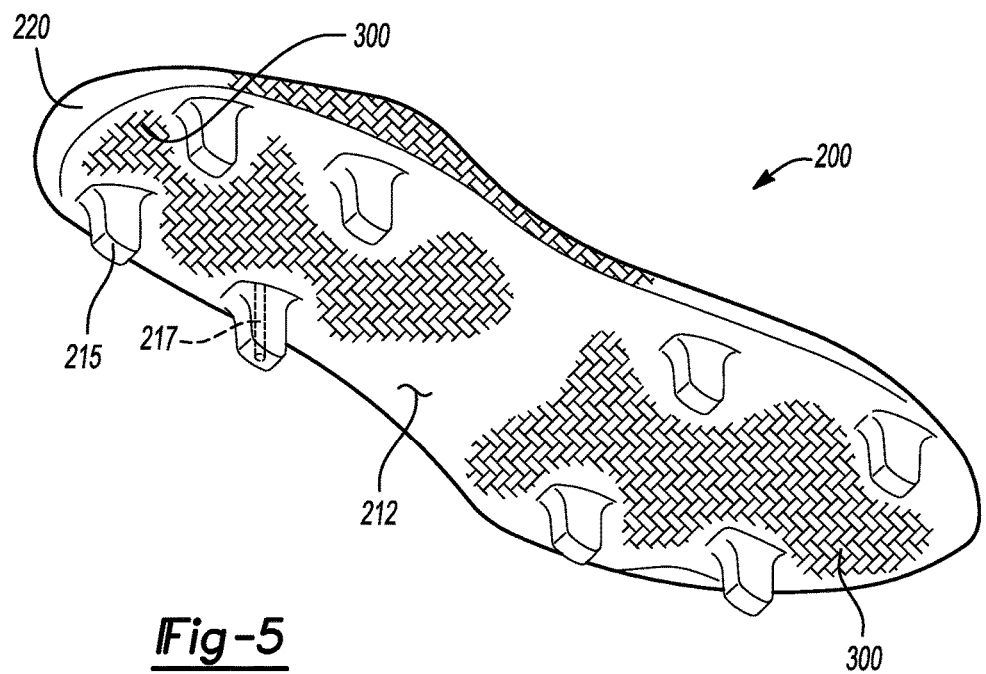
FIG. 5 is a bottom perspective view of a composite footwear plate of FIG. 1 showing a plurality of protruding members extending from a ground-engaging surface of the footwear plate.

The footwear plate 200 defines a longitudinal axis L that extends through the forefoot portion 12, the mid-foot portion 14, and the heel portion 16. The plate 200 attaches to the upper 100 and may impart features that a conventional outsole provides. FIGS. 4 and 5 provide top (FIG. 4) and bottom (FIG. 5) perspective views of the embroidered plate 200 showing the plate 200 having a ground-engaging surface 212 and an opposite inner surface 214 that opposes the footbed surface 222. In some examples, an outsole material, such as rubber, is attached to the ground-engaging surface 212 to provide traction with the ground surface. The inner surface 214 may be contoured to the shape of the footbed surface 222 (e.g., strobel) to conform to the profile of the bottom surface (e.g., plantar) of the foot within the interior void 102. In some examples, a sidewall 220 extends around a perimeter of the plate 200 between the ground-engaging surface 212 and the inner surface 214. The sidewall 220 and the inner surface 214 of the plate 200 may cooperate to retain and support the foot upon the plate 200 when the interior void 102 receives the foot therein. For instance, the sidewall 220 may define a rim around the perimeter of the contoured inner surface 214 to cradle the foot during use of the footwear 10 when performing walking, running, and/or lateral movements. In some implementations, portions of the sidewall 220 extend around the upper 100 and attach to exterior surfaces of the upper 100 at one or more locations to secure the plate 200 to the upper 100. Adhesives may be used to secure the plate 200 to the upper 100.

In some examples, one or more protruding elements 215 (e.g., cleats/traction elements) extend from the ground-engaging surface 212 in a direction away from the plate 200 and the upper 100 to provide traction with soft ground surfaces, such as grass. For instance, a cleat shaft 217 associated with each protruding element 215 may attach to the ground-engaging surface 212 of the plate 200 and extend in a direction substantially perpendicular to the longitudinal axis L of the plate 200. In another configuration, an article of footwear 10h of FIGS. 50-57 includes protruding elements 215h that are integrally formed, e.g., via molding, with a footwear plate 200h at multiple locations (i.e., discrete regions) along an outer surface 212h of the footwear plate 200h.

In some implementations, the footwear plate 200 is substantially rigid and formed from one or more composite materials. By contrast to conventional composite plates formed from unidirectional tapes that only afford directional stiffness properties, the footwear plate 200 is formed from one or more strand portions 300 arranged in selected patterns to impart anisotropic stiffness and gradient load paths throughout the plate 200. Each strand portion 300 may refer to a tow of a plurality of fibers 350, a monofilament, yarn, or polymer pre-impregnated tows that include ribbon or strips of unidirectional tape. The present disclosure will refer to each strand portion 300 as a corresponding tow 300 of fibers 350 unless indicated otherwise. As used herein, the term "tow" refers to a bundle (i.e., plurality) of filaments (e.g., fibers 350) that may be twisted or untwisted and each tow may be designated a size associated with a number of fibers 350 the corresponding tow 300 contains. For instance, the at least one tow 300 forming the footwear plate 200 may range in size from about 1,000 fibers per bundle to about 48,000 fibers per bundle.

In some configurations, the fibers 350 associated with the at least one tow 300 include at least one of carbon fibers, boron fibers, glass fibers, and polymeric fibers. The polymeric fibers can be formed of a thermoplastic material or a thermoset material. The polymeric fibers can compositionally comprise a polyurethane, a polyamide, a polyester, a polyether, a polyurethane co-polymer, a polyamide co-polymer, a polyester co-polymer, a polyether co-polymer, and any combination thereof. The polyurethane can be a thermoplastic polyurethane (TPU). The polymeric fibers can compositionally comprise polyethylene terephthalate (PET). The polymeric fibers can compositionally comprise an aramid. The polymeric fibers can compositionally comprise poly (p-phenylene-2,6-benzobisoxazole) (PBO).

Additionally, at least a portion of the fibers 350 associated the at least one tow 300 may be formed from a first thermoplastic material. Fibers such as carbon fibers, aramid fibers, and boron fibers may provide a high modulus while glass fibers (e.g., fiberglass) and polymer fibers (e.g., synthetic fibers) provide a medium modulus.

In some examples, the density of fiber per unit area varies within a single tow 300 of fibers 350. Additionally or alternatively, the type of fibers 350 forming a corresponding tow 300 may vary across the plate 200 between the forefoot region 12 and the heel region 16 and between the lateral side 18 and the medial side 20. In doing so, the plate 200 can be designed to have a stiffness gradient based on anatomical features of the foot. For instance, a stiffness of the plate 200 may increase along the length of the plate 200 from the forefoot portion 12 to the heel portion 14. In some examples, the patterns for each tow 300 of fibers 350 provides a stiffness gradient between the lateral side 18 and the medial side 20 of the plate 200 through at least one of the portions 12, 14, 16. For instance, the stiffness of the plate 200 in the forefoot portion 12 may increase in a direction from the medial side 20 to the lateral side 18. Thus, the one or more tows 300 of fibers 350 may include paths with multiple curves to steer around voids and/or to change directions in the load path of the plate 200 to accommodate anatomical features as well as to enhance performance of the footwear 10 for its intended use. In some implementations, the plate 200 is formed by embroidering at least two tows 300 of fibers 350 in a layered configuration while being affixed to a same substrate 400 (FIG. 6). In other implementations, the plate is formed by affixing at least two tows 300 of fibers 350 separately to corresponding substrates and stacking the substrates such that the at least two tows 300 of fibers 350 are embroidered in a layered configuration. As used herein, the substrate 400 refers to any one of a veil, carrier, or backer at which the at least one tow 300 of fibers 350 affix to and bind with. The substrate 400 may be formed from a thermoset polymeric material or a thermoplastic polymeric material and can be a textile (e.g., knit, woven, or non-woven), an injection molded article, formed from an organosheet, or a thermoformed article.

Generally, it is difficult to manufacture a non-flat (e.g., curved/contoured) and substantially rigid composite plate in its final state from a preform plate that is initially rigid and flat in shape. Implementations herein are directed toward an embroidered preform that affixes the one or more tows 300 of fibers 350 to the same substrate 400 or different substrates 400 and applying heat to mold the embroidered preform to form the footwear plate 200 with a desired shape and curvature. Thereafter, the plate 200 may be cured to impart structural rigidity. That is to say, both the substrate(s) 400 and each tow 300 of fibers 350 are thin and flexible to allow the embroidered preform to be positioned into a mold to form the plate 200 with a three-dimensional shape having structural rigidity. In some examples, manufacturing the plate 200 includes infusing liquid thermoplastic material into the embroidered preform (e.g., one or more tows 300 of fibers 350 affixed to the substrate 400) and using vacuum molding and/or compression molding techniques to form the plate 200. The liquid thermoplastic material may include at least one of polymerizable compositions or pre-polymer materials. Additional polymers/toughening agents (such as softer polymers, rubber, and/or block copolymers) may be added to the liquid thermoplastic material to reduce brittleness of the plate 200.

In other examples, the substrate 400, or a portion thereof, is formed from a thermoset polymeric material and/or a thermoplastic polymeric material. The thermoplastic polymeric material includes a melting point below a melting point or degradation temperature of the fibers 350 of the tows 300. Here, incorporating the thermoplastic material and/or the thermoset polymeric material into the substrate 400 may be used in addition to, or in lieu of, the liquid thermoplastic material infused into the embroidered preform to melt/infuse the embroidered preform during the vacuum molding process and/or the compression molding process. Additionally or alternatively, thermoplastic yarns may be commingled with the fibers 350 of the one or more tows 300 to assist with melting/infusing the embroidered preform during vacuum molding or compression molding. Optionally, the embroidered preform may be power coated with the thermoset and/or thermoplastic polymeric materials or injection-molding techniques may be used to overmold and/or impregnate the embroidered preform with the thermoset and/or thermoplastic polymeric materials FIG. 6 provides a top view of an example substrate 400 used for forming the footwear plate 200. The substrate 400 may be substantially thin, flat, and flexible. As set forth above, the substrate 400, or at least a portion thereof, may be formed from a thermoset polymeric material or a thermoplastic polymeric material. In some configurations, the substrate 400 includes a textile that may be knit, woven, or non-woven. The substrate 400 may also optionally be formed from an injection molded article, a thermoformed article, or an organosheet. The substrate 400 may be cut to a desired shape defined by a perimeter edge 402.

FIG. 7 provides a top view of a first tow 300, 310 of fibers 350 affixed/attached to a top surface 410 of the substrate 400 of FIG. 6 to form a first layer on the substrate 400. The first tow 310 (i.e., first strand portion) forms a first void 316 in the forefoot portion 12 and a second void 318 in the heel portion 16 of the substrate 400. In some examples, the first tow 310 of fibers 350 includes a plurality of first segments 312 that each extend between two different locations along the substrate to form the first layer thereon and define the voids 316, 318 to expose the substrate 400 therein. For instance, a portion of the first segments 312 may extend between two different locations along the peripheral edge 402 of the substrate 400 in regions where the voids 316, 318 are absent. Other portions of the first segments 312 extend between a first location along the peripheral edge 402 of the substrate 400 to a second location at an interior region of the substrate 400 associated with a boundary of one of the voids 316, 318. The first segments 312 may be disposed adjacent and substantially parallel to one another. In some examples, the first segments 312 are applied to the substrate 400 at a first angle relative to the longitudinal axis L of the substrate 400. The first tow 310 of fibers 350 may also include first looped portions 313 disposed proximate to the peripheral edge 402 of the substrate 400 that are operative to connect adjacent first segments 312. FIG. 7 shows the first tow 310 of fibers 350 including curved paths that change directions based on anatomical features of the foot.

In some configurations, the first tow 310 of fibers 350 attaches to the substrate 400 via first stitching 314. For example, the first stitching 314 may zigzag across the first tow 310 between first attachment locations located on the substrate 400. The first stitching 314 may penetrate the substrate 400 at the first attachment locations. Here, the attachment locations may be spaced apart from the first tow 310 along the perimeter edge 402 of the substrate 400 as well as around the portions of the substrate 400 exposed within the voids 316, 318. The first stitching 314 may be formed from the same material as the substrate 400 or the first stitching 314 may be formed from a different material than the material forming the substrate 400 such that the first stitching 314 is associated with a higher melting point than the substrate 400. Providing the stitching 314 with a higher melting point than the substrate 400 allows the stitching 314 to melt after the substrate 400 when heat is applied, thereby allowing the stitching 314 to retain the first tow 310 of fibers 350 when the substrate 400 begins to melt. In some examples, the first stitching 314, or at least a portion thereof, is formed from resin.

FIG. 8 provides a top view of the first tow 310 of fibers 350, a second tow 320 of fibers 350, and a third tow 330 of fibers 350 affixed/attached to the substrate 400 of FIG. 6 in a layered configuration to form the embroidered preform that may be heated, molded, and cured to form the three-dimensional and substantially rigid footwear plate 200. Other configurations may include each tow 310, 320, 330 affixed/attached to different substrates 400 and layered to provide a stacked substrate 400. The substrate(s) 400 and/or tows 310, 320, 330 may be trimmed prior to applying at least one of heat and pressure to form the substantially rigid, three-dimensional footwear plate 200.

Figure 9:
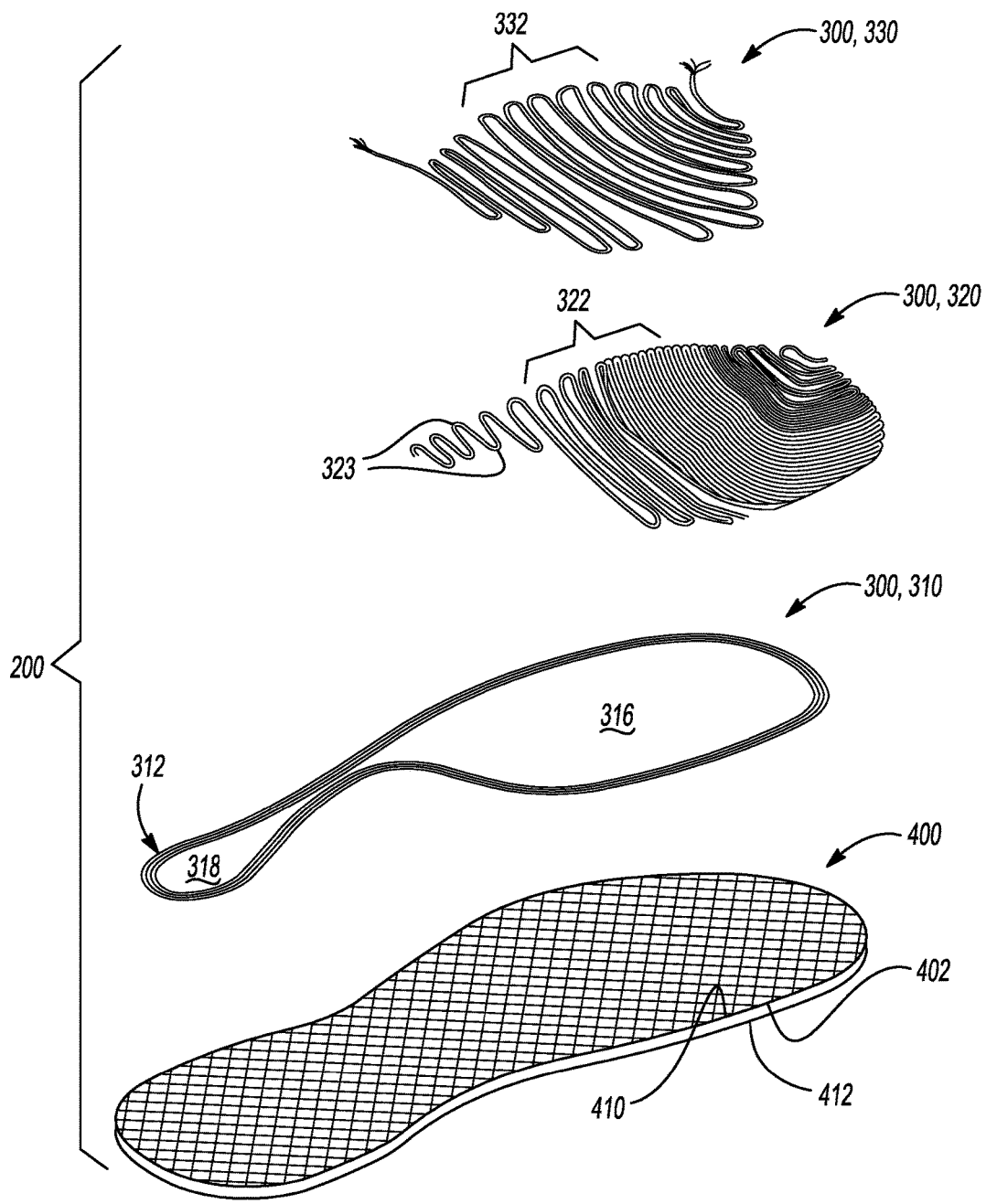
FIG. 9 is an exploded view of the embroidered preform of FIG. 8 showing the first, second, and third tows of fibers and the substrate.

FIGS. 9 and 10 provide exploded (FIG. 9) and side-by-side (FIG. 10) views of the embroidered preform of FIG. 8 showing each one of the substrate 400, the first tow 310, the second tow 320, and the third tow 330 such that each tow 310, 320, 330 is formed from separate corresponding strands/bundles of fibers 350. For example, at least one of the first tow 310, the second tow 320, and the third tow 330 is formed from a corresponding continuous strand of fibers 350. In other configurations, however, the tows 310, 320, 330 may all be formed from the same continuous strand/bundle of fibers 350. The tows 310, 320, 330 may attach to the top surface 410 of the substrate 400 without penetrating a bottom surface 412 disposed on an opposite side of the substrate 400 than the top surface 410.

In some examples, the first tow 310 is associated with a first shape and the second tow 320 is associated with a second shape that is different than the first shape. Similarly, the third tow 330 is associated with a third shape that may be different than the first and third shapes. Accordingly, the layers associated with at least two of the tows 310, 320, 330 may be anisotropic. Other configurations may include the first shape being approximately the same as the second shape and/or the third shape. In some implementations, at least two of the tows 310, 320, 330 have approximately the same length. By contrast, other implementations include at least two of the tows 310, 320, 330 having different lengths. For instance, the examples of FIGS. 8 and 9 show the first tow 310 of fibers 350 defining a length that extends through the forefoot, mid-foot, and heel portions 12, 14, 16, the second tow 320 of fibers 350 defining a second length shorter than the first length that extends through the forefoot and mid-foot portions 12, 14, and the third tow 330 of fibers 350 defining a third length shorter than the second length that extends within the forefoot and mid-foot portions 12, 14 of the substrate 400. Each tow 310, 320, 330 may be designed with an emphasis to provide corresponding performance characteristics different from the corresponding performance characteristics provided by the other tows 310, 320, 330. Moreover, the layered configuration of the tows 310, 320, 330 may provide a variable thickness throughout the forefoot, mid-foot, and heel portions 12, 14, 16 of the substrate 400

In some implementations, the second tow 320 (i.e., second strand portion) is disposed on the first layer (e.g., the first tow 310) and includes second segments 322 that each extend between two different locations along the peripheral edge 402 of the substrate 400 to form a second layer on the first layer. The second segments 322 may be convergent with the first segments 312. The first tow 310 of fibers 350 and the second tow 320 of fibers 350 may be formed from the same or different materials. For instance, the first tow 310 and/or the second tow 320 may include at least one of carbon fibers, boron fibers, glass fibers, and polymeric fibers. In some examples, the second tow 320 of fibers 350 includes approximately the same number of fibers 350 as the first tow 310 of fibers 350. In other examples, the second tow 320 of fibers 350 includes a different number of fibers 350 than the first tow 310 of fibers 350. As with the first tow 310, the second tow 320 of fibers 350 may include second looped portions 323 (FIGS. 8 and 9) disposed proximate to the peripheral edge 402 of the substrate 400 for connecting adjacent second segments 322. In some configurations, one or more of the looped portions 323 extend beyond the peripheral edge 402 of the substrate 400 and create pinch points when the layered configuration is subjected to pressure (e.g., molding) for consolidating the fibers 350 to form the footwear plate 200. Accordingly, FIG. 8 shows the second tow 320 of fibers 350 cut along the peripheral edge 402 of the substrate 400 to remove the looped portions 323, thereby removing the presence of pinch points when applying pressure to form the finished footwear plate 200. Thus, adjacent second segments 322 may be disconnected at the peripheral edge of the substrate 400 once the corresponding looped portions 323 are removed (e.g., by cutting).

The second tow 320 of fibers 350 may attach to the substrate 400 via second stitching 324 that may zigzag across the second tow 320 between second attachment locations located on the substrate 400. In some examples, the second stitching 324 penetrates the substrate 400 at the second attachment locations. Additionally or alternatively, the second stitching 324 may extend through the first tow 310 of fibers 350. In other words, the second stitching 324 may attach the second tow 320 of fibers 350 to the substrate 400 by crossing over the second tow 320 of fibers 350, extending through the first tow 310 of fibers, and penetrating the substrate 400 at the second attachment locations.

In some scenarios, the first stitching 314 and/or the second stitching 324 is formed from resin. Additionally or alternatively, at least one of the first stitching 314 and the second stitching 324 is formed from the same material as the substrate 400. In some configurations, at least one of the first stitching 314 and the second stitching 324 has a higher melting point than the substrate 400. Here, the higher melting point allows the stitching(s) 314, 324 to melt after the substrate 400 begins to melt during thermal processing so that the corresponding tows 310, 320 are kept in place by the stitching(s) 314, 324. The stitching(s) 314, 324 may also include materials that match optional infused polymers used for compression molding and/or vacuum molding.

The third tow 330 (i.e., third strand portion) is disposed on the second layer (e.g., the second tow 320) and includes third segments 332 that each extend between two different locations along the peripheral edge 402 of the substrate 400 to form a third layer on the second layer. As with the first segments 312 of the first tow 310, the second segments 322 and the third segments 332 of the corresponding second and third tows 320, 330 may each be disposed adjacent and substantially parallel to one another. FIG. 8 shows the second segments 322 of the second tow 320 of fibers 350 applied to the substrate at a second angle relative to the longitudinal axis of the substrate 400 that is different than the first angle associated with the first segments 312 of the first tow 310 of fibers 350. While FIG. 8 also shows the third segments 332 of the third tow 330 applied to the substrate 400 at a third angle relative to the longitudinal axis of the substrate 400 that is different than both the first angle associated with the first segments 312 and the second angle associated with the second segments 322, the third angle may be the same as one of the first angle and the second angle but different from the other one of the first angle and the second angle. In other words, other configurations may include the third tow 330 having third segments 332 that is convergent with only one of the first segments 312 and the second segments 322.

In some configurations, the third tow 330 of fibers 350 attaches to the substrate 400 via third stitching 334 that zigzags across the third tow 330 between third attachment locations located on the substrate 400. In some examples, the third stitching 334 penetrates the substrate 400 at the third attachment locations. Additionally or alternatively, the third stitching 334 may extend through at least one of the first tow 310 of fibers 350 and the second tow 320 of fibers 350. In other words, the third stitching 334 may attach the third tow 330 of fibers 350 to the substrate 400 by crossing over the third tow 330 of fibers 350, extending through the first tow 310 and/or the second tow 320, and penetrating the substrate 400 at the third attachment locations.

Referring to FIG. 11, a close-up view shows a portion of the first tow 300, 310 of fibers 350 attached to the substrate 400 via the first stitching 314. The first tow 310 is disposed upon the top surface 410 of the substrate 400 and the first stitching 314 crosses (e.g., zigzags) over the first tow 310 and penetrates the substrate 400 at the first attachment locations 315 that are spaced apart from the first tow 310. The substrate 400 and the first stitching 314 may be formed from thermoplastic polymer materials that melt during the thermal processing. The first stitching 314 may be formed from a first thermoplastic polymer material and the substrate 400 may be formed from a second thermoplastic polymer material having a lower melting temperature than the first thermoplastic polymer material. Thus, the first stitching 314 may retain the first tow 310 of fibers 350 in place without melting when the substrate 400 begins to melt during thermal processing. The fibers 350 associated with the first tow 310 may include non-polymer fibers 352 and polymer fibers 354. For instance, the non-polymer fibers 352 may include carbon fibers, glass fibers, aramid fibers, and/or boron fibers. The polymer fibers 354, on the other hand, may include thermoplastic polymer fibers having a higher melting temperature than that of the thermoplastic polymer materials used to form the substrate 400 and/or the first stitching 314. Moreover, the thermoplastic polymer materials used to form the substrate 400 may include a melting temperature that is below a degradation temperature associated with the non-polymer fibers 352 (e.g., carbon fibers).

FIG. 12 provides a cross-sectional view taken along line 12-12 of FIG. 11 showing the first stitching 314 attaching the first tow 310 of fibers 350 to the top surface 410 of the substrate 400. The first stitching 314 may penetrate through the surfaces 410, 412 of the substrate 400 and zigzag across the first tow 310 between the first attachment locations 315. The non-polymer fibers 352 (e.g., carbon fibers) and the polymer fibers 354 (e.g., thermoplastic polymer fibers) may include circular cross sections that co-mingle with each other throughout the length of the first tow 310.

FIG. 13 provides another tow 300a of fibers 350 attached to the substrate 400 and forming a first layer on the substrate 400. The tow 300a of fibers 350 includes a pattern of segments 302 that are disposed adjacent and substantially parallel to one another. Whereas the first segments 312 of the first tow 310 of fibers 350 of FIGS. 7-10 define voids 316, 318 exposing the substrate 400, the segments 302 extend continuously between two different locations along the peripheral edge 402 of the substrate 400 to form the first layer covering the substrate 400 without defining any voids, i.e., the segments 302 extend across the substrate 400 between the lateral and medial sides. The segments 302 may extend in a direction that converges with the longitudinal axis of the substrate 400. Referring to FIG. 14, a detailed view within phantom circle 14 of FIG. 13 shows the tow 300a including looped portions 303 disposed proximate to the peripheral edge 402 of the substrate 400 for connecting adjacent segments 302. Moreover, the tow 300a of fibers 350 may attach to the substrate 400 via stitching 304 that may zigzag across the tow 300a between attachment locations 305 located on the substrate 400.

FIGS. 15 and 16 provide exploded (FIG. 15) and side-by-side (FIG. 16) views of an embroidered preform used to form a three-dimensional and substantially rigid footwear plate 200a that may affix to the upper 100 of the article of footwear 10. In view of the substantial similarity in structure and function of the components associated with the footwear plate 200 with respect to the footwear plate 200a, like reference numerals are used hereinafter and in the drawings to identify like components while like reference numerals containing letter extensions are used to identify those components that have been modified.

The embroidered preform associated with the footwear plate 200a includes the substrate 400, a first tow 310a of fibers 350, a second tow 320a of fibers 350, and a third tow 330a of fibers arranged in a layered configuration. The tows 310a, 320a, 330a may be formed from the same continuous strand/bundle of fibers 350 or at least one of the tows 310a, 320a, 330a may be formed from a different continuous strand/bundle of fibers 350. As with the tows 310, 320, 330 of FIGS. 8-10, the tows 310a, 320a, 330a may attach to the top surface 410 of the substrate 400 without penetrating the bottom surface 412 of the substrate 400 via stitching 314, 324, 334 that crosses over corresponding tows 310a, 320a, 330a between attachment locations disposed on the substrate 400. The tows 310a, 320a, 330a of fibers 350 may also similarly include at least one of carbon fibers, boron fibers, glass fibers, and polymeric fibers.

The first tow 310a of fibers 350 includes first segments 312a that each extend between two different locations along the peripheral edge 402 of the substrate 400 to form a first layer on the substrate 400 (e.g., upon the top surface 410). The first segments 312 are disposed adjacent and substantially parallel to one another. FIG. 16 shows the first segments 312a applied to the substrate at a first angle $\alpha_1$ relative to the longitudinal axis L of the substrate 400.

The second tow 320a of fibers 350 includes second segments 322a that each extend between two different locations along the peripheral edge 402 of the substrate 400 to form a second layer on the first layer. Here, the second segments 322a are convergent with the first segments 312a and disposed adjacent and substantially parallel to one another. For instance, the second segments 322a may be applied to the first layer at a second angle $\alpha_2$ relative to the longitudinal axis L of the substrate 400 that is different than the first angle $\alpha_1$. In some examples, the first layer associated with the first tow 310a and the second layer associated with the second tow 320a are anisotropic to impart gradient stiffness and gradient load paths throughout the plate 200a.

The third tow 330a of fibers 350 includes third segments 332a that each extend between two different locations along the peripheral edge 402 of the substrate 400 to form a third layer on the second layer. Here, the third segments 332a are convergent with the first segments 312a and the second segments 322a and disposed adjacent and substantially parallel to one another. For instance, the third segments 332a may be applied to the second layer at a third angle $\alpha_3$ relative to the longitudinal axis L of the substrate 400 that is different than the first angle $\alpha_1$ and the second angle $\alpha_2$. Other configurations may include attaching each tow 310a, 320a, 330a to a separate corresponding substrate and stacking the substrates to form a substrate stack such that the first tow 310a is disposed between a bottom substrate and an intermediate substrate, the second tow 320a is disposed between the intermediate substrate and a top substrate, and the third tow is disposed upon the top substrate.

FIGS. 17-20 provide an embroidered preform used to form a three-dimensional and substantially rigid footwear plate 200b that may affix to the upper 100 of the article of footwear 10. In view of the substantial similarity in structure and function of the components associated with the footwear plate 200 with respect to the footwear plate 200b, like reference numerals are used hereinafter and in the drawings to identify like components while like reference numerals containing letter extensions are used to identify those components that have been modified.

FIG. 17 provides a top view of the preform plate 200b including a first tow 310b of fibers 350 and a second tow 320b of fibers disposed upon the top surface 410 of the substrate 400. Stitching may attach the tows 310b, 320b to the substrate 400 at corresponding attachment locations that may penetrate the substrate 400 through the top and bottom surfaces 410,412. The first tow 310b (i.e., first strand portion) may define a plurality of first segments 312b that each extend between two different locations along the substrate 400 to form a layer thereon and define a first void 316b in the forefoot portion 12 and a second void 318b in the heel portion 16 of the substrate 400. The second tow 320b is operative as an outer reinforcement area disposed along the perimeter edge 402 of the substrate 400 such that the fibers 350 of the second tow 320b surround the first segments 312b associated with the first tow 310b of fibers 350. The preform plate 200b may optionally include a third tow 330b of fibers 350 that operate as an inner reinforcement area surrounding the first void 316b in the forefoot portion 12. Here, the outer and inner reinforcement areas defined by the second and third tows 320b, 330b may provide additional reinforcement or structural support for the first segments 312b of the first tow 310b in regions between the first void 316b and the perimeter edge 402 of the substrate 400. The example shows the third tow 330b forming a third void 336b that is spaced apart from the second void 318b but aligned with the first void 316b to expose the substrate 400. While not shown in FIG. 17, the preform plate 200b may also include a fourth tow of fibers operative as a corresponding inner reinforcement area surrounding the second void 318b in the heel portion 16 in the same manner as the third tow 330b reinforces the first segments 312b surrounding the first void 316b.

Referring to FIG. 18, a cross-sectional view taken along line 18-18 of FIG. 17 shows the second tow 320b of fibers 350 disposed along the perimeter edge 402 of the substrate 400 to provide the outer reinforcement area for the first tow 310b of fibers 350. The tows 310b, 320b may have approximately the same length or may have different lengths. In some implementations, the tows 310b, 320b are formed from the same materials. For instance, the fibers 350 associated with the tows 310b, 320b may include at least one of the non-polymer fibers 352 (e.g., carbon fibers, glass fibers and/or aramid fibers, and/or boron fibers) and the polymer fibers 354. As set forth above, the polymer fibers 354 may include thermoplastic polymer fibers having a higher melting temperature than that of thermoplastic polymer materials (if any) used to form the substrate 400. In other implementations, the tows 310b, 320b are formed from different materials.

FIG. 19 provides an alternate cross-sectional view taken along line 18-18 of FIG. 17 showing a polymeric material 520 providing the outer reinforcement area for the first tow 310b of fibers 350. Here, the polymeric material 520 may include a single strand of material (i.e., with a circular cross-section) that replaces the second tow 320b of fibers 350 by extending along the perimeter edge 402 of the substrate 400. The polymeric material 520 may include a thermoplastic polymeric material or a thermoset polymeric material having a higher melting temperature than a melting temperature of polymeric materials forming the substrate 400 so that the polymeric material 520 reinforces the first tow 310b of fibers 350 along the perimeter edge 402 of the substrate 400 as the substrate 400 begins to melt.

FIG. 20 provides another alternate cross-sectional view taken along line 18-18 of FIG. 17 showing the first tow 310b of fibers 350 attached to a substrate 400a having the top surface 410 opposing the first tow 310b and the bottom surface 412 disposed on an opposite side of the substrate 400a than the top surface 410. Whereas the second tow 320b or the polymeric material 520 attaches to the substrate 400 of FIGS. 17-19 to provide the outer reinforcement area for the first tow 310b of fibers 350, the substrate 400a includes a fold 414 along a perimeter edge 402a to double a thickness of the substrate 400a for providing the outer reinforcement area for the first tow 310b of fibers 350.

FIGS. 21-24 provide an embroidered preform used to form a three-dimensional and substantially rigid footwear plate 200c having an arch support 202 that may affix to the upper 100 of the article of footwear 10. In view of the substantial similarity in structure and function of the components associated with the footwear plate 200 with respect to the footwear plate 200c, like reference numerals are used hereinafter and in the drawings to identify like components while like reference numerals containing letter extensions are used to identify those components that have been modified.

FIG. 21 provides a top view of the preform plate 200c including a tow 300c of fibers 350 disposed on a substrate 400c local to an arch area 425 of the plate 200c to provide the arch support 202 for the foot. When the plate 200c is formed, e.g., by thermo-processing and molding the substrate 400c and the tow 300c of fibers 350 into the three-dimensional plate 200c, the concentration of the tow 300c of fibers 350 providing the arch support 202 imparts structural support and increases stability for the foot in the arch area 425 of the footwear 10. In some examples, the tow 300c of fibers 350 attach to an arch-shaped substrate 420 disposed upon a top surface 410c of the substrate 400c to form a substrate stack in the arch area 425. For example, the tow 300c of fibers 350 may include a plurality of segments 302c that extend between and attach to the arch-shaped substrate 420 via stitching that crosses over the tow 300c and penetrates the arch-shaped substrate 420. The arch-shaped substrate 420 may affix to the substrate 400c before, during, or after the tow 300c affixes to the arch-shaped substrate 420. In some configurations, the arch-shaped substrate 420 is positioned upon the top surface 410c of the substrate 400c and the stitching is operative to attach both the tow 300c of fibers 350 to the arch-shaped substrate 420 and the arch-shaped substrate 420 to the substrate 400c as the stitching crosses over the tow 300c and penetrates both the arch-shaped substrate 420 and the substrate 400c. In other configurations, the arch-shaped substrate 420 having the tow 300c of fibers 350 attached thereto is subsequently attached to the substrate 400c in the arch area 425. In these configurations, additional stitching may be used to attach the substrates 400c, 420 together or the substrates 400c, 420 form a stack and attach to one another when subjected to compression molding and/or vacuum molding. Here, thermoplastics or other materials may be applied between the substrates 400, 420 to facilitate attachment during the compression molding and/or the vacuum molding.

Referring to FIG. 22, in some implementations, a continuous substrate 400c integrally forms the arch support 202 by folding/layering/tufting material of the substrate 400c local to the arch area 425. Here, the folding/layer/tufting the substrate 400c provides an increased thickness in the arch area 425 to impart a desired profile and stiffness of the arch support 202 once the three-dimensional footwear plate 200c is formed. In some examples, one or more of the tows 300 (e.g., tows 300a, 310, 310a, 320, 320b, 330, 330c) additionally attach to the substrate 400c to provide gradient stiffness and gradient load paths throughout the plate 200c in addition to the arch support 202.

FIGS. 23 and 24 provide exploded (FIG. 23) and perspective (FIG. 24) views of the tow 300c of fibers 350 attached directly to the top surface 410c of the substrate 400 without using the intermediary arch-shaped substrate 420. The tow 300c of fibers 350 may be disposed upon the substrate 400 local to an arch area 425 and attached thereto using any of the aforementioned stitching techniques.

FIGS. 25-28 provide an embroidered preform used to form a three-dimensional and substantially rigid footwear plate 200d having a heel counter 204 and that may affix to the upper 100 of the article of footwear 10. In view of the substantial similarity in structure and function of the components associated with the footwear plate 200 with respect to the footwear plate 200d, like reference numerals are used hereinafter and in the drawings to identify like components while like reference numerals containing letter extensions are used to identify those components that have been modified.

FIG. 25 shows a partial rear perspective view of the heel counter 204 formed from a tow 300d of fibers 350 attached to a top surface 410d of a substrate 400d. In some examples, the tow 300d of fibers 350 attaches to the substrate 400d via stitching. The tow 300d of fibers 350 may extend around the perimeter edge 402 of the substrate 400d in the heel portion 16 and in a direction away from the top surface 410d of the substrate 400d. For instance, the tow 300d may include a plurality of segments 302d extending around the perimeter edge 402 in the heel portion 16 from the lateral side 18 to the medial side 20 and layered upon one another to form sequential layers on the substrate 400c. Thickness and/or density of the fibers 350 included in the tow may vary in each segment 302d to provide desirable stiffness and rigidity properties for the heel counter 204.

Referring to FIG. 26, in some implementations, the substrate 400d includes a raised back portion 404 that extends around the perimeter edge 402 of the substrate 400d in the heel portion 16 and in the direction away from the top surface 410d of the substrate 400d. The example shows the raised back portion 404 integrally formed from the substrate 400d by folding excess material in the heel portion 16 of the substrate 400d. Here, the raised back portion 404 is operative as an outer reinforcement or support for the tow 300d of fibers 350 of FIG. 25 and cooperates with the tow 300d of fibers 350 to form an integral heel counter 204a. In some examples, the tow 300d of fibers 350 attaches to the back portion 404 of the substrate 400d via stitching in addition to, or in lieu of, stitching attaching the tow 300d to the top surface 410d of the substrate 400d. For instance, stitching may penetrate through and/or across individual ones of the segments 302d to attach the tow 300d of fibers 350 to the raised back portion 404. At least one of the fibers 350, stitching, and substrate 400 may include polymer materials (e.g., thermoplastic or thermoset polymeric materials) to integrally form the heel counter 204a from the raised back portion 404 of the substrate 400d and the tow 300d of fibers 350 when heat is applied and the embroidered preform is subjected to compression molding and/or vacuum molding.

Whereas FIG. 26 shows the raised back portion 404 integral with the substrate 400c via folding substrate 400d material, FIG. 27 provides an alternative raised back portion 404a formed from a separate piece of material that attaches to the substrate 400d. In some examples, the raised back portion 404a is formed from the same material as the substrate 400d. The raised back portion 404a may attach to the substrate 400d around the perimeter edge 402 in the heel portion 16 at various attachment locations 403. Stitching may penetrate the substrate 400d and the raised back portion 404a at the various attachment locations 403 along the perimeter edge 402. The same or separate stitching may attach the tow 300d of fibers 350 to the raised back portion 404a and/or the top surface 410d of the substrate 400d. In some configurations, the raised back portion 404, 404a of FIGS. 26 and 27 may be embroidered directly to an upper 100 formed from a knit material to integrally form the finished heel counter 204, 204a with the upper 100.

In some examples, the raised back portion 404 and the tow 300d of fibers 350 provide a separate embroidered preform that may be subjected to pressure and/or heat to form the heel counter 204. For instance, the raised back portion 404 may include a substantially flat substrate and the segments 302d of the tow 300d may attach to the raised back portion 404 via stitching. The fibers 350 of the tow 300d may be co-mingled with thermoplastic polymer fibers and/or thermoplastic yarns and the raised back portion 404 may be formed from a thermoplastic film. The stitching may be formed from a same thermoplastic material as the thermoplastic film, but may include a higher melting point to hold the segments 302d in place as the thermoplastic film of the raised back portion 404 begins to melt. Additionally or alternatively, the embroidered preform including the tow 300d and the raised back portion 404 may be consolidated with liquid material including a thermoplastic material and/or a thermoset material to assist with affixing/bonding the tow 300d to the raised back portion 404 when pressure and heat is applied. Accordingly, the embroidered preform including the tow 300d and the raised back portion 404a may be positioned into a mold and pressure may be applied to the preform 300d, 404 by subjecting the preform 300d, 404 to at least one of compression molding and vacuum molding while enclosed within the mold to form the finished heel counter 204.

Due to the curvature requirements of the heel counter 204 having to extend around the perimeter of the heel region 16 of the footwear 10, in some examples, the heel counter 204 is formed by separately forming two separate halves. For instance, a first preform 300d, 404a may be subjected to the at least one of compression molding and vacuum molding while enclosed within the mold to form a first half of the finished counter 204, and a second preform 300d, 404 may be subjected to the at least one of compression molding and vacuum molding while enclosed within a mold to form a second half of the finished counter 204. Here, the first half may have a curvature that extends along the perimeter edge 402 of the substrate 400d in the heel region 16 from the lateral side 18 to the heel end, and the second half may have a curvature that extends along the perimeter edge 402 of the substrate 400d in the heel region 16 from the medial side 20 to the heel end. The first and second halves may be combined to form the whole heel counter 204.

FIG. 28 shows an example of the tow 300d of fibers 350 attaching to the substrate 400d to form the heel counter 204 around the perimeter edge 402 of the substrate 400d and a separate tow 300e of fibers 350 attached to the top surface 410d of the substrate 400d. Thus, the tows 300d, 300e of fibers 350 and the substrate 400d may cooperate to provide the embroidered preform used to form the three-dimensional and substantially rigid footwear plate 200d having the heel counter 204. Accordingly, the tow 300d attaches to the substrate 400d in the heel portion and includes a first pattern with first performance characteristics (e.g., a heel counter with desired stiffness and rigidity properties) while the other tow 300e attaches to the substrate 400d through all the portions 12, 14, 16 thereof and includes a second pattern different from the first pattern to provide the portions 12, 14, 16 at least a second performance characteristic different from the first performance characteristics.

FIGS. 29-36 provide a reinforcing cage 206 that may affix to a footwear plate 200e and/or an upper 100e of an article of footwear 10e. In view of the substantial similarity in structure and function of the components associated with the footwear plate 200 with respect to the footwear plate 200e, like reference numerals are used hereinafter and in the drawings to identify like components while like reference numerals containing letter extensions are used to identify those components that have been modified.

The reinforcing cage 206 provides a reinforcing structure that extends away from the footwear plate 200e and that may secure to exterior surfaces of the upper 100e or may extend between the material elements forming the upper 100e in order to secure the footwear plate 200e to the upper 100e. In some examples, the reinforcing cage 206 extends around the foot in the mid-foot portion 14, for example, to provide additional support for the foot. In these examples, the reinforcing cage 206 includes a lateral portion 268 that extends around the lateral side 18 of the footwear 10e and a medial portion 262 that extends around the medial side of the footwear 10e. Distal ends of the lateral portion 268 and the medial portion 262 may extend from away from the plate 200e toward corresponding distal ends to define a gap 265 therebetween that extends along the instep of the foot corresponding to at least a portion of a throat opening defined by the upper 100e. In some implementations, a flat intermediate portion 266 connects opposing ends of the lateral portion 268 and the medial portion 262 opposite the gap 265. Here, the intermediate portion 266 may provide increased reinforcement for the reinforcing cage 206 during use of the footwear 10e.

Referring to FIGS. 30 and 31, a reinforcing cage 206e includes corresponding lateral and medial portions 268e, 262e each defining a plurality of extensions 207 that extend along the lateral and medial sides 18, 20 of the upper 100e. Each extension 207 includes a corresponding aperture 209 formed therethrough that corresponds to an eyelet operative to receive a shoe lace (not shown), such as the fastener member 106 of FIGS. 1-3. For instance, the apertures 209 of the extensions 207 may receive the shoe lace of a lacing system that modifies the dimensions of the interior void, thereby securing the foot within the interior void 102 and facilitating entry and removal of the foot from the interior void 102. For instance, moving the shoe lace in a tightening direction may pull the extensions 207 of the lateral and medial portions 268e, 262e toward one another, thereby cinching the upper 100e to close the interior void 102 around the foot. FIG. 31 shows a corresponding tensile strand 211 attached to the footwear plate 200e at a plurality of discrete locations along each of the lateral and medial sides 18, 20 of the footwear 10e. Each tensile strand 211 extends through each aperture 209 of the extensions 207 defined by the corresponding lateral and medial portions 268e, 262e of the reinforcing cage 206a to assist in securing the reinforcing cage 206e to the footwear plate 200e.

In some configurations, the reinforcing cage 206 is integrally formed with a substrate 400e used to form a three-dimensional and substantially rigid footwear plate 200e. Referring to FIG. 32, a perfective view shows the footwear plate 200e including the reinforcing cage 206 integrally formed with the substrate 400e such that the lateral portion 268 extends from the top surface 410 of the substrate 400e along the lateral side 18 within the mid-foot portion 14 and the medial portion 262 extends from the top surface 410 of the substrate 400e along the medial side 20 in the mid-foot portion 14. In other configurations, FIG. 33 shows the reinforcing cage 206 and the substrate 400e formed separately and attached to one another using stitching 406 or other techniques for joining the cage 206 to the substrate 400e. FIG. 34 shows one or more tows 300 of fibers 350 attached to a top surface 410e of the substrate 400e to provide the embroidered preform plate 200e. Thereafter, the preform plate 200e may be subjected to heat and pressure to form the plate 200e with a three-dimensional shape and cured to impart structural rigidity to the plate 200e. The material(s) of the substrate 400e and the tows 300 of fibers 350 may cooperate to provide gradient stiffness and gradient load paths throughout the plate 200e.

Referring to FIGS. 35 and 36, in some implementations, one or more tows 310e, 320e are attached to both a reinforcing cage 206e and the top surface 410e of the substrate 400e. FIG. 35 shows a first tow 310e of fibers 350 attached to the top surface 410e of the substrate 400e and a second tow 320e of fibers 350 attached to the reinforcing cage 206e. While the second tow 320e is attached to interior surfaces of the reinforcing cage 206e relative to the view of FIG. 35, the second tow 320e may be attached to the exterior surface of the cage 206e without departing from the scope of the present disclosure. The reinforcing cage 206e may be integrally formed with the substrate 400e or the reinforcing cage 206 may be formed separately and attached to the substrate 400e via stitching or other techniques for joining the cage 206 to the substrate 400e. The first tow 310e may attach to the top surface 410e of the substrate 400e via stitching and/or the second tow 320e may attach to the reinforcing cage 206e via stitching. Additionally or alternatively, a polymeric material may be used to infuse the first tow 310e of fibers 350 to the substrate 400e while the interaction between the reinforcing cage 206e and the second tow of fibers 320e may be substantially free of the polymeric material. In some examples, the second tow 320e of fibers 350 infuses to the reinforcing cage 206e using a polymeric material different than a polymeric material used to infuse the first tow 310e of fibers 350 to the top surface 410e of the substrate 400e. Segments associated with the second tow 320e of fibers 350 may be more sparse and/or wider than the first tow 310e of fibers 350 to provide the reinforcing cage 206e with a reduced stiffness compared to that of the footwear plate 200e.

FIG. 36 shows the first tow 310e of fibers 350 attached to both the top surface 410e of the substrate 400e as well as to the reinforcing cage 206e. The first tow 310e of fibers 350 may exhibit properties on the reinforcing cage 206e that are different than the properties on the top surface 410e of the substrate 400e. For instance, the first tow 310e may be less stiff along the reinforcing cage 206e compared to the top surface 410e of the substrate 400e. Here, the first tow 310e may utilize different fibers 350 along the reinforcing cage 206e than the fibers 350 along the top surface 410e of the substrate 400e. Additionally or alternatively, the first tow 310e may define wider segments 312e that attach to the top surface 410e of the substrate 400e than segments 313e that attach to the reinforcing cage 206e. In some examples, polymeric material may be used to infuse the tow 310e to the substrate 400e while the reinforcing cage 206e is substantially free of polymeric material. Alternatively, the reinforcing cage 206e uses the same or a different polymeric material to attach the first tow 310e of fibers 350 thereto.

FIGS. 37-42 provide an embroidered preform used to form a three-dimensional and substantially rigid footwear plate 200f having a toe cap 270 and that may affix to the upper 100 of the article of footwear 10. In view of the substantial similarity in structure and function of the components associated with the footwear plate 200 with respect to the footwear plate 200f, like reference numerals are used hereinafter and in the drawings to identify like components while like reference numerals containing letter extensions are used to identify those components that have been modified.

The toe cap 270 may be located at a toe end of the forefoot portion 12 of the footwear plate 200f to provide reinforcement for the upper 100 as well as improved impact resistance around the toes of the foot. The toe cap 270 may include a sidewall 272 and a cover portion 274 that cooperate with the footwear plate 200f to define a toe receiving void 275 for receiving the toes of the foot. Referring to FIG. 38, in some configurations, the toe cap 270 is integrally formed with a substrate 400f used to form a three-dimensional and substantially rigid footwear plate 200f such that excess material of the substrate 400f extends around the perimeter edge 402 of the substrate 400f in the forefoot portion 12 to form the toe cap 270. In other configurations, FIG. 39 shows the toe cap 270 and the substrate 400f are formed separately and attached to one another using stitching 406f or other techniques for joining the cap 270 to the substrate 400f. FIG. 40 shows one or more tows 300 of fibers 350 attached to a top surface 410f of the substrate 400f to provide the embroidered preform plate 200f. Thereafter, the preform plate 200f may be subjected to heat and pressure to form the plate 200f with a three-dimensional shape and cured to impart structural rigidity throughout the plate 200f. The material(s) of the substrate 400f and the tows 300 of fibers 350 may cooperate to provide gradient stiffness and gradient load paths throughout the plate 200f.

Referring to FIGS. 41 and 42, in some implementations, one or more tows 300, 300f, 310f of fibers 350 are attached to both the top surface 410f of the substrate 400f and the toe cap 270. FIG. 41 the tows 300 of fibers 350 attached to the top surface 410f of the substrate 400f as shown in FIG. 40 and a different tow 310f of fibers 350 attached to the toe cap 270. While the tow 310f of fibers 350 is attached to exterior surfaces of the toe cap 270 relative to the view of FIG. 41, the tow 310f may be attached to the interior surfaces of the cap 270 without departing from the scope of the present disclosure. The tow 310f may attach to the toe cap 270 via stitching or other attachment techniques. Additionally or alternatively, a polymeric material may be used to infuse the tow 300 of fibers 350 to the substrate 400f while toe cap 270 is substantially free of the polymeric material. In some examples, the tow 310f of fibers 350 infuses to the toe cap 270 using a polymeric material different than a polymeric material used to infuse the tow 300f of fibers 350 to the top surface 410f of the substrate 400f. The tows 300, 310f may exhibit different performance parameters from one another by using at least one of different fibers 350, varying the width of the corresponding segments, and/or varying the density of corresponding fibers 350.

FIG. 42 shows a tow 300f of fibers 350 attached to both the top surface 410f of the substrate 400f as well as to the toe cap 270. The tow 300f of fibers 350 may exhibit properties on the cap 270 that are different than the properties on the top surface 410f of the substrate 400f For instance, the tow 300f may be less stiff along the cap 270 compared to the top surface 410f of the substrate 400f Here, the tow 300f may utilize different fibers 350 along the cap 270 than the fibers 350 along the top surface 410f of the substrate 400f. Additionally or alternatively, the tow 300f may define wider segments that attach to the top surface 410f of the substrate 400f than segments that attach to the cap 270. In some examples, polymeric material may be used to infuse the tow 300f to the substrate 400f while the cap 270 is substantially free of polymeric material. Alternatively, the cap 270 uses the same or a different polymeric material to attach the tow 300f of fibers 350 thereto. In some configurations, the toe cap 270 and tow 300f of fibers 350 attached thereto are embroidered directly to the upper 100 formed from a knit material to integrally form the toe cap 270 with the upper 100.

As with the heel counter 204 of FIGS. 25-28, the toe cap 270 includes a geometry with multiple curves for defining the sidewall 272 and the cover portion 274 that cooperate with the footwear plate 200f to define the toe receiving void 275 for receiving the toes of the foot. In some examples, the toe cap 270 is formed by separately forming two separate halves. For instance, a first preform 300f, 270 may be subjected to at least one of compression molding and vacuum molding while enclosed within a mold to form a first half of the finished toe cap 270, and a second preform 300f, 270 may be subjected to the at least one of compression molding and vacuum molding while enclosed within a mold to form a second half of the finished toe cap 270. Here, the first half may define the sidewall 272 and cover portion 274 along the lateral side 18 and the second half may define the sidewall 272 and the cover portion 274 along the medial side 20. Thereafter, the two halves may be combined to form the whole toe cap 270 defining the toe receiving void 274 for receiving the toes of the foot.

FIGS. 43-46 provide a substantially rigid footwear plate 200g that may affix to an upper 100g of an article of footwear 10g. In view of the substantial similarity in structure and function of the components associated with the footwear plate 200 with respect to the footwear plate 200g, like reference numerals are used hereinafter and in the drawings to identify like components while like reference numerals containing letter extensions are used to identify those components that have been modified.

FIG. 43 provides a bottom view a substrate 400g including one or more protruding elements 215g (e.g., cleats) extending from a bottom surface 412g of the substrate 400g in a direction away from the substrate 400g. Here, the bottom surface 412g of the substrate 400g may correspond to the ground-engaging surface 212 of the footwear plate 200g such that the protruding elements 215 provide traction with soft ground surfaces, such as grass. For instance, each protruding element 215 may extend from the bottom surface 412g in a direction substantially perpendicular to the longitudinal axis L of the substrate 400g. The substrate 400g may be formed from the thermoplastic polymer materials used to form the substrate 400 of FIGS. 1-12.

FIG. 44 provides a bottom perspective view of the footwear plate 200g showing a tow 300g of fibers 350 (e.g., strand portion) attached to the substrate 400g and including a plurality of segments 302g that extend between a first end 1 disposed in the forefoot portion 12 of the substrate 400g and a second end 2 disposed in the heel portion 16 of the substrate 400g. Moreover, the segments 302g may cross one another in the mid-foot portion 14 disposed between the forefoot portion 12 and the heel portion 16 of the substrate 400g. For instance, the plurality of segments 302g may be woven together in the mid-foot portion 14 of the plate 200g. Additionally, FIG. 45 provides a partial rear perspective view of the footwear plate 200g showing the plurality of segments 302g woven together around the second end 2 of the substrate 400g to form a heel counter.

The tow 300g of fibers 350 could be thermoformed directly to the plate 400g such that subjecting the tow 300g of fibers 350 to the thermoforming process (i.e., subjecting the tow 300g to heat and pressure) causes the tow 300g to be attached to the material forming the substrate 400g. In another configuration, the tow 300g could first be subjected to a thermoforming process and could subsequently be attached to the material forming the substrate 400g via a suitable adhesive. Regardless of how the tow 300g is attached to the material forming the substrate 400g, attaching the tow 300g to the substrate 400g increases the overall stiffness and strength of the footwear plate 200g without overly increasing the weight of the plate 200g. In short, providing the substrate 400g with fibers 350 only in discrete areas provides the plate 300g with targeted strength, as fibers are only added where increased strength and/or stiffness is needed.

In some examples, the tow 300g of fibers 350 includes looped portions 303 connecting adjacent segments 302g. The tow 300g may be formed from a continuous strand of fibers 350 that includes at least one of carbon fibers, boron fibers, glass fibers, and polymeric fibers. The first tow 300g of fibers 350 attaches to the bottom surface 412g of the substrate 400g and extends around at least a portion of the protruding members 215 (e.g., cleat members) and/or surrounds at least one of the cleat members 215. For instance, the first tow 300g may extend around cleat members 215 disposed in the forefoot portion 12 proximate to the first end 1 of the substrate 400g. In some examples, at least one of the plurality of segments 302g surrounds at least one of the cleat members 215. In some examples, at least two of the segments 302g cooperate to form at least one void 316g such that the substrate 400g (e.g., bottom surface 412g) is exposed within the at least one void 316g.

In some configurations, the tow 300g of fibers 350 wraps around the substrate 400g to provide one or more bundles 380, 381, 382, 383 of the plurality of segments 302g. The bundles 380, 381, 382, 383 may cross at the mid-foot portion 14 of the plate 200g and at least a portion of the segments 302g may be woven together where the bundles 380, 381, 382, 383 cross. Similarly, FIG. 45 shows the bundles 380 and 383 crossing at the heel portion 16 of the plate 200g to provide the heel counter. In some configurations, the at least one void 316g is disposed between a first bundle 381 and a second bundle 382.

FIG. 46 provides a side perspective view of the article of footwear 10g showing the tow 300g of fibers 350 extending onto exterior surfaces of the upper 100g. Here, the tow 300g of fibers 350, while attached to the bottom surface 412g (not shown relative to the view of FIG. 46) of the substrate 400g, extend onto the exterior surfaces of the upper 100g proximate to a lower region to provide a sidewall 220g for the footwear 10g by extending around a perimeter of the upper 100g. In some examples, one or more tensile strands 211g extend between and connect the tow 300g of fibers 350 to the upper 100g. For instance, a first tensile strand 211g may attach the tow 300g to the exterior surface of the upper 100g along the lateral side 18, and a second tensile strand 211g may attach the tow 300g to the exterior surface of the upper 100g along the medial side 20.

Referring to the first tensile strand 211g along the lateral side 18 of the footwear 10g, the tensile strand 211g extends between a first end 250 attached to at least one of the segments 302g of the tow 300g at a location proximate to the heel portion 16 and a second end 254 attached to at least one of the segments 302g of the tow 300g at a location proximate to the forefoot portion 12. The tensile strand 211g may attach to the tow 300g of fibers 350 at a plurality tow attachment locations 252 between and including the first end 250 and the second end 254 and define a plurality of free looped ends 253 that extend away from the tow 300g between each adjacent tow attachment location 252. In some configurations, the tensile strand 211g attaches to the upper 100g at a plurality of discrete attachment locations 315g along the length of the tensile strand 211g between the attachment locations 252 and the free looped ends 253. While not shown relative to the view of FIG. 46, the second tensile strand 211g along the medial side 20 of the footwear 10g extends between and connects the tow 300g of fibers 350 to the upper 100g in a manner substantially similar to the first tensile strand 211g along lateral side 18.

The example shows the footwear 10g including the lace 106 (e.g., fastener) operative to move the upper 100g between a tightened state and a relaxed state. In some implementations, a lacing pattern of the lace 106 extends along the throat opening of the upper 100g (e.g., along the instep of the foot) and weaves through the free looped ends 253 of the tensile strands 211g along the lateral and medial sides 18, 20 to join with the tow 300g (e.g., at least one of the segments 302g) via the tow attachment locations 252 as well as the upper 100g via the attachment locations 315g. In other words, the free looped ends 253 ends of the tensile strands 211g are operative to extend between and join the lace 106 and at least one of the plurality of segments 302g of the tow 300g of fibers 350.

Referring to FIGS. 47-49, a mold is provided and includes an upper mold portion 82 and a lower mold portion 84 that molds an embroidered preform including the one or more tows 300 of fibers 350 attached to one or more substrates 400 to form the substantially rigid footwear plate 200 of FIGS. 1-12. As set forth above, the footwear plate 200 may define a three dimensional shape with the inner surface 214 configured to oppose the footbed surface 222 of the upper 100 and contoured to the shape of the footbed surface 222 to conform to the profile of the bottom surface (e.g., plantar) of the foot within the interior void 102. In some examples, the sidewall 220 extends around a perimeter of the plate 200 between the ground-engaging surface 212 and the inner surface 214 to provide a rim for retaining the foot upon the inner surface 214. Accordingly, the upper mold portion 82 may include a contact surface 86 having a surface profile that imparts a shape to the embroidered preform that conforms to the profile of the bottom surface (e.g., plantar) of the foot when the embroidered preform is compressed between the mold portions 82, 84. Likewise, the lower mold portion 84 may include a contact surface 88 having a surface profile that imparts a shape to the embroidered preform that corresponds to ground-engaging surface 212 of the plate 200 when the preform 300, 400 is compressed between the mold portions 82, 84. In some examples, the lower mold portion 84 is fixed and the upper mold portion 82 translates toward the lower mold portion 84 to close the mold 80 and thereby compress the embroidered preform therebetween. In other examples, the lower mold portion 84 and the upper mold portion 82 may each translate toward one another or only the lower mold portion 84 may translate toward the upper mold portion 82.

FIG. 47 shows the mold 80 open and the embroidered preform positioned between the upper mold portion 82 and the lower mold portion 84. The embroidered preform may include one or more tows 300 of fibers 350 attached to the substrate 400. The substrate 400 and the tows 300 may be substantially flexible. For instance, the tows 300 may attach to the substrate 400 without penetrating the substrate 400 to form one or more layers upon the top surface 410 of the substrate 400. For instance, the tows 300 may attach to the substrate 400 via stitching 304 that crosses over the tows 300 and penetrates the substrate 400 at attachment locations 305 spaced apart from the tows 300 and/or penetrating thru at least one of the tows 300. In some examples, the stitching 305 is formed from resin.

In some configurations, the one or more tows 300 may include the first, second, and third tows 310, 320, 330 of FIGS. 8-10 attached to the substrate 400 to form corresponding first, second, and third layers upon the top surface 410 of the substrate. In these examples, the tows 310, 320, 330 may be formed from the same continuous strand of fibers 350 or at least one of the tows 310 may be formed from a different strand of fibers 350. Accordingly, the one or more tows 310, 320, 330 may be formed from the same or different materials, may include the approximately the same or a different number of fibers 350, may include approximately the same or different lengths, may include the approximately the same or different thicknesses, and may include at least one of carbon fibers, boron fibers, glass fibers, and polymeric fibers. While FIGS. 8-10 depict the tows 310, 320, 330 arranged in a layered configuration upon a single substrate 400, other configurations include attaching each tow 310, 320, 330 to a corresponding substrate 400 to form a substrate stack. In these configurations, the substrate stack may be positioned between the upper and lower mold portions 82, 84 and subjected to heat and pressure (FIG. 48) to conform the stack to the shape of at least one of the corresponding contact surfaces 86, 88 and cured to provide the substantially rigid footwear plate 200 (FIG. 49) having the three-dimensional shape.

In some implementations, the embroidered preform is infused with a liquid material 650 that coats/encapsulates exterior portions of the at least one tow 300 and partially penetrates interior portions of the at least one tow 300 to bind the least one tow 300 to the substrate 400 and/or other tows 300. In these implementations, the liquid material 650 may include a thermoset material applied to the preform 300, 400 in a molten state. The thermoset material may include at least one of an epoxy, a polyurethane, a polymerizable composition, and a pre-polymer. Moreover, one or more polymers, such as rubber and/or block copolymer, may be added to the liquid material 650 to increase ductility when the liquid material 650 cures. Additionally or alternatively, a resin material 652 may be incorporated into the at least one tow 300 to assist with binding/affixing the at least one tow 300 to the substrate 400.

The mold 80 may close by transitioning at least one of the upper mold portion 82 and the lower mold portion 84 toward the other one of the upper mold portion 82 and the lower mold portion 84. FIG. 48 shows the mold 80 closed and pressure applied to the embroidered preform by subjecting the preform 300, 400 to at least one of compression molding and vacuum molding while enclosed between the mold portions 82, 84. Moreover, the mold 80 may simultaneously apply heat to assist with conforming the embroidered preform to the shape of at least one of the corresponding contact surfaces 86, 88 and curing the embroidered preform to provide the footwear plate 200 with the three-dimensional shape and structural rigidity. The upper and/or lower mold portions 82, 84 may include a plurality of conduits configured to channel a heated liquid, such as water, through the corresponding mold portion(s) 82, 84. Here, the heated liquid raises the overall temperature of the corresponding mold portion 82, 84 and the preform 300, 400 conducts the heat from the mold portion(s) 82, 84, thereby raising the temperature of the preform 300, 400 to a temperature suitable for melting and/or curing one or more materials associated therewith. In some implementations, the preform 300, 400 is heated prior to placement within the mold 80.

In some configurations, the substrate 400 is formed from a thermoplastic film that attaches to the at least one tow 300 via the stitching 304 which penetrates the substrate 400 at the attachment locations 305. In examples where more than one substrates 400 form a stack, at least one of the substrates 400 may be formed from the thermoplastic film. At least a portion of the stitching 304 may be formed from the same material as the substrate 400. Thus, at least a portion of the stitching 304 may be formed the same thermoplastic material as the thermoplastic film forming the substrate 400. In these configurations, applying heat to the embroidered preform while the mold 80 is closed is operative to thermoform the thermoplastic film and the thermoplastic stitching 304 to join the at least one tow 300 of fibers 350 to the substrate. Additionally, the closed mold 80 may apply pressure to the embroidered preform. In some configurations, the thermoplastic stitching 304 includes a higher melting point than the thermoplastic film so that the stitching 305 melts after the thermoplastic film, thereby permitting the stitching 304 to hold the at least one tow 300 in position upon the substrate 400 as the thermoplastic film of the substrate 400 begins to melt. Additionally, in configurations when the resin material 652 is incorporated into the at least one tow 300, the heat and pressure activates the resin material 652 to bind the fibers 350 associated with the at least one tow 300 in addition to the stitching 304 when at least the portion of the stitching is formed from resin.

In implementations when the liquid material 650 (e.g., thermoset material with or without the addition of the ductility increasing polymers) infuses the at least one tow 300 of fibers 350, the closed mold 80 applying at least one of heat and pressure includes subjecting the embroidered preform to at least one of vacuum molding and compression molding to cure the liquid material 650 (e.g., cure the thermoset material) such that the at least one tow 300 binds to the substrate 400 and/or other tows 300.

Referring to FIG. 49, the mold 80 opens by translating the upper mold portion 82 away from the lower mold portion 84 and/or the lower mold portion 84 away from upper mold portion 82. The liquid material 650 (thermoset material) infused into the tows 300 and/or the thermoplastic material forming the substrate 400 and/or the stitching are cured to form the substantially rigid footwear plate 200 with a three-dimensional shape. Thereafter, the footwear plate 100 may be incorporated into the article of footwear 10.

Referring to FIGS. 50-56, an article of footwear 10h including an upper 100 and a footwear plate 200h attached to the upper 100 is provided. In view of the substantial similarity in structure and function of the components associated with the article of footwear 10 with respect to the article of footwear 10h, like reference numerals are used hereinafter and in the drawings to identify like components while like reference numerals containing letter extensions are used to identify those components that have been modified.

The interior surfaces of the upper 100 define the interior void 102 to receive and secure the foot for support on the sole structure, while the ankle opening 104 provides access to the interior void. The fasteners 106 (e.g., laces, straps, cords, hook-and-loop, etc.) may extend along the upper to adjust the fit of the interior void 102 around the foot and to facilitate entry and removal of the foot from the interior void 102. The tongue portion extends between the interior void 102 and the fasteners 106.

The footwear plate 200h defines a longitudinal axis L that extends through the forefoot portion 12, the mid-foot portion 14, and the heel portion 16. The plate 200h attaches to the upper 100 and includes a plurality of protruding elements 215h (FIG. 51) integrally formed with, and extending from, a ground-engaging surface 212h of the plate 200h to provide traction with soft ground surfaces (e.g., grass) during athletic movements. The protruding elements 215h may also be referred to as traction elements. FIG. 51 provides a bottom perspective view of the footwear plate 200h showing the integrally formed protruding elements 215h extending from the ground-engaging surface 212h and the sidewall surface 220 extending around a perimeter of the plate 200h between the ground-engaging surface 212h and the inner surface (none shown) disposed on an opposite side of the plate 200h than the ground-engaging surface 212h. As with the plate 200 of FIGS. 1-12, the sidewall surface 220 may define a rim around the perimeter of the plate 200 to cradle the foot when performing walking, running, and/or lateral movements. In some implementations, portions of the sidewall 220 extend around the upper 100 and attach to exterior surfaces of the upper 100 at one or more locations to secure the plate 200h to the upper 100. Adhesives may be used to secure the plate 200h to the upper 100.

The footwear plate 200h is formed from at least two strand portions 300h arranged in selected patterns to impart anisotropic stiffness and gradient load paths throughout the plate 200h. In the examples shown, the at least two strand portions 300h include at least first and second strand portions 310h and 320h. The first strand portion 310h may extend along an entire length of the plate 200h while the second strand portion 320h are applied in a plurality of discrete regions 218 along the ground-engaging surface 212h of the plate 200h to increase a density/concentration of fiber per unit area in each of the discrete regions 218. Each discrete region 218 is associated with a corresponding location of a protruding element 215h formed into the plate 200h and extending from the ground-engaging surface 212h. In some implementations, the first strand portion 310h forms a first layer across the entire plate 200h and the second strand portion 320h is applied upon the first strand portion 310h in each discrete region 218 to form a second layer in each of the discrete regions 218, thereby increasing the density/concentration of fiber per unit area in the discrete regions 218 to provide additional structural support for the integrally-formed protruding elements 215h and, further, to provide additional material for forming the protruding elements 215h. Each strand portion 300h may refer to a tow of a plurality of fibers 350, a monofilament, yarn, or polymer pre-impregnated tows that include ribbon or strips of unidirectional tape. The present disclosure will refer to each strand portion 300h as a corresponding tow 300h of fibers 350 unless indicated otherwise. Each tow 300h, 310h, 320h forming the footwear plate 200 may range in size from about 1,000 fibers per bundle to about 48,000 fibers per bundle.

In some configurations, the fibers 350 associated with the two tows 310h, 320h include at least one of carbon fibers, boron fibers, glass fibers, and polymeric fibers. Additionally, at least a portion of the fibers 350 associated the at least two tows 310h, 320h may be formed from a first thermoplastic material. Fibers such as carbon fibers, aramid fibers, and boron fibers may provide a high modulus while glass fibers (e.g., fiberglass) and polymer fibers (e.g., synthetic fibers) provide a medium modulus. At least one of the first tow 310h and the second tow 320h may include a thermoplastic material commingled with 12,000 carbon fibers per bundle or 24,000 carbon fibers per bundle. Here, the thermoplastic material may include Nylon 6 or Nylon 12.

As with the plate 200 of FIGS. 1-12, the plate 200h may be designed based on anatomical features of the foot to provide a stiffness gradient along the length of the plate 200h from the forefoot portion 12 to the heel portion 16 and/or a stiffness gradient between the lateral side 18 and the medial side 20 of the plate 200 through at least one of the portions 12, 14, 16. Thus, at least the first tow 300h, 310h of fibers 350 may include paths with multiple curves to steer around voids and/or to change directions in the load path of the plate 200h to accommodate anatomical features as well as to enhance performance of the footwear 10 for its intended use. On the other hand, the second tow 300h, 320h of fibers 350 disposed in each of the discrete regions 218 may include spiral paths to increase structural integrity for each of the protruding elements 215h to accommodate higher loads at the discrete regions 218 in response to ground-reaction forces. Moreover, due to the difficulty in manufacturing a non-flat (e.g., curved/contoured) and substantially rigid composite plate in its final state from a preform plate that is initially rigid and flat in shape, the at least two tows 300h of fibers 300 provide an embroidered preform by affixing to a same substrate 400h (FIG. 52) or different substrates 400h that is positioned in a mold to form the protruding elements 215h and the footwear plate 200h with a desired shape and curvature. As such, the protruding elements 215h are integrally formed with the remainder of the plate 200h. Thereafter, the plate 200h may be cured to impart structural rigidity. In some examples, manufacturing the plate 200h includes infusing the liquid material 650h, including a thermoset polymeric material and/or a thermoplastic polymeric material into the embroidered preform (e.g., the first and second tows 310h, 320h of fibers 350 affixed to the substrate 400) and using vacuum molding and/or compression molding techniques to form the plate 200. Additional polymers/toughening agents (such as softer polymers, rubber, and/or block copolymers) may be added to the liquid material 650 to reduce brittleness of the plate 200h.

In other examples, the substrate 400h, or a portion thereof, is formed from a thermoset polymeric material and/or a thermoplastic polymeric material. The thermoplastic polymeric material includes a melting point below a melting point or degradation temperature of the fibers 350 of the tows 300h. Here, incorporating the thermoplastic material and/or the thermoset polymeric material into the substrate 400h may be used in addition to, or in lieu of, the liquid material 650 infused/injected into the embroidered preform to melt/infuse the embroidered preform during the vacuum molding process and/or the compression molding process. Additionally or alternatively, thermoplastic yarns may be commingled with the fibers 350 of at least one of the tows 300h to assist with melting/infusing the embroidered preform during vacuum molding or compression molding. Optionally, the embroidered preform may be power coated with the thermoset and/or thermoplastic polymeric materials or injection-molding techniques may be used to overmold and/or impregnate the embroidered preform with the thermoset and/or thermoplastic polymeric materials FIG. 52 provides a top view of an example substrate 400h used for forming the footwear plate 200h. The substrate 400h may be substantially thin, flat, and flexible. As set forth above, the substrate 400h, or at least a portion thereof, may be formed from a thermoset polymeric material, a thermoplastic polymeric material, or an organosheet. In some configurations, the substrate 400h includes a textile that may be knit, woven, or non-woven. The substrate 400h may also optionally be formed from an injection molded article or a thermoformed article. The substrate 400h may be cut to a desired shape defined by a perimeter edge 402.

FIG. 53 provides a top view of the first tow 300h, 310h of fibers 350 affixed/attached to a top surface 410h of the substrate 400h of FIG. 52 to form a first layer on the substrate 400h. The first tow 310h of fibers 350 includes first segments 312h that each extend between two different locations along the peripheral edge 402 of the substrate 400h. The first segments 312h are disposed adjacent and substantially parallel to one another. FIG. 53 shows the first segments 312h applied to the substrate 400h at a first angle $\alpha_1$ relative to the longitudinal axis L of the substrate 400h. The first tow 310h may include looped portions 303h disposed proximate to the peripheral edge 402 of the substrate 400h for connecting adjacent first segments 312h. In the example shown, one or more of the looped portions 303h extend beyond the peripheral edge 402 of the substrate 400h and create pinch points when the layered configuration is subjected to pressure (e.g., molding) for consolidating the fibers 350 to form the footwear plate 200h. As shown in FIG. 54, the first tow 310h of fibers 350 is severed (e.g., by cutting) along the peripheral edge 402 of the substrate 400h to remove the looped portions 303h, thereby removing the presence of pinch points when applying pressure to form the finished footwear plate 200h. Thus, adjacent second segments 312h may be disconnected at the peripheral edge 402 of the substrate 400h once the corresponding looped portions 303h are removed (e.g., by cutting). Each tow 300h, 310h may attach to the top surface 410 of the substrate 400h without penetrating the bottom surface 412h (FIG. 61) via stitching 304 (FIGS. 57-63) that crosses over the corresponding tows 300h, 310h between attachment locations 305 disposed on the substrate 400h. While the example shown only depicts the first tow 310h forming the first layer, additional tows 300h each having corresponding segments substantially parallel to one another and convergent with the segments of the other tows 300h may be applied over top the first layer as described above with reference to the tows 310a, 320h, 330h of FIGS. 15 and 16. Moreover, at least one of the tows 310, 320, 330 of FIGS. 8-10 may be applied to the substrate 400h in addition to or instead of the first tow 310h of fibers 350 without departing from the scope of the present disclosure.

FIGS. 54 and 55 provide a top view (FIG. 54) and an exploded view (FIG. 55) of the embroidered preform including the first tow 310h of fibers 350 and the second tow 320h of fibers affixed/attached to the substrate 400h of FIG. 52 to increase the structural integrity of the footwear plate 200h in each of the discrete regions 218 associated with the locations of the integrally molded protruding elements 215h extending from the ground-engaging surface 212h. The second tow 320h of fibers 350 may include second segments 322h that are convergent with the first segments 312h of the first tow 310h. The second tow 320h of fibers 350 are disposed upon the first tow 310h of fibers 350 and attached to the substrate 400h at each of the discrete regions 218. For instance, the second tow 320h of fibers 350 may attach to the substrate 400h via stitching that may zigzag across the second tow 320h between second attachment locations located on the substrate 400h. Here, the stitching may penetrate the substrate at the second attachment locations and/or may extend through the first tow 310h of fibers 350.

In the examples shown in FIGS. 54 and 55, each second tow 320h of fibers 350 is formed from a corresponding strand of fibers 350 disposed at a corresponding discrete location 218 of the footwear plate 200h that is separate from the other second tows 320h of fibers 350 at the other discrete locations 218. In other examples, the second tow 320h of fibers 350 at each of the discrete locations 218 is formed from the same continuous strand/bundle of fibers 350. For instance, FIG. 56 provides an exploded view of an alternate configuration where the second tow 320h of fibers 350 includes one continuous second tow 320h of fibers 350 applied to the substrate 400h that overlaps the first tow 310h of fibers 350 at each discrete location 218. Other examples may include the second tow 320h of fibers 350 having curved paths that change directions based on the location of each discrete location 218 similar to the shape of the first tow 310 of fibers 350 of FIGS. 7-10. Here, the segments may extend substantially parallel to one another without spiraling at the discrete locations 218.

Referring to FIGS. 57 and 58, the second segments 322h of the second tow 320h at each discrete location 218 may define spiraled paths and may occupy a surface area that surrounds a perimeter of each protruding element 215h and forms the protruding elements 215h. Further, each spiraled path may include an overall perimeter defining a shape that is similar to the shape of the formed protruding elements 215h. For protruding elements that include at least two segments angled relative to one another, the pattern of the second tow 320h of fibers in the corresponding discrete location 218 may define spiraled paths that form multiple ellipses or cardioids surrounding the segments of each protruding element 215h within the discrete regions 218. In one configuration, the second tow 320h includes individual segments 322h (FIG. 57). In another configuration, the second tow 320h of fibers 350 is formed from the same continuous strand/bundle of fibers 350 such that the spiraled paths located at each discrete location 218 is connected (FIG. 58).

With reference to FIG. 59, the second tow 320h of fibers 350 may include a fiber path 219 that increases the structural integrity of the footwear plate 200h at each location of the integrally molded protruding elements 215h extending from the ground-engaging surface 212h and, further, provides additional material for forming the protruding elements 215h from the second tow 320h or fibers 350, as will be described below. For example, the fiber path 219 may extend through each location 218, as shown above with respect to FIG. 51. In one configuration, the fiber path 219 includes several strands/bundles of fibers 350 that are applied to the first tow 310h such that the fibers 350 of the second tow 320h follow a serpentine shape. As shown in FIG. 59, the strands/bundles of fibers 350 forming the second tow 320h are disposed on the first tow 310h of fibers 350 such that several strands are disposed adjacent to one another to provide the path 219 with a width (W) extending in a direction across the plate 200h (i.e., in a direction substantially perpendicular to a longitudinal axis of the plate 200h).

In one configuration, the strands/bundles of fibers 350 forming the second tow 320h are formed from a single, continuous strand. In other configurations, the strands/bundles of fibers 350 forming the second tow 320h are individual segments that are attached to the first tow 310h in the pattern shown in FIG. 59. Finally, the shape shown in FIG. 59 could be formed from a single, continuous strand of fibers 350, as shown in FIG. 59. Alternatively, the path 219 could include a first portion 221 spaced apart and separated from a second portion 223. Each portion 221, 223 could be formed from a single, continuous strand/bundle of fibers 350 or, alternatively, could each include multiple strands/bundles of fibers 350.

In the configurations shown in FIGS. 54-59, the second tow 320h could be formed on the first tow 310h such that the fibers 350 of the second tow 320h are used to form the protruding elements 215h. In addition to forming at least a portion of the protruding elements 215h, the fibers 350h of the second tow 320h provide increased strength in the areas of the protruding elements 215h, thereby increasing the overall strength and performance of the plate 200h. Further, at each location of the protruding elements 215h, the size of the second tow 320h (i.e., the area of the second tow 320h) could be greater than an area of a base of its respective protruding element 215h in an effort to fully support and engage each protruding element 215h. Finally, the second tow 320h may be attached to the first tow 310h such than an angle of the fibers 350 of the second tow 320h is different than an angle of the fibers 350 of the first tow 310h. For example, a longitudinal axis of the fibers 350 of the first tow 310h may be approximately 90 degrees (90°) relative to a longitudinal axis of the fibers 350 of the second tow 320h.

As shown, the protruding elements 215h may include tips 217h that are attached to distal ends of the protruding elements 215h formed by the fibers 350 of the second tow of fibers 320h. The tips 217h may be formed from the same or different material than the fibers 350 and may provide the protruding elements 215h with increased strength, abrasion resistance, and/or traction.

Referring to FIGS. 60-66 a mold 80h is provided and includes an upper mold portion 82 and a lower mold portion 84h that molds an embroidered preform including the two or more tows 300h of fibers 350 attached to one or more substrates 400h to integrally form the footwear plate 200h with the plurality of protruding elements 215h of FIGS. 50-56. FIGS. 60-62 depict the embroidered preform injected/infused with the liquid material 650 that may include the resin material 652 to assist with binding/affixing the tows 300h and the protruding elements 215h to the substrate 400h. FIGS. 63-65 depict the embroidered preform including the tows 300h having non-polymer fibers 352 (e.g., carbon and/or fiberglass fibers) and polymer fibers 354 (e.g., thermoplastic polymer fibers) that co-mingle with each other throughout the length of the tows 300h to facilitate bonding with the thermoplastic polymer materials used to form the substrate 400h and/or the thermoplastic material of the stitching 304. In view of the substantial similarity in structure and function of the components associated with the mold 80 with respect to the footwear plate 80h, like reference numerals are used hereinafter and in the drawings to identify like components while like reference numerals containing letter extensions are used to identify those components that have been modified.

The upper mold portion 82 may include a contact surface 86 having a surface profile that imparts a shape to the embroidered preform that conforms to the profile of the bottom surface (e.g., planta) of the foot when the embroidered preform is compressed between the mold portions 82, 84h. In addition to defining a shape that imparts a shape to the embroidered preform that corresponds to the ground-engaging surface 212h of the plate 200h when compressed between the mold portions 82, 84h, a contact surface 88h of the bottom mold portion 84h defines a plurality of cavities 89h that form and shape the fibers 350 of the second tow 320h into corresponding ones of the plurality of protruding elements 215h and, if present, receive the tips 217h therein. In some examples, the lower mold portion 84h is fixed and the upper mold portion 82 translates toward the lower mold portion 84h to close the mold 80h and thereby compress the embroidered preform therebetween. In other examples, the lower mold portion 84h and the upper mold portion 82 may each translate toward one another or only the lower mold portion 84h may translate toward the upper mold portion 82.

FIG. 60 shows the mold 80h open and the embroidered preform positioned between the upper mold portion 82 and the lower mold portion 84h and the tips 217h positioned in their corresponding cavities 89h. The tows 300h may attach to the substrate 400h without penetrating the substrate 400h to form multiple layers upon the top surface 410h of the substrate 400h along areas associated with the discrete locations 218. For instance, the tows 300h may attach to the substrate 400h via stitching 304 that crosses over the tows 300h and penetrates the substrate 400h at attachment locations 305 spaced apart from the tows 300h and/or penetrating thru at least one of the tows 300h. In some examples, the stitching 305 is formed from resin that includes a thermoplastic and/or thermoset material. In some configurations, the at least two tows 300h include the first and second tows 310h, 320h of FIGS. 50-56 attached to the substrate 400h to form corresponding first and second layers upon the top surface 410h of the substrate 200h where the tows 310h, 320h overlap in the discrete regions 218 associated with the locations of the protruding elements.

In the example shown, the embroidered preform is infused with a liquid material 650 that coats/encapsulates exterior portions of the at least two tows 300h and partially penetrates interior portions of the tows 300h to bind the tows 300h to the substrate 400, the tips 217h and/or other tows 300 when heat and pressure is applied. The liquid material 650 includes a thermoset material applied to the preform 300h, 400h in a molten state and includes at least one of an epoxy, a polyurethane, a polymerizable composition, and a pre-polymer. Moreover, one or more polymers, such as rubber and/or block copolymer, may be added to the liquid material 650 to increase ductility when the liquid material 650 cures. Additionally or alternatively, a resin material 652 may be incorporated into the at least two tows 300h and/or the liquid material 650 to assist with binding/affixing the at least two tows 300h to the substrate 400 and the tips 217h.

The mold 80h may close by transitioning at least one of the upper mold portion 82 and the lower mold portion 84h toward the other one of the upper mold portion 82 and the lower mold portion 84h. FIG. 61 shows the mold 80h closed and pressure applied to the embroidered preform. The pressure causes the fibers 350 of the second tow 320h to extend into the cavities 89h, thereby forming the protruding elements 215h by subjecting the preform 300h, 400h to at least one of compression molding and vacuum molding while enclosed between the mold portions 82, 84h. Moreover, the mold 80h may simultaneously apply heat to assist with conforming the embroidered preform to the shape of at least one of the corresponding contact surfaces 86, 88h and to the shape of the cavities 89h, thereby forming the protruding elements 215h into the embroidered preform, and curing the embroidered preform to provide the footwear plate 200h including the protruding elements 215h extending from the ground-engaging surface 212h and having the three-dimensional shape and structural rigidity. The heat, pressure, and liquid material 650 may additionally serve to attach one or more tips 217h to respective ones of the protruding elements 215h. The upper and/or lower mold portions 82, 84h may include a plurality of conduits configured to channel a heated liquid, such as water, through the corresponding mold portion(s) 82, 84h. Here, the heated liquid raises the overall temperature of the corresponding mold portion 82, 84h and the preform 300h, 400h conducts the heat from the mold portion(s) 82, 84h, thereby raising the temperature of the preform 300h, 400h to a temperature suitable for melting and/or curing one or more materials associated therewith. In some implementations, the preform 300h, 400h is heated prior to placement within the mold 80.

In some configurations, the substrate 400h is formed from a thermoplastic film and at least a portion of the stitching 304 attaching the tows 300h to the substrate 400h may be formed from the same thermoplastic material as the thermoplastic film forming the substrate 400h. The thermoplastic stitching 304 may include a higher melting point than the thermoplastic film so that the stitching 304 melts after the thermoplastic film, thereby permitting the stitching 304 to hold the at least two tows 300h in position upon the substrate 400h as the thermoplastic film of the substrate 400h begins to melt. Additionally, in configurations when the resin material 652 is incorporated into the at least two tows 300h, the heat and pressure activates the resin material 652 to bind the fibers 350 associated with the tows 300h in addition to the stitching 304 when at least a portion of the stitching is formed from resin. Moreover, the liquid material 650 (e.g., thermoset material with or without the addition of the ductility increasing polymers) infuses the tows 300h of fibers 350 when the mold 80h is closed. Applying at least one of heat and pressure to cure the liquid material 650 (e.g., cure the thermoset material) binds the tows 300h to the substrate 400h, other tows 300h, and the protruding elements 215h.

Referring to FIG. 62, the mold 80h opens by translating the upper mold portion 82 away from the lower mold portion 84h and/or the lower mold portion 84h away from upper mold portion 82. The liquid material 650 (thermoset material) infused into the tows 300h and/or the thermoplastic material forming the substrate 400h and/or the stitching 304 are cured to form the substantially rigid footwear plate 200h with a three-dimensional shape and the protruding elements 215h formed into the plate 200h and projecting from the ground-engaging surface 212h thereof. Thereafter, the footwear plate 200h may be incorporated into the article of footwear 10h.

In another implementation of forming the footwear plate 200h with the mold 80h, FIG. 63 shows the mold 80h open and the embroidered preform positioned between the upper mold portion 82 and the lower mold portion 84h and the tips 217h positioned in their corresponding cavities 89h. In the same manner as described above with reference to FIG. 60, the tows 300h may attach to the substrate 400h via the thermoplastic stitching 304 that penetrates the substrate 400h at the attachment locations 305 spaced apart from the tows 300h and/or penetrating thru at least one of the tows 300h. The thermoplastic stitching 304 may include the higher melting point than the thermoplastic film of the substrate 400h to hold the at least two tows 300h in position upon the substrate 400h as the thermoplastic film of the substrate 400h begins to melt. Additionally, the resin material 652 may be incorporated into the at least two tows 300h to activate when subjected to heat and pressure to bind the fibers 350 associated with the tows 300h in addition to the stitching 304 when at least the portion of the stitching is formed from resin. In contrast to the examples of FIGS. 60-62, the embroidered preform is not infused with the liquid material 650 that includes the thermoset material in the molten state to assist with binding the tows 300h to the tips 217h and the substrate 400h. Instead, the fibers 350 associated with the tows 300h include the non-polymer fibers (e.g., carbon fibers) and the polymer fibers 354 (e.g., thermoplastic polymer fibers) that co-mingle with each other throughout the length of the tows 300h to facilitate bonding with the thermoplastic polymer materials used to form the substrate 400h. An additional thermoplastic sheet or film may be disposed between the bottom surface 412h of the substrate and the tips 217h to facilitate bonding between the tows 300h, substrate 400h, and the tips 217h. Additionally or alternatively, portions of the tips 217h may be formed from thermoplastic materials, or coated with thermoplastic materials, to facilitate bonding when the embroidered preform is compressed between the mold portions 82, 84h and the material of the second tow 320h is received within the cavities 89h and contacts the respective tips 217h. The resin material 652 may be incorporated to assist in binding the tows 300h and substrate 400h with the tips 217h to form the tips 217h into the finished footwear plate 200h at each of the discrete regions 218. In other configurations, a liquid thermoplastic material may be injected into the cavities 89h to form the tips 217h into the embroidered preform upon compressing the preform 300h, 400h between the upper mold portion 82 and the lower mold portion 84h.

FIG. 64 provides a cross-sectional view taken along line 64-64 of FIG. 63 showing the stitching 304 attaching the first tow 310h of fibers 350 and the second tow 320h of fibers 350 to the top surface 410h of the substrate 400h at the discrete regions 218 corresponding to the locations where the protruding elements 215h will form into the preform 300h, 400h. In the regions/areas outside the discrete regions 218, the first tow 310h of fibers 350 forms the first layer on the substrate 400h without the second tow 320h of fibers 350 applied upon the first tow 310h. Accordingly, the embroidered preform includes a greater concentration/density of fibers 350, 352, 354 at the discrete regions 218 to provide additional structural integrity for the finished footwear plate 200h at the corresponding locations incorporating the integrally formed protruding elements 215h and, further, to provide sufficient material to form the protruding elements 215h. The stitching 304 may penetrate through at least the top surface 410h of the substrate 400h and zigzag across the first tow 310h and the second tow 320h between the attachment locations 305. In some configurations, the stitching 304 penetrates through the first tow 310h of fibers 350. The non-polymer fibers 352 (e.g., carbon fibers) and the polymer fibers 354 (e.g., thermoplastic polymer fibers) may include circular cross sections that co-mingle with each other throughout the length of the first tow 310.

FIG. 65 shows the mold 80h closed and pressure applied to the embroidered preform by subjecting the preform 300h, 400h to at least one of compression molding and vacuum molding while enclosed between the mold portions 82, 84h. As described above with reference to FIG. 61, the mold 80h may simultaneously apply heat to assist with the embroidered preform conforming to the shape of at least one of the corresponding contact surfaces 86, 88h and to form the protruding elements 215h within the respective cavities 89h. This process may also cure the embroidered preform to provide the footwear plate 200h including the protruding elements 215h extending from the ground-engaging surface 212h and having the three-dimensional shape and structural rigidity.

The application of heat and pressure while the mold 80h is closed is operative to thermoform the thermoplastic polymer fibers 354 of the tows 300h, the thermoplastic stitching 304, and the thermoplastic film to join the tows 300h and the tips 217h (if present) to the substrate 400h. Additionally or alternatively, portions of the tips 217h that contact the material of the second tow 320h during formation of the protruding elements 215h may be formed from thermoplastic materials, or coated with thermoplastic materials, to facilitate bonding with the protruding elements 215h within the mold portions 82, 84h. The resin material 652 may be incorporated to assist in binding the tows 300h and substrate 400h at each of the discrete regions 218. In other configurations, a liquid thermoplastic material may be injected into the cavities 89h to form the tips 217h into the embroidered preform upon compressing the preform 300h, 400h between the upper mold portion 82 and the lower mold portion 84h.

Referring to FIG. 66, the mold 80h opens by translating the upper mold portion 82 away from the lower mold portion 84h and/or the lower mold portion 84h away from upper mold portion 82. The thermoplastic polymer fibers 354 co-mingled through the length of the tows 300h, the thermoplastic material forming the substrate 400h and/or the stitching 304 are cured to form the substantially rigid footwear plate 200h with a three-dimensional shape and the protruding elements 215h formed into the plate 200h and projecting from the ground-engaging surface 212h thereof. Thereafter, the footwear plate 200h may be incorporated into the article of footwear 10h.

FIGS. 67-70 provide embroidered preforms used to form three-dimensional and substantially rigid plates 200i, 200j, 200k, 200l that may be incorporated into athletic equipment and/or apparel. In view of the substantial similarity in structure and function of the components associated with the footwear plate 200*i*-1 with respect to the footwear plate 200, like reference numerals are used hereinafter and in the drawings to identify like components while like reference numerals containing letter extensions are used to identify those components that have been modified.

FIG. 67 provides one or more composite plates 200*i* that may be incorporated into athletic apparel to provide padding with increased durability, increased strength, and/or reduced weight compared to conventional padding. The composite plates 200*i* are substantially rigid and designed with an emphasis to absorb impacts directed toward thighs and/or knees of an athlete. While the example shown includes a pair of football pants 1100 incorporating multiple composite plates 200*i* to provide padding, other examples may include girdles, pants, shorts, or shirts that incorporate one or more composite plates 200*i* to provide padding for other sports. For instance, a hockey girdle may incorporate one or more of the composite plates 200*i* having modified shapes to absorb impacts along the thighs, hips, or tail bone. Each plate 200*i* may be formed from at least one tow 300*i* of fibers 350 affixed/attached to a surface of a substrate 400 to form one or more layers of fibers 350 upon the substrate.

In some examples, multiple tows 300*i* of fibers 350 are affixed/attached to the substrate to form corresponding layers on the substrate. Stitching (e.g., thermoplastic stitching) may be used to join the tows 300*i* to the substrate. In these examples, at least one of the tows 300*i* is applied to the substrate in a different shape than the other tows 300*i* applied to the substrate. Additionally or alternatively, the each tow 300*i* may be formed from a same continuous, strand of fibers 350, or at least one of the tows 300*i* may be formed from a different strand of fibers 350 than the other tows. Moreover, a density/concentration of tows 300*i* may vary across the plate 200*i* to provide gradient stiffness properties along the plate 200*i*. For instance, center regions of the plates 200*i* may include a greater concentration of fibers 350 than perimeter regions of the plates 200*i* to provide increased stiffness at locations where the force of an impact is greater. For instance, at least two different tows 300*i* of fibers 350 may overlap in specified regions of the plates 200*i* to increase the concentration of fibers 350. The material(s) of the tows 300*i* of fibers 350 may cooperate to provide gradient stiffness and gradient load paths throughout the plate 200*i*. FIG. 67 shows the multiple tows 300*i* of fibers 350 including curved paths that change directions based on anatomical features of the leg and/or knee. The plate 200*i* may be subjected to heat and pressure to form the plate 200*i* with a three-dimensional shape and cured to impart structural rigidity throughout the plate 200*i*.

FIG. 68 provides a perspective view of a baseball cap 1200 including a brim 1202 formed from a tow 300*j* of fibers 350 attached to a substrate 400*j* in accordance with principles of the present disclosure. The brim 1202 may attach a cap portion 1204 that fits around a head and that may be formed from one or more textile materials. In some examples, the brim 1202 is integrally formed with the substrate 400*j* used to form a curved and substantially rigid plate 200*j* that extends from the cap portion 1204. The substantially rigid plate 200*j* may impart properties of low weight associated with conventional brims 1202 while providing increased durability over a lifespan of the cap 1200. In some examples, one or more tows 300*j* of fibers 350 attach to a surface of the substrate 400*j* to provide an embroidered preform that may be subjected to heat and pressure to form the plate 200*j* having a curved profile and cured to impart increased rigidity throughout the plate 200*j*. In some examples, the finished plate 200*j* may be encapsulated within a textile material to provide the appearance of a conventional brim 1202 and attached to the cap portion 1204. In other examples, at least a portion of the plate 200*j* may be exposed for aesthetics.

FIG. 69 provides a perspective view of a helmet 1302 incorporating a composite plate 200*k* formed from at least one tow 300*k* of fibers 350 in accordance with principles of the present disclosure. The composite plate 200*k* is substantially rigid and designed with an emphasis to absorb head-impacts that may result in sports such as, without limitation, cycling, hockey, football, lacrosse, skateboarding, and kayaking. The plate 200*k* may be formed from at least one tow 300*k* of fibers 350 affixed/attached to a surface of a substrate 400 to form one or more layers on the substrate. For instance, each tow 300*k* may be formed from a same continuous, strand of fibers 350, or at least one tow 300*k* may be formed from a different strand of fibers 350 than the other tows. For instance, some tows 300*k* may surround a perimeter of voids 1302 formed in the helmet 1302 while other tows 300*k* may extend around or terminate at each of the voids 1302. Moreover, a density/concentration of tows 300*k* may vary across the plate 200*k* to provide gradient stiffness properties along the plate 200*k*. For instance, regions of the plates 200*k* that surround the sides and back of the head may provide a greater concentration of fibers 350 that regions of the plate 200*k* extending over the top of the head to provide increased stiffness at locations where impact forces are greater. The material(s) of the tows 300*k* of fibers 350 may cooperate to provide gradient stiffness and gradient load paths throughout the plate 200*k*.

FIG. 70 provides a top view of a preform plate 200*l* including a first tow 300*l*, 310*l* of fibers 350 and a second tow 300*l*, 320*l* of fibers 350 disposed upon a top surface of a substrate 400*l* view to form a shin guard 1400 in accordance with principles of the present disclosure Stitching may attach the tows 310*l*, 320*l* to the substrate 400*l* at corresponding attachment locations that may penetrate the substrate 400*l* through at least the top surface of the substrate. The first tow 310*l* (i.e., first strand portion) may define a plurality of first segments 312*l* that each extend between two different locations along the substrate 400*l* to form a layer thereon and define at least one void 1402 exposing the substrate 400*l*. In some configurations, portions of the first segments 312*l* that extend beyond a perimeter edge 402*l* of the substrate 400*l* are removed to define a perimeter of the finished shin guard 1400. In some examples, looped portions of the first segments 312*l* that extend outside the perimeter edge 402*l* are removed to eliminate the presence of pinch points when the embroidered preform plate 200*l* is subjected to heat and pressure. The substrate 400*l* may be removed within each void 1402 to provide the shin guard 1400 with the one or more voids 1402 to reduce weight. The second tow 320*l* of fibers 350 may operate as an inner reinforcement area surrounding the voids 1402. Here, the inner reinforcement area defined by the second tow 320*l* may provide additional reinforcement or structural support for the first segments 312*l* of the first tow 310*l* in regions proximate to the at least one void 1402.

The following Clauses provide an exemplary configuration for a method of forming an article of footwear.

Clause 1: A method of forming an article of footwear comprising attaching a first strand portion to a flexible substrate to form a first layer on the substrate, positioning a second strand portion on the first layer to form a second layer on the first layer in a plurality of discrete regions on the substrate, positioning the substrate on a first mold surface to change a shape of the substrate, and applying at least one of heat and pressure to the first strand portion, the second strand portion, and the substrate to conform the substrate to the shape of the first mold surface and to form traction elements from the second strand portion at each of the discrete regions. The method also includes incorporating the substrate into an article of footwear.

Clause 2: The method of Clause 1, wherein positioning the substrate on the first mold surface includes aligning cavities formed into the first mold surface with the discrete regions of the substrate.

Clause 3: The method of any of the preceding clauses, wherein attaching the first strand portion to the flexible substrate includes attaching the first strand portion to the flexible substrate via first stitching that crosses over the first strand portion and penetrates the substrate at first attachment locations that are spaced apart from the first strand portion.

Clause 4: The method of any of the preceding clauses, wherein positioning the second portion on the first layer includes attaching the first strand portion to the flexible substrate via second stitching that crosses over the second strand portion, extends through the first strand portion, and penetrates the substrate at second attachment locations disposed in the discrete regions of the substrate.

Clause 5: The method of any of the preceding clauses, further comprising forming the second strand portion from a plurality of different strands of fibers each corresponding to one of the discrete regions.

Clause 6: The method of Clause 1, further comprising forming at least one of the first strand portion and the second strand portion of the same, continuous strand.

Clause 7: The method of any of the preceding clauses, further comprising forming the first strand portion from a first tow of fibers including at least one of carbon fibers, boron fibers, glass fibers, and polymeric fibers.

Clause 8: The method of any of the preceding clauses, further comprising forming the second strand portion from a second tow of fibers including at least one of carbon fibers, boron fibers, glass fibers, and polymeric fibers.

Clause 9: The method of any of the preceding clauses, further comprising: providing the first strand portion with looped portions disposed proximate to a peripheral edge of the substrate, the looped portions connecting adjacent first segments; and removing at least one of the looped portions that extends outside the peripheral edge of the substrate.

Clause 10: The method of any of the preceding clauses, further comprising providing the first layer and the second layer with segments having different densities.

Clause 11: The method of any of the preceding clauses, wherein attaching the first strand portion includes applying first segments of the first strand portion to the substrate in a first shape and positioning the second strand portion includes applying second segments of the second strand portion to the first layer in a second shape different than the first shape.

Clause 12: The method of any of the preceding clauses, wherein applying at least one of heat and pressure includes at least one of activating a polymeric resin incorporated into the first strand portion and the second strand portion and infusing the first strand portion, the second strand portion and the substrate with a liquid material, the liquid material being a thermoset material.

Clause 13: The method of any of the preceding clauses, wherein applying at least one of heat and pressure includes subjecting the first strand portion, the second strand portion, and the substrate to at least one of vacuum molding and compression molding.

Clause 14: The method of any of the preceding clauses, further comprising forming the substrate from a thermoplastic film.

Clause 15: The method of any of the preceding clauses, wherein incorporating the substrate into the article of footwear includes attaching the substrate to an upper of the article of footwear.

Clause 16: The method of any of the preceding clauses, further comprising positioning a third strand portion on the substrate between the plurality of traction elements.

Clause 17: The method of Clause 16, wherein positioning a third strand portion on the substrate between the plurality of traction elements includes wrapping the third strand portion around the plurality of traction elements.

Clause 18: The method of any of the preceding clauses, further comprising positioning a plurality of traction element tips into corresponding cavities formed into the first mold surface and wherein applying at least one of heat and pressure to the first strand portion, the second strand portion, and the substrate comprises applying at least one of heat and pressure to the first strand portion, the second strand portion, the substrate, and the traction element tips.

Clause 19: The method of Clause 18, further comprising attaching the traction element tips to respective ones of the plurality of traction elements.

Clause 20: A method of forming an article of footwear, the method comprising: attaching a first strand portion to a flexible first substrate to form a first layer on the first substrate; positioning a second strand portion on the first layer at a first region to form a second layer on the first layer within the first region, the second layer cooperating with the first layer to provide an area of increased thickness within the first region; positioning the first substrate on a first mold surface to change a shape of the first substrate; applying at least one of heat and pressure to the first strand portion, the second strand portion, and the first substrate to conform the first substrate to the shape of the first mold surface; and incorporating the first substrate into an article of footwear.

Clause 21: The method of Clause 20, wherein positioning the second strand portion on the first layer at the first region includes positioning the second strand portion on the first layer within a midfoot region of the first substrate.

Clause 22: The method of any of the preceding clauses, further comprising positioning the second strand portion on a second substrate.

Clause 23: The method of Clause 22, wherein positioning the second strand portion on the first layer includes positioning the second substrate between the second strand portion and the first strand portion.

Clause 24: The method of Clause 20, wherein positioning the second strand portion on the first layer at the first region includes positioning the second strand portion directly on the first layer.

Clause 25: The method of Clause 20, wherein positioning the second strand portion on the first layer at the first region includes positioning the second strand portion on the first layer within a heel region of the first substrate.

Clause 26: The method of Clause 25, wherein positioning the second strand portion within the heel region includes extending the second strand portion around a perimeter edge of the first substrate.

Clause 27: The method of Clause 26, wherein extending the second strand portion around a perimeter edge of the substrate includes extending a plurality of segments of the second strand portion from a medial side of the first substrate to a lateral side of the first substrate.

Clause 28: The method of Clause 27, further comprising layering adjacent segments of the plurality of segments of the second strand portion on top of one another.

Clause 29: The method of Clause 28, wherein layering adjacent segments of the plurality of segments of the second strand portion includes forming sequential layers that are progressively further away from the first layer and/or are progressively shorter as the segments are deposited on one another.

Clause 30: The method of Clauses 25-29, further comprising attaching the second strand portion to a second substrate.

Clause 31: The method of Clause 30, further comprising attaching the second substrate to the first substrate.

Clause 32: The method of Clause 31, wherein attaching the second substrate to the first substrate includes attaching the second substrate to the first substrate proximate to an outer perimeter edge of the first substrate within the heel region.

Clause 33: The method of Clause 31, wherein attaching the second substrate to the first substrate includes attaching the second substrate to the first substrate along an outer perimeter edge of the first substrate within the heel region.

Clause 34: The method of Clauses 25-29, further comprising folding the first substrate at the heel region to form the first substrate into a first segment and a second segment, the first segment defining the heel region, a forefoot region and a midfoot region and the second segment extending in a direction away from the first segment at the heel region.

Clause 35: The method of Clause 34, wherein positioning the second strand portion on the first layer includes positioning the second strand portion on the second segment of the first substrate.

Clause 36: The method of Clause 34, wherein folding the first substrate at the heel region includes positioning the second segment substantially perpendicular to the first segment.

Clause 37: The method of any of the preceding clauses, wherein attaching the first strand portion to the first substrate includes attaching the first strand portion to the first substrate via first stitching that crosses over the first strand portion and penetrates the first substrate at first attachment locations that are spaced apart from the first strand portion.

Clause 38: The method of any of the preceding clauses, wherein positioning the second strand portion on the first layer includes attaching the first strand portion to the first substrate via second stitching that crosses over the second strand portion, extends through the first strand portion, and penetrates the first substrate at second attachment locations disposed in the discrete regions of the first substrate.

Clause 39: The method of any of the preceding clauses, further comprising forming the second strand portion from a plurality of different strands of fibers.

Clause 40: The method of Clause 20, further comprising forming at least one of the first strand portion and the second strand portion of the same, continuous strand.

Clause 41: The method of any of the preceding clauses, further comprising forming the first strand portion from a first tow of fibers including at least one of carbon fibers, boron fibers, glass fibers, and polymeric fibers.

Clause 42: The method of any of the preceding clauses, further comprising forming the second strand portion from a second tow of fibers including at least one of carbon fibers, boron fibers, glass fibers, and polymeric fibers.

Clause 43: The method of any of the preceding clauses, further comprising: providing the first strand portion with looped portions disposed proximate to a peripheral edge of the first substrate, the looped portions connecting adjacent first segments; and removing at least one of the looped portions that extends outside the peripheral edge of the first substrate.

Clause 44: The method of any of the preceding clauses, further comprising providing the first layer and the second layer with segments having different densities.

Clause 45: The method of any of the preceding clauses, wherein attaching the first strand portion includes applying first segments of the first strand portion to the first substrate in a first shape and positioning the second strand portion includes applying second segments of the second strand portion to the first layer in a second shape different than the first shape.

Clause 46: The method of any of the preceding clauses, wherein applying at least one of heat and pressure includes at least one of activating a polymeric resin incorporated into the first strand portion and the second strand portion and infusing the first strand portion, the second strand portion, and the first substrate with a liquid material, the liquid material being a thermoset material.

Clause 47: The method of any of the preceding clauses, wherein applying at least one of heat and pressure includes subjecting the first strand portion, the second strand portion, and the first substrate to at least one of vacuum molding and compression molding.

Clause 48: The method of any of the preceding clauses, further comprising forming the first substrate from a thermoplastic film.

Clause 49: The method of any of the preceding clauses, wherein incorporating the first substrate into the article of footwear includes attaching the first substrate to an upper of the article of footwear.

Clause 50: A method of forming an article of footwear, the method comprising: attaching a first strand portion to a flexible first substrate to form a first layer on the first substrate; extending a second strand portion from the first layer at a first region to form a second layer within the first region, the second layer forming a projection that extends from the first layer at a peripheral edge of the first substrate; positioning the first substrate on a first mold surface to change a shape of the first substrate; applying at least one of heat and pressure to the first strand portion, the second strand portion, and the first substrate to conform the first substrate to the shape of the first mold surface; and incorporating the first substrate into an article of footwear.

Clause 51: The method of Clause 50, wherein extending the second strand portion from the first layer includes extending the second strand portion from the first layer within a midfoot region of the first substrate.

Clause 52: The method of any of the preceding clauses, further comprising positioning the second strand portion on a second substrate.

Clause 53: The method of Clause 52, wherein extending the second strand portion from the first layer includes positioning the second substrate between the second strand portion and the first strand portion.

Clause 54: The method of Clause 50, wherein extending the second strand portion from the first layer at the first region includes positioning the second strand portion directly on the first layer.

Clause 55: The method of Clause 50, wherein extending the second strand portion from the first layer at the first region includes positioning the second strand portion on the first layer within a heel region of the first substrate.

Clause 56: The method of Clause 55, wherein positioning the second strand portion within the heel region includes extending the second strand portion around a perimeter edge of the first substrate.

Clause 57: The method of Clause 56, wherein extending the second strand portion around a perimeter edge of the substrate includes extending a plurality of segments of the second strand portion from a medial side of the first substrate to a lateral side of the first substrate.

Clause 58: The method of Clause 57, further comprising layering adjacent segments of the plurality of segments of the second strand portion on top of one another.

Clause 59: The method of Clause 58, wherein layering adjacent segments of the plurality of segments of the second strand portion includes forming sequential layers that are progressively further away from the first layer and/or are progressively shorter as the segments are deposited on one another.

Clause 60: The method of Clauses 55-59, further comprising attaching the second strand portion to a second substrate.

Clause 61: The method of Clause 60, further comprising attaching the second substrate to the first substrate.

Clause 62: The method of Clause 61, wherein attaching the second substrate to the first substrate includes attaching the second substrate to the first substrate proximate to the outer peripheral edge of the first substrate within the heel region.

Clause 63: The method of Clause 61, wherein attaching the second substrate to the first substrate includes attaching the second substrate to the first substrate along an outer perimeter edge of the first substrate within the heel region.

Clause 64: The method of Clauses 55-59, further comprising folding the first substrate at the heel region to form the first substrate into a first segment and a second segment, the first segment defining the heel region, a forefoot region and a midfoot region and the second segment extending in a direction away from the first segment at the heel region.

Clause 65: The method of Clause 64, wherein extending the second strand portion from the first layer includes positioning the second strand portion on the second segment of the first substrate.

Clause 66: The method of Clause 64, wherein folding the first substrate at the heel region includes positioning the second segment substantially perpendicular to the first segment.

Clause 67: The method of any of the preceding clauses, wherein attaching the first strand portion to the first substrate includes attaching the first strand portion to the first substrate via first stitching that crosses over the first strand portion and penetrates the first substrate at first attachment locations that are spaced apart from the first strand portion.

Clause 68: The method of any of the preceding clauses, wherein positioning the second strand portion on the first layer includes attaching the first strand portion to the first substrate via second stitching that crosses over the second strand portion, extends through the first strand portion, and penetrates the first substrate at second attachment locations disposed in the discrete regions of the first substrate.

Clause 69: The method of any of the preceding clauses, further comprising forming the second strand portion from a plurality of different strands of fibers.

Clause 70: The method of Clause 50, further comprising forming at least one of the first strand portion and the second strand portion of the same, continuous strand.

Clause 71: The method of any of the preceding clauses, further comprising forming the first strand portion from a first tow of fibers including at least one of carbon fibers, boron fibers, glass fibers, and polymeric fibers.

Clause 72: The method of any of the preceding clauses, further comprising forming the second strand portion from a second tow of fibers including at least one of carbon fibers, boron fibers, glass fibers, and polymeric fibers.

Clause 73: The method of any of the preceding clauses, further comprising: providing the first strand portion with looped portions disposed proximate to the peripheral edge of the first substrate, the looped portions connecting adjacent first segments; and removing at least one of the looped portions that extends outside the peripheral edge of the first substrate.

Clause 74: The method of any of the preceding clauses, further comprising providing the first layer and the second layer with segments having different densities.

Clause 75: The method of any of the preceding clauses, wherein attaching the first strand portion includes applying first segments of the first strand portion to the first substrate in a first shape and positioning the second strand portion includes applying second segments of the second strand portion to the first layer in a second shape different than the first shape.

Clause 76: The method of any of the preceding clauses, wherein applying at least one of heat and pressure includes at least one of activating a polymeric resin incorporated into the first strand portion and the second strand portion and infusing the first strand portion, the second strand portion, and the first substrate with a liquid material, the liquid material being a thermoset material.

Clause 77: The method of any of the preceding clauses, wherein applying at least one of heat and pressure includes subjecting the first strand portion, the second strand portion, and the first substrate to at least one of vacuum molding and compression molding.

Clause 78: The method of any of the preceding clauses, further comprising forming the first substrate from a thermoplastic film.

Clause 79: The method of any of the preceding clauses, wherein incorporating the first substrate into the article of footwear includes attaching the first substrate to an upper of the article of footwear.

Clause 80: The method of any of the preceding clauses, wherein extending the second strand portion from the first layer at the peripheral edge includes extending the second strand portion from a peripheral edge located in at least one of a heel region, a midfoot region, and a forefoot region.

Clause 81: The method of any of the preceding clauses, wherein extending the second strand portion from the first layer at the peripheral edge includes extending the second strand portion from a forward-most peripheral edge or a rearward-most peripheral edge of the first substrate, the forward-most peripheral edge being disposed on an opposite end of the first substrate than the rearward-most peripheral edge along a longitudinal axis of the first substrate.

Clause 82: The method of any of the preceding clauses, wherein extending the second strand portion from the first layer at the peripheral edge includes extending the second strand portion from a peripheral edge extending along a medial side of the first substrate or from a peripheral edge extending along a lateral side of the first substrate.

Clause 83: An article made by the method of any of Clauses 1-82.

Clause 84: An article of footwear made by receiving an upper, receiving a plate made by the method of any of Clauses 1-82, and operably connecting the upper to the plate to form the article of footwear.

Clause 85: An article of footwear comprising an upper and a plate including a ground-contacting surface having a plurality of traction elements integrally formed with the plate and extending in a direction away from the upper, a first strand portion forming a first layer, and a second strand portion forming a second layer and disposed on the first strand portion at discrete locations. The second strand portion forming at least a portion of the plurality of traction elements at the discrete locations.

Clause 86: The article of footwear of Clause 85, further comprising a plurality of traction element tips respectively attached to distal ends of the plurality of traction elements.

Clause 87: The article of footwear of Clause 86, wherein the traction element tips are attached to the distal ends via an adhesive.

Clause 88: The article of footwear of Clause 86, wherein the traction element tips are molded onto the distal ends.

Clause 89: The article of footwear of Clauses 85-88, wherein the first strand portion is formed from a first tow of fibers and the second strand portion is formed from a second tow of fibers.

Clause 90: The article of footwear of Clause 89, wherein the first tow of fibers and the second tow of fibers are formed from the same material.

Clause 91: The article of footwear of Clause 89, wherein the first tow of fibers and the second tow of fibers are formed from different materials.

Clause 92: The article of footwear of Clause 89, wherein the first tow of fibers and the second tow of fibers include at least one of carbon fibers, boron fibers, glass fibers, and polymeric fibers.

Clause 93: The article of footwear of any of Clauses 89-92, wherein the first tow of fibers and the second tow of fibers include approximately the same number of fibers.

Clause 94: The article of footwear of any of Clauses 89-92, wherein the first tow of fibers and the second tow of fibers include a different number of fibers.

Clause 95: A plate comprising a first surface including a plurality of protruding elements integrally formed with the plate and extending in a direction away from the first surface, a first strand portion forming a first layer, and a second strand portion forming a second layer and disposed on the first strand portion at discrete locations. The second strand portion forming at least a portion of the plurality of protruding elements at the discrete locations.

Clause 96: The plate of Clause 95, further comprising a plurality of tips respectively attached to distal ends of the plurality of protruding elements.

Clause 97: The plate of Clause 96, wherein the tips are attached to the distal ends via an adhesive.

Clause 98: The plate of Clause 96, wherein the tips are molded onto the distal ends.

Clause 99: The plate of Clauses 95-98, wherein the first strand portion is formed from a first tow of fibers and the second strand portion is formed from a second tow of fibers.

Clause 100: The plate of Clause 99, wherein the first tow of fibers and the second tow of fibers are formed from the same material.

Clause 101: The plate of Clause 99, wherein the first tow of fibers and the second tow of fibers are formed from different materials.

Clause 102: The plate of Clause 99, wherein the first tow of fibers and the second tow of fibers include at least one of carbon fibers, boron fibers, glass fibers, and polymeric fibers.

Clause 103: The plate of any of Clauses 99-102, wherein the first tow of fibers and the second tow of fibers include approximately the same number of fibers.

Clause 104: The plate of any of Clauses 99-102, wherein the first tow of fibers and the second tow of fibers include a different number of fibers.

Clause 105: An article incorporating the plate of any of Clauses 95-104.

Clause 106: An article of footwear incorporating the plate of any of Clauses 95-104.

Clause 107: A plate for an article of footwear, the plate comprising a substrate and a first strand portion attached to the substrate and forming a first layer on the substrate, the first strand portion attached to the substrate via first stitching that crosses over the first strand portion and penetrates the substrate at first attachment locations that are spaced apart from the first strand portion and a second strand portion disposed on the first layer and forming a second layer, the second strand portion attached to the substrate via second stitching that crosses over the second strand portion, extends through the first strand portion, and penetrates the substrate at second attachment locations.

Clause 108: The plate of Clause 107, wherein the first strand portion is disposed between the second attachment locations and the second strand portion.

Clause 109: The plate of any of the preceding clauses, wherein the first strand portion and the second strand portion are portions of the same, continuous strand.

Clause 110: The plate of any of the preceding clauses, wherein the first strand portion and the second strand portion are formed from the same material.

Clause 111: The plate of any of the preceding clauses, wherein the first strand portion and the second strand portion are formed from different materials.

Clause 112: The plate of any of the preceding clauses, wherein the first strand portion is formed from a first tow of fibers.

Clause 113: The plate of clause 112, wherein the first tow of fibers includes at least one of carbon fibers, aramid fibers, boron fibers, glass fibers, and polymer fibers.

Clause 114: The plate of any of the preceding clauses, wherein the second strand portion is formed from a second tow of fibers.

Clause 115: The plate of clause 114, wherein the second tow of fibers includes at least one of carbon fibers, aramid fibers, boron fibers, glass fibers, and polymer fibers.

Clause 116: The plate of clause 115, wherein the second tow of fibers includes approximately the same number of fibers as the first tow of fibers.

Clause 117: The plate of clause 115, wherein the second tow of fibers includes a different number of fibers than the first tow of fibers.

Clause 118: The plate of any of the preceding clauses, wherein the first strand portion and the second strand portion have different lengths.

Clause 119: The plate of any of the preceding clauses, wherein the first strand portion and the second strand portion have approximately the same length.

Clause 120: The plate of any of the preceding clauses, wherein the first strand portion forms a first void in the first layer.

Clause 121: The plate of clause 120, wherein the substrate is exposed within the first void.

Clause 122: The plate of clause 120, wherein the second strand portion forms a second void in the second layer.

Clause 123: The plate of clause 122, wherein the second void is aligned with the first void to expose the substrate at the second layer.

Clause 124: The plate of clause 122, wherein the second void is spaced apart from the first void.

Clause 125: The plate of any of the preceding clauses, wherein the first strand portion is applied to the substrate in a first shape and the second strand portion is applied to the first layer in a second shape.

Clause 126: The plate of clause 125, wherein the first shape is approximately the same as the second shape.

Clause 127: The plate of clause 125, wherein the first shape is different than the second shape.

Clause 128: The plate of any of the preceding clauses, wherein at least one of the first stitching and the second stitching is formed from resin.

Clause 129: The plate of any of the preceding clauses, wherein at least one of the first stitching and the second stitching is formed from the same material as the substrate.

Clause 130: The plate of any of the preceding clauses, wherein at least one of the first stitching and the second stitching has a higher melting point than the substrate.

Clause 131: The plate of any of the preceding clauses, wherein the first stitching zigzags across the first strand portion between the first attachment locations.

Clause 132: The plate of any of the preceding clauses, wherein the second stitching zigzags across the second strand portion between the second attachment locations.

Clause 133: A plate for an article of footwear, the plate comprising a substrate defining a peripheral edge and a first strand portion attached to the substrate and including first segments that each extend between two different locations along the peripheral edge of the substrate to form a first layer on the substrate, the first segments being disposed adjacent and substantially parallel to one another and a second strand portion disposed on the first layer and including second segments that each extend between two different locations along the peripheral edge of the substrate to form a second layer on the first layer, the second segments being convergent with the first segments and disposed adjacent and substantially parallel to one another.

Clause 134: The plate of clause 133, wherein at least one of the first strand portion and the second strand portion is a continuous strand.

Clause 135: The plate of any of the preceding clauses, wherein the first strand portion and the second strand portion are portions of the same, continuous strand.

Clause 136: The plate of any of the preceding clauses, wherein the first strand portion and the second strand portion are formed from the same material.

Clause 137: The plate of any of the preceding clauses, wherein the first strand portion and the second strand portion are formed from different materials.

Clause 138: The plate of any of the preceding clauses, wherein the first strand portion is formed from a first tow of fibers.

Clause 139: The plate of clause 138, wherein the first tow of fibers includes at least one of carbon fibers, aramid fibers, boron fibers, glass fibers, and polymer fibers.

Clause 140: The plate of any of the preceding clauses, wherein the second strand portion is formed from a second tow of fibers.

Clause 141: The plate of clause 140, wherein the second tow of fibers includes at least one of carbon fibers, aramid fibers, boron fibers, glass fibers, and polymer fibers.

Clause 142: The plate of clause 141, wherein the second tow of fibers includes approximately the same number of fibers as the first tow of fibers.

Clause 143: The plate of clause 141, wherein the second tow of fibers includes a different number of fibers than the first tow of fibers.

Clause 144: The plate of any of the preceding clauses, wherein the first strand portion includes first looped portions disposed proximate to the peripheral edge of the substrate, the first looped portions connecting adjacent first segments.

Clause 145: The plate of any of the preceding clauses, wherein the second strand portion includes second looped portions disposed proximate to the peripheral edge of the substrate, the second looped portions connecting adjacent second segments.

Clause 146: The plate of any of the preceding clauses, wherein the first strand portion forms a first void in the first layer.

Clause 147: The plate of clause 146, wherein the substrate is exposed within the first void.

Clause 148: The plate of clause 146, wherein the second strand portion forms a second void in the second layer.

Clause 149: The plate of clause 148, wherein the second void is aligned with the first void to expose the substrate at the second layer.

Clause 150: The plate of clause 148, wherein the second void is spaced apart from the first void.

Clause 151: The plate of any of the preceding clauses, wherein the first segments are applied to the substrate at a first angle relative to a longitudinal axis of the substrate and the second segments are applied to the first layer at a second angle relative to the longitudinal axis of the substrate that is different than the first angle.

Clause 152: The plate of clause 151, further comprising a third strand portion disposed on the second layer and including third segments that each extend between two different locations along the peripheral edge of the substrate to form a third layer on the second layer, the third segments being convergent with the first segments and the second segments and disposed adjacent and substantially parallel to one another.

Clause 153: The plate of clause 152, wherein the third segments are applied to the second layer at a third angle relative to the longitudinal axis of the substrate that is different than the first angle and the second angle.

Clause 154: The plate of any of the preceding clauses, wherein the first strand portion is attached to the substrate via first stitching and the second strand portion is attached to the substrate via second stitching.

Clause 155: The plate of Clause 154, wherein at least one of the first stitching and the second stitching is formed from the same material as the substrate.

Clause 156: The plate of Clause 154, wherein at least one of the first stitching and the second stitching has a higher melting point than the substrate.

Clause 157: The plate of Clause 154, wherein at least one of the first stitching and the second stitching is formed from resin.

Clause 158: The plate of Clause 154, wherein the first stitching zigzags across the first strand portion and penetrates the substrate at first attachment locations.

Clause 159: The plate of Clause 158, wherein the first attachment locations are spaced apart from the first strand portion.

Clause 160: The plate of Clause 158, wherein the second stitching zigzags across the second strand portion and penetrates the substrate at second attachment locations.

Clause 161: The plate of Clause 160, wherein the first strand portions are disposed between the second layer and the second attachment locations.

Clause 162: The plate of Clause 160, wherein the second stitching extends though the first strand portion.

Clause 163: The plate of any of the preceding clauses, wherein the first layer and the second layer are anisotropic.

Clause 164: A plate for an article of footwear, the plate comprising a substrate and a first strand portion attached to the substrate and forming a first layer on the substrate, the first strand portion forming a first void in the first layer to expose the substrate within the first void.

Clause 165: The plate of Clause 164, further comprising a second strand portion disposed on the first layer and forming a second layer.

Clause 166: The plate of Clause 165, wherein the first strand portion and the second strand portion are portions of the same, continuous strand.

Clause 167: The plate of Clause 165, wherein the first strand portion and the second strand portion are formed from the same material.

Clause 168: The plate of Clause 165, wherein the first strand portion and the second strand portion are formed from different materials.

Clause 169: The plate of any of Clause 165, wherein the first strand portion and the second strand portion have different lengths.

Clause 170: The plate of Clause 165, wherein the first strand portion and the second strand portion have approximately the same length.

Clause 171: The plate of Clause 165, wherein the second strand portion forms a second void in the second layer.

Clause 172: The plate of Clause 171, wherein the second void is aligned with the first void to expose the substrate at the second layer.

Clause 173: The plate of Clause 171, wherein the second void is spaced apart from the first void.

Clause 174: The plate of Clause 165, wherein the first strand portion is applied to the substrate in a first shape and the second strand portion is applied to the first layer in a second shape.

Clause 175: The plate of Clause 174, wherein the first shape is approximately the same as the second shape.

Clause 176: The plate of Clause 174, wherein the first shape is different than the second shape.

Clause 177: The plate of any of the preceding clauses, wherein the first strand portion is attached to the substrate by stitching.

Clause 178: The plate of Clause 177, wherein the stitching is formed from resin.

Clause 179: The plate of Clause 177, wherein the stitching is formed from the same material as the substrate.

Clause 180: The plate of Clause 177, wherein the stitching has a higher melting point than the substrate.

Clause 181: The plate of Clause 177, wherein the stitching zigzags across the first strand portion between attachment locations located on the substrate.

Clause 182: The plate of any of the preceding clauses, wherein the first strand portion is formed from a first tow of fibers.

Clause 183: The plate of Clause 182, wherein the first tow of fibers includes at least one of carbon fibers, aramid fibers, boron fibers, glass fibers, and polymer fibers.

Clause 184: The plate of any of the preceding clauses, further comprising a second strand portion disposed on the first layer and forming a second layer, the second strand portion being formed from a second tow of fibers.

Clause 185: The plate of Clause 184, wherein the second tow of fibers includes at least one of carbon fibers, aramid fibers, boron fibers, glass fibers, and polymer fibers.

Clause 186: The plate of Clause 184, wherein the second tow of fibers includes approximately the same number of fibers as the first tow of fibers.

Clause 187: The plate of Clause 184, wherein the second tow of fibers includes a different number of fibers than the first tow of fibers.

Clause 188: A plate for an article of footwear, the plate comprising a substrate defining a first region and a second region and a first strand portion attached to and opposing the substrate in one of the first region and the second region and including a first pattern providing the one of the first region and the second region with first performance characteristics and a second strand portion attached to and opposing the substrate in the other of the first region and the second region and including a second pattern different than the first pattern and providing the other of the first region and the second region with second performance characteristics different than the first performance characteristics.

Clause 189: The plate of Clause 82, wherein the first strand portion forms a first edge to define a shape of the one of the first region and the second region.

Clause 190: The plate of any of the preceding clauses, wherein the second strand portion forms a second edge to define a shape of the other of the first region and the second region.

Clause 191: The plate of Clause 190, wherein the first edge is spaced apart and separated from the second edge.

Clause 192: The plate of Clause 190, wherein the first edge abuts the second edge.

Clause 193: The plate of and of the preceding clauses, wherein the first strand portion and the second strand portion are portions of the same, continuous strand.

Clause 194: The plate of any of the preceding clauses, wherein the first strand portion and the second strand portion are formed from the same material.

Clause 195: The plate of any of the preceding clauses, wherein the first strand portion and the second strand portion are formed from different materials.

Clause 196: The plate of any of the preceding clauses, wherein the first strand portion is formed from a first tow of fibers.

Clause 197: The plate of Clause 196, wherein the first tow of fibers includes at least one of carbon fibers, aramid fibers, boron fibers, glass fibers, and polymer fibers.

Clause 198: The plate of any of the preceding clauses, wherein the second strand portion is formed from a second tow of fibers.

Clause 199: The plate of Clause 188, wherein the second tow of fibers includes at least one of carbon fibers, aramid fibers, boron fibers, glass fibers, and polymer fibers.

Clause 200: The plate of Clause 199, wherein the second tow of fibers includes approximately the same number of fibers as the first tow of fibers.

Clause 201: The plate of Clause 199, wherein the second tow of fibers includes a different number of fibers than the first tow of fibers.

Clause 202: The plate of any of the preceding clauses, wherein the first strand portion and the second strand portion have different lengths.

Clause 203: The plate of any of the preceding clauses, wherein the first strand portion and the second strand portion have approximately the same length.

Clause 204: The plate of any of the preceding clauses, wherein at least one of the first strand portion and the second strand portion forms a void in at least one of the first region and the second region.

Clause 205: The plate of Clause 204, wherein the substrate is exposed within the void.

Clause 206: The plate of any of the preceding clauses, wherein the first strand portion and the second strand portion have different thicknesses.

Clause 207: The plate of any of the preceding clauses, wherein the first strand portion and the second strand portion have approximately the same thickness.

Clause 208: The plate of any of the preceding clauses, wherein the first region and the second region have different thicknesses.

Clause 209: The plate of any of the preceding clauses, wherein the first region and the second region have approximately the same thickness.

Clause 210: The plate of any of the preceding clauses, wherein one of the first region and the second region is located in one of a forefoot portion, a midfoot portion, and a heel portion of the article of footwear and the other of the first region and the second region is located in another of the forefoot portion, the midfoot portion, and the heel portion of the article of footwear.

Clause 211: The plate of any of the preceding clauses, wherein the first strand portion is attached to the substrate via first stitching and the second strand portion is attached to the substrate via second stitching.

Clause 212: The plate of Clause 211, wherein at least one of the first stitching and the second stitching is formed from resin.

Clause 213: The plate of any of Clause 211, wherein at least one of the first stitching and the second stitching is formed from the same material as the substrate.

Clause 214: The plate of Clause 211, wherein at least one of the first stitching and the second stitching has a higher melting point than the substrate.

Clause 215: The plate of Clause 211, wherein the first stitching zigzags across the first strand portion and penetrates the substrate at first attachment locations that are spaced apart from the first strand portion.

Clause 216: The plate of Clause 215, wherein the second stitching zigzags across the second strand portion and penetrates the substrate at second attachment locations that are spaced apart from the second strand portion.

Clause 217: The plate of Clause 211, wherein the second stitching zigzags across the second strand portion and penetrates the substrate at second attachment locations that are spaced apart from the second strand portion.

Clause 218. A plate for an article of footwear, the plate comprising a substrate having a forefoot region and a heel region and a first strand portion attached to the substrate and including a plurality of segments that extend between a first end disposed in the forefoot region and a second end disposed in the heel region, the plurality of segments crossing one another in a midfoot region disposed between the forefoot region and the heel region.

Clause 219: The plate of Clause 218, wherein the first strand portion is formed from a continuous strand.

Clause 220: The plate of Clause 219, wherein the first strand portion includes first looped portions joining respective first ends of the plurality of segments and second looped portions joining respective second ends of the plurality of segments, the plurality of segments, the first looped portions, and the second looped portions cooperating to provide the first strand portion with a continuous construction.

Clause 221: The plate of any of the preceding clauses, wherein the first strand portion extends onto an upper of the article of footwear.

Clause 222: The plate of any of the preceding clauses, further comprising tensile strands extending between and connecting the first strand portion to an upper of the article of footwear.

Clause 223: The plate of Clause 222, wherein the tensile strands are attached to the first strand portion along at least one of the plurality of segments between the first end and the second end of the at least one of the plurality of segments.

Clause 224: The plate of Clause 223, further comprising a lace operable to move the upper between a tightened state and a relaxed state, the tensile strands extending between and joining the lace and the at least one of the plurality of segments.

Clause 225: The plate of Clause 218, wherein the substrate includes cleat members extending from a surface thereof.

Clause 226: The plate of Clause 225, wherein the first strand portion is attached to the surface of the substrate and extends around a portion of the cleat members.

Clause 227: The plate of Clause 225, wherein the first strand portion is attached to the surface of the substrate and surrounds at least one of the cleat members.

Clause 228: The plate of Clause 225, wherein the first strand portion is attached to the surface of the substrate and at least one of the plurality of segments surrounds at least one of the cleat members.

Clause 229: The plate of any of the preceding clauses, wherein the plurality of segments are woven together at the midfoot region.

Clause 230: The plate of any of the preceding clauses, wherein the first strand portion is formed from a first tow of fibers.

Clause 231: The plate of Clause 230, wherein the first tow of fibers includes at least one of carbon fibers, aramid fibers, boron fibers, glass fibers, and polymer fibers.

Clause 232: The plate of any of the preceding clauses, wherein the first strand portion forms at least one void between at least two of the segments.

Clause 233: The plate of Clause 232, wherein the substrate is exposed within the at least one void.

Clause 234: The plate of Clause 232, wherein a first bundle of the plurality of segments and a second bundle of the plurality of segments cooperate to define the at least one void.

Clause 235: The plate of Clause 232, wherein the at least one void is disposed between the first bundle and the second.

Clause 236: A method of forming a plate for an article of footwear, the method comprising: stitching a first strand portion to a substrate to form a first layer on the substrate including applying first stitching that crosses over the first strand portion and penetrates the substrate at first attachment locations that are spaced apart from the first strand portion and stitching a second strand portion on the first layer to form a second layer including applying second stitching that crosses over the second strand portion, extends through the first strand portion, and penetrates the substrate at second attachment locations.

Clause 237: The method of Clause 236, wherein stitching the second strand portion on the first layer includes positioning the first strand portion between the second attachment locations and the second strand portion.

Clause 238: The method of any of the preceding clauses, further comprising forming the first strand portion and the second strand portion of the same, continuous strand.

Clause 239: The method of any of the preceding clauses, further comprising forming the first strand portion and the second strand portion from the same material.

Clause 240: The method of any of the preceding clauses, further comprising forming the first strand portion and the second strand portion from different materials.

Clause 241: The method of any of the preceding clauses, further comprising forming the first strand portion from a first tow of fibers.

Clause 242: The method of Clause 241, wherein forming the first strand portion from the first tow of fibers includes forming the first strand portion from at least one of carbon fibers, aramid fibers, boron fibers, glass fibers, and polymer fibers.

Clause 243: The method of any of the preceding clauses, further comprising forming the second strand portion from a second tow of fibers.

Clause 244: The method of Clause 243, wherein forming the second strand portion from the second tow of fibers includes forming the second strand portion from at least one of carbon fibers, aramid fibers, boron fibers, glass fibers, and polymer fibers.

Clause 245: The method of Clause 244, wherein forming the second strand from the second tow of fibers includes providing approximately the same number of fibers as the first tow of fibers.

Clause 246: The method of Clause 244, wherein forming the second strand from the second tow of fibers includes providing a different number of fibers than the first tow of fibers.

Clause 247: The method of any of the preceding clauses, further comprising providing the first strand portion and the second strand portion with different lengths.

Clause 248: The method of any of the preceding Clauses, further comprising providing the first strand portion and the second strand portion with approximately the same length.

Clause 249: The method of any of the preceding clauses, wherein stitching the first strand portion to the substrate includes forming a first void in the first layer.

Clause 250: The method of Clause 249, further comprising exposing the substrate within the first void.

Clause 251: The method of Clause 249, wherein stitching the second strand portion on the first layer includes forming a second void in the second layer.

Clause 252: The method of Clause 251, wherein forming the second void includes aligning the second void with the first void to expose the substrate at the second layer.

Clause 253: The method of Clause 251, wherein forming the second void includes spacing apart the second void from the first void.

Clause 254: The method of any of the preceding clauses, wherein stitching the first strand portion to the substrate includes applying the first strand portion to the substrate in a first shape and stitching the second strand portion on the first layer includes applying the second strand portion to the first layer in a second shape.

Clause 255: The method of Clause 254, wherein applying the first strand portion in the first shape and applying the second strand portion in the second shape includes applying the first strand portion and the second strand portion in approximately the same shape.

Clause 256: The method of Clause 254, wherein applying the first strand portion in the first shape and applying the second strand portion in the second shape includes applying the first strand portion and the second strand portion in different shapes.

Clause 257: The method of any of the preceding clauses, wherein at least one of applying the first stitching and applying the second stitching includes applying stitching formed from resin.

Clause 258: The method of any of the preceding clauses, wherein at least one of applying the first stitching and applying the second stitching includes applying stitching that is formed from the same material as the substrate.

Clause 259: The method of any of the preceding clauses, wherein at least one of applying the first stitching and applying the second stitching includes applying stitching that has a higher melting point than the substrate.

Clause 260: The method of any of the preceding clauses, wherein applying the first stitching includes zigzagging the first stitching across the first strand portion between first attachment locations.

Clause 261: The method of any of the preceding clauses, wherein applying the second stitching includes zigzagging the second stitching across the second strand portion between the second attachment locations.

Clause 262: The method of Clause 236, further comprising applying at least one of heat and pressure to the first strand portion and the second strand portion to bind the first strand portion to both the substrate and the second strand portion.

Clause 263: The method of Clause 262, wherein applying at least one of heat and pressure includes forming the substrate, the first strand portion, and the second strand portion into a desired shape.

Clause 264: A method of forming a plate for an article of footwear, the method comprising: attaching a first strand portion to a substrate including positioning first segments of the first strand portion on the substrate with each first segment extending between two different locations along a peripheral edge of the substrate to form a first layer on the substrate, the first segments being disposed adjacent and substantially parallel to one another and positioning a second strand portion on the first layer including positioning second segments of the second strand portion on the first layer with each second segment extending between two different locations along the peripheral edge of the substrate to form a second layer on the first layer, the second segments being convergent with the first segments and disposed adjacent and substantially parallel to one another.

Clause 265: The method of Clause 264, wherein at least one of attaching the first strand portion to the substrate and positioning the second strand portion on the first layer includes positioning a continuous strand.

Clause 266: The method of any of the preceding clauses, wherein attaching the first strand portion to the substrate and positioning the second strand portion on the first layer includes positioning a single, continuous strand.

Clause 267: The method of any of the preceding clauses, further comprising forming the first strand portion and the second strand portion from the same material.

Clause 268: The method of any of the preceding clauses, further comprising forming the first strand portion and the second strand portion from different materials.

Clause 269: The method of any of the preceding clauses, further comprising forming the first strand portion from a first tow of fibers.

Clause 270: The method of Clause 269, wherein forming the first strand portion from the first tow of fibers includes forming the first strand portion from at least one of carbon fibers, aramid fibers, boron fibers, glass fibers, and polymer fibers.

Clause 271: The method of any of the preceding clauses, further comprising forming the second strand portion from a second tow of fibers.

Clause 272: The method of Clause 271, wherein forming the second strand portion from the second tow of fibers includes forming the second strand portion from at least one of carbon fibers, aramid fibers, boron fibers, glass fibers, and polymer fibers.

Clause 273: The method of Clause 272, wherein forming the second strand from the second tow of fibers includes providing approximately the same number of fibers as the first tow of fibers.

Clause 274: The method of Clause 272, wherein forming the second strand from the second tow of fibers includes providing a different number of fibers than the first tow of fibers.

Clause 275: The method of any of the preceding clauses, further comprising providing the first strand portion with first looped portions disposed proximate to the peripheral edge of the substrate, the first looped portions connecting adjacent first segments.

Clause 276: The method of any of the preceding clauses, further comprising providing the second strand portion with second looped portions disposed proximate to the peripheral edge of the substrate, the second looped portions connecting adjacent second segments.

Clause 277: The method of any of the preceding clauses, wherein attaching the first strand portion to the substrate includes forming a first void in the first layer.

Clause 278: The method of Clause 277, further comprising exposing the substrate within the first void.

Clause 279: The method of Clause 277, wherein positioning the second strand portion on the first layer includes forming a second void in the second layer.

Clause 280: The method of Clause 279, wherein forming the second void includes aligning the second void with the first void to expose the substrate at the second layer.

Clause 281: The method of Clause 279, wherein forming the second void includes spacing apart the second void from the first void.

Clause 282: The method of any of the preceding clauses, wherein positioning the first segments of the first strand portion on the substrate includes applying the first segments at a first angle relative to a longitudinal axis of the substrate and positioning the second segments of the second strand portion on the first layer includes applying the second segments at a second angle relative to the longitudinal axis of the substrate that is different than the first angle.

Clause 283: The method of Clause 282, further comprising positioning a third strand portion on the second layer including positioning third segments of the third strand portion on the second layer with each third segment extending between two different locations along the peripheral edge of the substrate to form a third layer on the second layer, the third segments being convergent with the first segments and the second segments and disposed adjacent and substantially parallel to one another.

Clause 284: The method of Clause 283, wherein positioning the third segments on the second layer includes applying the third segments at a third angle relative to the longitudinal axis of the substrate that is different than the first angle and the second angle.

Clause 285: The method of any of the preceding clauses, wherein attaching the first strand portion to the substrate includes applying first stitching and positioning the second strand portion on the first layer includes applying second stitching.

Clause 286: The method of Clause 285, wherein at least one of applying the first stitching and applying the second stitching includes applying stitching that is formed from the same material as the substrate.

Clause 287: The method of Clause 285, wherein at least one of applying the first stitching and applying the second stitching includes applying stitching that has a higher melting point than the substrate.

Clause 288: The method of Clause 285, wherein applying the first stitching includes zigzagging the first stitching across the first strand portion between first attachment locations.

Clause 289: The method of Clause 285, wherein applying the second stitching includes zigzagging the second stitching across the second strand portion between second attachment locations.

Clause 290: The method of Clause 285, wherein applying the second stitching includes extending the second stitching through the first strand portion.

Clause 291: The method of any of the preceding clauses, further comprising applying at least one of heat and pressure to the first strand portion and the second strand portion to bind the first strand portion to both the substrate and the second strand portion.

Clause 292: The method of Clause 56, wherein applying at least one of heat and pressure includes forming the substrate, the first strand portion, and the second strand portion into a desired shape.

Clause 293: A method of forming a plate for an article of footwear, the method comprising: attaching a first strand portion to a substrate to form a first layer on the substrate, the first strand portion forming a first void in the first layer to expose the substrate within the first void.

Clause 294: The method of Clause 58, further comprising positioning a second strand portion on the first layer to form a second layer.

Clause 295: The method of Clause 294, further comprising forming the first strand portion and the second strand portion of the same, continuous strand.

Clause 296: The method of Clause 294, further comprising forming the first strand portion and the second strand portion from the same material.

Clause 297: The method of Clause 294, further comprising forming the first strand portion and the second strand portion from different materials.

Clause 298: The method of Clause 294, further comprising providing the first strand portion and the second strand portion with different lengths.

Clause 299: The method of Clause 294, further comprising providing the first strand portion and the second strand portion with approximately the same length.

Clause 300: The method of Clause 294, wherein positioning the second strand portion includes forming a second void in the second layer.

Clause 301: The method of Clause 300, further comprising aligning the second void with the first void to expose the substrate at the second layer.

Clause 302: The method of Clause 300, further comprising spacing the second void apart from the first void.

Clause 303: The method of Clause 294, wherein attaching the first strand portion includes applying the first strand portion to the substrate in a first shape and positioning the second strand portion includes applying the second strand portion on the first layer in a second shape.

Clause 304: The method of Clause 303, wherein applying the first strand portion in the first shape and applying the second strand portion in the second shape includes applying the first strand portion and the second strand portion in approximately the same shape.

Clause 305: The method of Clause 303, wherein applying the first strand portion in the first shape and applying the second strand portion in the second shape includes applying the first strand portion and the second strand portion in different shapes.

Clause 306: The method of any of the preceding clauses, wherein attaching the first strand portion to the substrate includes applying stitching.

Clause 307: The method of Clause 306, wherein applying stitching includes applying stitching formed from resin.

Clause 308: The method of Clause 306, wherein applying stitching includes applying stitching formed from the same material as the substrate.

Clause 309: The method of Clause 306, wherein applying stitching includes applying stitching having a higher melting point than the substrate.

Clause 310: The method of Clause 306, wherein applying stitching includes zigzagging the stitching across the first strand portion between first attachment locations located on the substrate.

Clause 311: The method of any of the preceding clauses, further comprising forming the first strand portion from a first tow of fibers.

Clause 312: The method of Clause 311, wherein forming the first strand portion from the first tow of fibers includes forming the first strand portion from at least one of carbon fibers, aramid fibers, boron fibers, glass fibers, and polymer fibers.

Clause 313: The method of any of the preceding clauses, further comprising positioning a second strand portion on the first layer to form a second layer, the second strand portion being formed from a second tow of fibers.

Clause 314: The method of Clause 313, wherein forming the second strand portion from the second tow of fibers includes forming the second strand portion from at least one of carbon fibers, aramid fibers, boron fibers, glass fibers, and polymer fibers.

Clause 315: The method of Clause 313, wherein forming the second strand portion from the second tow of fibers includes providing approximately the same number of fibers as the first tow of fibers.

Clause 316: The method of Clause 313, wherein forming the second strand portion from the second tow of fibers includes providing a different number of fibers than the first tow of fibers.

Clause 317: A method of forming an article of footwear, the method comprising: defining a first region and a second region on a substrate; attaching a first strand portion to the substrate in one of the first region and the second region including forming the first strand into a first pattern that opposes the substrate and provides the one of the first region and the second region with first performance characteristics and attaching a second strand portion to the substrate in the other of the first region and the second region including forming the second strand portion into a second pattern different than the first pattern that opposes the substrate and provides the other of the first region and the second region with second performance characteristics different than the first performance characteristics.

Clause 318: The method of Clause 317, wherein forming the first strand portion includes forming a first edge to define a shape of the one of the first region and the second region.

Clause 319: The method of any of the preceding clauses, wherein forming the second strand portion includes forming a second edge to define a shape of the other of the first region and the second region.

Clause 320: The method of Clause 319, further comprising spacing the first edge apart from the second edge.

Clause 321: The method of Clause 319, further comprising abutting the first edge against the second edge.

Clause 322: The method of and of the preceding clauses, further comprising forming the first strand portion and the second strand portion of the same, continuous strand.

Clause 323: The method of any of the preceding clauses, further comprising forming the first strand portion and the second strand portion from the same material.

Clause 324: The method of any of the preceding clauses, further comprising forming the first strand portion and the second strand portion from different materials.

Clause 325: The method of any of the preceding clauses, further comprising forming the first strand portion from a first tow of fibers.

Clause 326: The method of Clause 325, wherein forming the first strand portion from the first tow of fibers includes forming the first strand portion from at least one of carbon fibers, aramid fibers, boron fibers, glass fibers, and polymer fibers.

Clause 327: The method of any of the preceding clauses, further comprising forming the second strand portion from a second tow of fibers.

Clause 328: The method of Clause 327, wherein forming the second strand portion from the second tow of fibers includes forming the second strand portion from at least one of carbon fibers, aramid fibers, boron fibers, glass fibers, and polymer fibers.

Clause 329: The method of Clause 328, wherein forming the second strand from the second tow of fibers includes providing approximately the same number of fibers as the first tow of fibers.

Clause 330: The method of Clause 328, wherein forming the second strand from the second tow of fibers includes providing a different number of fibers than the first tow of fibers.

Clause 331: The method of any of the preceding clauses, further comprising providing the first strand portion and the second strand portion with different lengths.

Clause 332: The method of any of the preceding clauses, further comprising providing the first strand portion and the second strand portion with approximately the same length.

Clause 333: The method of any of the preceding clauses, wherein at least one of attaching the first strand portion to the substrate and attaching the second strand portion to the substrate includes forming a void in at least one of the first region and the second region.

Clause 334: The method of Clause 333, further comprising exposing the substrate within the void.

Clause 335: The method of any of the preceding clauses, further comprising providing the first strand portion and the second strand portion with different thicknesses.

Clause 336: The method of any of the preceding clauses, further comprising providing the first strand portion and the second strand portion with approximately the same thickness.

Clause 337: The method of any of the preceding clauses, further comprising providing the first region and the second region with different thicknesses.

Clause 338: The method of any of the preceding clauses, further comprising providing the first region and the second region with approximately the same thickness.

Clause 339: The method of any of the preceding clauses, further comprising locating one of the first region and the second region in one of a forefoot portion, a midfoot portion, and a heel portion of the article of footwear and locating the other of the first region and the second region in another of the forefoot portion, the midfoot portion, and the heel portion of the article of footwear.

Clause 340: The method of any of the preceding clauses, further comprising attaching the first strand portion to the substrate via first stitching and attaching the second strand portion to the substrate via second stitching.

Clause 341: The method of Clause 340, wherein attaching the first strand portion to the substrate via first stitching and attaching the second strand portion to the substrate via second stitching includes using stitching formed from resin.

Clause 342: The method of Clause 340, wherein attaching the first strand portion to the substrate via first stitching and attaching the second strand portion to the substrate via second stitching includes using stitching formed from the same material as the substrate.

Clause 343: The method of Clause 340, wherein attaching the first strand portion to the substrate via first stitching and attaching the second strand portion to the substrate via second stitching includes using stitching having a higher melting point than the substrate.

Clause 344: The method of Clause 340, further comprising zigzagging the first stitching across the first strand portion and penetrating the substrate at first attachment locations that are spaced apart from the first strand portion.

Clause 345: The method of Clause 344, further comprising zigzagging the second stitching across the second strand portion and penetrating the substrate at second attachment locations that are spaced apart from the second strand portion.

Clause 346: The method of Clause 340, further comprising zigzagging the second stitching across the second strand portion and penetrating the substrate at second attachment locations that are spaced apart from the second strand portion.

Clause 347: A method of forming an article of footwear, the method comprising: attaching a first strand portion to a flexible substrate to form a first layer on the substrate; positioning the substrate on a first mold surface to change a shape of the substrate; applying at least one of heat and pressure to the first strand portion and the substrate to conform the substrate to the shape of the first mold surface and incorporating the substrate into an article of footwear.

Clause 348: The method of Clause 347, further comprising attaching a second strand portion to the substrate to form a second layer on the substrate;

Clause 349: The method of Clause 348, wherein attaching the second strand portion to the substrate includes attaching the second strand portion adjacent to the first strand portion.

Clause 350: The method of any of the preceding clauses, wherein attaching the second strand portion to the substrate includes overlapping a least a portion of the second strand portion on the first strand portion.

Clause 351: The method of any of the preceding clauses, further comprising forming the first strand portion and the second strand portion of the same, continuous strand.

Clause 352: The method of any of the preceding clauses, further comprising forming the first strand portion and the second strand portion from the same material.

Clause 353: The method of any of the preceding clauses, further comprising forming the first strand portion and the second strand portion from different materials.

Clause 354: The method of any of the preceding clauses, further comprising forming the first strand portion from a first tow of fibers.

Clause 355: The method of Clause 354, wherein forming the first strand portion from the first tow of fibers includes forming the first strand portion from at least one of carbon fibers, aramid fibers, boron fibers, glass fibers, and polymer fibers.

Clause 356: The method of any of the preceding clauses, further comprising forming the second strand portion from a second tow of fibers.

Clause 357: The method of Clause 356, wherein forming the second strand portion from the second tow of fibers includes forming the second strand portion from at least one of carbon fibers, aramid fibers, boron fibers, glass fibers, and polymer fibers.

Clause 358: The method of Clause 357, wherein forming the second strand from the second tow of fibers includes providing approximately the same number of fibers as the first tow of fibers.

Clause 359: The method of Clause 357, wherein forming the second strand from the second tow of fibers includes providing a different number of fibers than the first tow of fibers.

Clause 360: The method of any of the preceding clauses, further comprising providing the first strand portion and the second strand portion with different lengths.

Clause 361: The method of any of the preceding clauses, further comprising providing the first strand portion and the second strand portion with approximately the same length.

Clause 362: The method of any of the preceding clauses, wherein at least one of attaching the first strand portion to the substrate and attaching the second strand portion to the substrate includes forming a void in at least one of the first layer and the second layer.

Clause 363: The method of Clause 362, further comprising exposing the substrate within the void.

Clause 364: The method of any of the preceding clauses, further comprising providing the first strand portion and the second strand portion with different thicknesses.

Clause 365: The method of any of the preceding clauses, further comprising providing the first strand portion and the second strand portion with approximately the same thickness.

Clause 366: The method of any of the preceding clauses, further comprising providing the first layer and the second layer with different thicknesses.

Clause 367: The method of any of the preceding clauses, further comprising providing the first layer and the second layer with approximately the same thickness.

Clause 368: The method of Clause 347, wherein conforming the substrate to the shape of the first mold surface includes providing the substrate with a forefoot portion, a midfoot portion, and a heel portion.

Clause 369: The method of any of the preceding clauses, further comprising attaching the first strand portion to the substrate via first stitching and attaching the second strand portion to the substrate via second stitching.

Clause 370: The method of Clause 369, wherein attaching the first strand portion to the substrate via first stitching and attaching the second strand portion to the substrate via second stitching includes using stitching formed from resin.

Clause 371: The method of any of Clause 369, wherein attaching the first strand portion to the substrate via first stitching and attaching the second strand portion to the substrate via second stitching includes using stitching formed from the same material as the substrate.

Clause 372: The method of any of Clause 369, wherein attaching the first strand portion to the substrate via first stitching and attaching the second strand portion to the substrate via second stitching includes using stitching having a higher melting point than the substrate.

Clause 373: The method of Clause 347, wherein applying at least one of heat and pressure includes activating a resin material incorporated into the first strand portion.

Clause 374: The method of Clause 347, further comprising infusing the first strand portion with a liquid material.

Clause 375: The method of Clause 374, wherein applying at least one of heat and pressure includes subjecting the substrate and the first strand portion to at least one of vacuum molding and compression molding to cure the liquid material.

Clause 376: The method of Clause 375, wherein curing the liquid material includes curing a thermoset material.

Clause 377: The method of Clause 376, wherein curing a thermoset material includes curing at least one of an epoxy, a polyurethane, a polymerizable composition, and a prepolymer.

Clause 378: The method of Clause 374, wherein infusing the first strand portion with a liquid material includes adding a polymer to the liquid material to increase the ductility of the liquid material once cured.

Clause 379: The method of Clause 378, wherein adding a polymer to the liquid material includes adding at least one of rubber and a block copolymer.

Clause 380: The method of Clause 347, further comprising forming the substrate from a thermoplastic film.

Clause 381: The method of Clause 380, further comprising attaching the first strand portion to the thermoplastic film via stitching.

Clause 382: The method of Clause 381, wherein attaching the first strand portion to the thermoplastic film via stitching includes using stitching formed from a thermoplastic material.

Clause 383: The method of Clause 382, wherein applying at least one of heat and pressure to the first strand portion and the substrate includes thermoforming the thermoplastic film and the thermoplastic stitching to join the first strand portion to the substrate.

Clause 384: The method of any of the preceding clauses, wherein applying at least one of heat and pressure includes subjecting the substrate and the first strand portion to at least one of vacuum molding and compression molding.

Clause 385: A method of forming an article of footwear, the method comprising: attaching a first strand portion to a first substrate to form a first layer on the first substrate; attaching a second strand portion to a second substrate to form a second layer on the second substrate; positioning the second substrate on the first substrate to form a substrate stack; positioning the substrate stack on a first mold surface; applying at least one of heat and pressure to the substrate stack to conform the substrate stack to the shape of the first mold surface and incorporating the substrate stack into an article of footwear.

Clause 386: The method of Clause 385, wherein applying at least one of heat and pressure includes activating a resin material incorporated into the first strand portion and the second strand portion.

Clause 387: The method of any of the preceding clauses, further comprising infusing the first strand portion and the second strand portion with a liquid material.

Clause 388: The method of any of the preceding clauses, wherein applying at least one of heat and pressure includes subjecting the substrate stack to at least one of vacuum molding and compression molding to cure the liquid material.

Clause 389: The method of Clause 388, wherein curing the liquid material includes curing a thermoset material.

Clause 390: The method of Clause 389, wherein curing a thermoset material includes curing at least one of an epoxy, a polyurethane, a polymerizable composition, and a prepolymer.

Clause 391: The method of Clause 387, wherein infusing the first strand portion and the second strand portion with a liquid material includes adding a polymer to the liquid material to increase the ductility of the liquid material once cured.

Clause 392: The method of Clause 391, wherein adding a polymer to the liquid material includes adding at least one of rubber and a block copolymer.

Clause 393: The method of any of the preceding clauses, further comprising forming at least one of the first substrate and the second substrate from a thermoplastic film.

Clause 394: The method of Clause 393, further comprising attaching the first strand portion to the first substrate via first stitching and attaching the second strand portion to the second substrate via second stitching.

Clause 395: The method of Clause 394, wherein attaching the first strand portion to the first substrate via first stitching and attaching the second strand portion to the second substrate via second stitching includes using stitching formed from a thermoplastic material.

Clause 396: The method of Clause 395, wherein applying at least one of heat and pressure to the substrate stack includes thermoforming the thermoplastic film of the first substrate and the first stitching to join the first strand portion and the first substrate and thermoforming the thermoplastic film of the second substrate and the second stitching to join the second strand portion and the second substrate.

Clause 397: The method of any of the preceding clauses, further comprising attaching the first strand portion to the first substrate via first stitching and attaching the second strand portion to the second substrate via second stitching.

Clause 398: The method of Clause 397, wherein attaching the first strand portion to the substrate via first stitching and attaching the second strand portion to the substrate via second stitching includes using stitching formed from resin.

Clause 399: The method of any of Clause 397, wherein attaching the first strand portion to the substrate via first stitching and attaching the second strand portion to the substrate via second stitching includes using stitching formed from the same material as the substrate.

Clause 400: The method of any of Clause 397, wherein attaching the first strand portion to the substrate via first stitching and attaching the second strand portion to the substrate via second stitching includes using stitching having a higher melting point than the substrate.

Clause 401: The method of any of the preceding clauses, wherein applying at least one of heat and pressure includes activating a resin material incorporated into at least one of the first strand portion and the second stand portion.

Clause 402: The method of any of the preceding clauses, wherein applying at least one of heat and pressure includes subjecting the substrate stack to at least one of vacuum molding and compression molding.

Clause 403: The method of any of the preceding clauses, further comprising forming the first strand portion and the second strand portion from the same material.

Clause 404: The method of any of the preceding clauses, further comprising forming the first strand portion and the second strand portion from different materials.

Clause 405: The method of any of the preceding clauses, further comprising forming the first strand portion from a first tow of fibers.

Clause 406: The method of Clause 405, wherein forming the first strand portion from the first tow of fibers includes forming the first strand portion from at least one of carbon fibers, aramid fibers, boron fibers, glass fibers, and polymer fibers.

Clause 407: The method of any of the preceding Clauses, further comprising forming the second strand portion from a second tow of fibers.

Clause 408: The method of Clause 407, wherein forming the second strand portion from the second tow of fibers includes forming the second strand portion from at least one of carbon fibers, aramid fibers, boron fibers, glass fibers, and polymer fibers.

Clause 409: The method of Clause 408, wherein forming the second strand from the second tow of fibers includes providing approximately the same number of fibers as the first tow of fibers.

Clause 410: The method of Clause 408, wherein forming the second strand from the second tow of fibers includes providing a different number of fibers than the first tow of fibers.

Clause 411: The method of any of the preceding clauses, further comprising providing the first strand portion and the second strand portion with different lengths.

Clause 412: The method of any of the preceding clauses, further comprising providing the first strand portion and the second strand portion with approximately the same length.

Clause 413: The method of any of the preceding clauses, wherein at least one of attaching the first strand portion to the first substrate and attaching the second strand portion to the second substrate includes forming a void in at least one of the first layer and the second layer.

Clause 414: The method of Clause 413, further comprising exposing the substrate within the void.

Clause 415: The method of any of the preceding clauses, further comprising providing the first strand portion and the second strand portion with different thicknesses.

Clause 416: The method of any of the preceding clauses, further comprising providing the first strand portion and the second strand portion with approximately the same thickness.

Clause 417: The method of any of the preceding clauses, further comprising providing the first layer and the second layer with different thicknesses.

Clause 418: The method of any of the preceding clauses, further comprising providing the first layer and the second layer with approximately the same thickness.

Clause 419: The method of Clause 385, wherein conforming the substrate stack to the shape of the first mold surface includes providing the substrate stack with a forefoot portion, a midfoot portion, and a heel portion.

Clause 420: A method of forming a plate for an article of footwear, the method comprising: providing a substrate having a forefoot region and a heel region; attaching a first strand portion to the substrate having a plurality of segments that extend between a first end disposed in the forefoot region and a second end disposed in the heel region and crossing the plurality of segments in a midfoot region disposed between the forefoot region and the heel region.

Clause 421: The method of Clause 420, wherein attaching the first strand portion to the substrate includes attaching a continuous strand.

Clause 422: The method of Clause 421, wherein attaching the first strand portion to the substrate includes joining respective first ends of the plurality of segments via first looped portions and joining respective second ends of the plurality of segments via second looped portions to provide the first strand portion with a continuous construction.

Clause 423: The method of any of the preceding clauses, further comprising extending the first strand portion onto an upper of the article of footwear.

Clause 424: The method of any of the preceding clauses, further comprising extending tensile strands between the first strand portion and an upper of the article of footwear.

Clause 425: The method of Clause 424, wherein extending tensile strands between the first strand portion and the upper includes connecting the first strand portion and the upper via the tensile strands.

Clause 426: The method of Clause 424, further comprising attaching the tensile strands to the first strand portion along at least one of the plurality of segments between the first end and the second end of the at least one of the plurality of segments.

Clause 427: The method of Clause 426, further comprising extending the tensile strands between a lace operable to move the upper between a tightened state and a relaxed state and the at least one of the plurality of segments.

Clause 428: The method of Clause 427, wherein extending the tensile strands between the lace and the at least one of the plurality of segments includes connecting the tensile strands to the lace and the at least one of the plurality of segments.

Clause 429: The method of Clause 420, further comprising providing the substrate with cleat members that extend from a surface thereof.

Clause 430: The method of Clause 429, further comprising attaching the first strand portion to the surface of the substrate and extending the first strand portion around a portion of the cleat members.

Clause 431: The method of Clause 429, further comprising attaching the first strand portion to the surface of the substrate and surrounding at least one of the cleat members with the first strand portion.

Clause 432: The method of Clause 429, further comprising attaching the first strand portion to the surface of the substrate and surrounding at least one of the cleat members with at least one of the plurality of segments.

Clause 433: The method of any of the preceding clauses, further comprising weaving the plurality of segments together at the midfoot region.

Clause 434: The method of any of the preceding clauses, further comprising forming the first strand portion from a first tow of fibers.

Clause 435: The method of Clause 434, wherein forming the first strand portion from the first tow of fibers includes forming the first strand portion from at least one of carbon fibers, aramid fibers, boron fibers, glass fibers, and polymer fibers.

Clause 436: The method of any of the preceding clauses, wherein attaching the first strand portion to the substrate includes forming at least one void between at least two of the segments.

Clause 437: The method of Clause 436, further comprising exposing the substrate within the at least one void.

Clause 438: The method of Clause 436, further comprising defining the at least one void between a first bundle of the plurality of segments and a second bundle of the plurality of segments.

Clause 439: The method of Clause 438, further comprising exposing the substrate within the at least one void.

Clause 440: A method of forming a plate for an article of footwear, the method comprising applying a first strand portion to a base layer including positioning first segments of the first strand portion on the base layer adjacent to one another to form a first layer on the base layer, removing portions of the first segments to define an outer edge of the plate, and applying at least one of heat and pressure to the first strand portion and to the base layer to conform the first strand portion and the base layer to a predetermined shape.

Clause 441: The method of Clause 440, wherein removing portions of the first segments includes severing the first strand portion at a first end of each first segment and severing the first strand portions at a second end of each first segment located at an opposite end of the respective first strand portions than the first end.

Clause 442: The method of Clause 440, wherein removing portions of the first segments includes removing loops of the first strand portion connecting adjacent first segments.

Clause 443: The method of Clause 440, wherein applying the first strand portion to a base layer includes applying the first strand portion to a second layer having a plurality of fibers and/or to a second layer formed from unidirectional tape.

Clause 444: The method of Clause 440, wherein applying the first strand portion to a base layer includes applying the first strand portion to a substrate.

Clause 445: The method of any of the preceding Clauses, wherein applying the first strand portion to a base layer includes attaching the first strand portion to the base layer via stitching.

Clause 446: The method of any of the preceding Clauses, wherein applying the first strand portion to a base layer includes applying a continuous strand.

Clause 447: The method of Clause 446, wherein applying a continuous strand of the first strand portion includes forming loops of the first strand portion.

Clause 448: The method of Clause 447, wherein removing portions of the first segments includes removing the loops between adjacent first segments of the first strand portion.

Clause 449: The method of any of the preceding Clauses, further comprising forming the first strand portion from a first tow of fibers.

Clause 450: The method of Clause 449, wherein forming the first strand portion from a first tow of fibers includes forming the first strand portion from at least one of carbon fibers, aramid fibers, boron fibers, glass fibers, and polymer fibers.

Clause 451: The method of any of the preceding Clauses, wherein applying the first strand portion to a base layer includes positioning adjacent first segments closer to one another across a width of the plate between a medial side and a lateral side at a midfoot region of the plate than at a forefoot region of the plate.

Clause 452: The method of any of the preceding Clauses, wherein applying the first strand portion to a base layer includes positioning adjacent first segments closer to one another across a width of the plate between a medial side and a lateral side at a midfoot region of the plate than at a heel region of the plate.

Clause 453: Further comprising incorporating the plate into an article of footwear.

Clause 454: A method of forming a plate for an article of footwear, the method comprising applying a first strand portion to a base layer including positioning adjacent first segments of the first strand portion closer to one another across a width of the plate between a medial side and a lateral side at a midfoot region of the plate than at a heel region of the plate to form a first layer on the base layer, and applying at least one of heat and pressure to the first strand portion and to the base layer to conform the first strand portion and the base layer to a predetermined shape.

Clause 455: The method of Clause 454, further comprising removing portions of the first segments to define an outer edge of the plate.

Clause 456: The method of Clause 455, wherein removing portions of the first segments includes severing the first strand portion at a first end of each first segment and severing the first strand portions at a second end of each first segment located at an opposite end of the respective first strand portions than the first end.

Clause 457: The method of Clause 455, wherein removing portions of the first segments includes removing loops of the first strand portion connecting adjacent first segments.

Clause 458: The method of Clause 454, wherein applying the first strand portion to a base layer includes applying the first strand portion to a second layer having a plurality of fibers and/or to a second layer formed from unidirectional tape.

Clause 459: The method of Clause 454, wherein applying the first strand portion to a base layer includes applying the first strand portion to a substrate.

Clause 460: The method of any of the preceding Clauses, wherein applying the first strand portion to a base layer includes attaching the first strand portion to the base layer via stitching.

Clause 461: The method of any of the preceding Clauses, wherein applying the first strand portion to a base layer includes applying a continuous strand.

Clause 462: The method of Clause 461, wherein applying a continuous strand of the first strand portion includes forming loops of the first strand portion.

Clause 463: The method of Clause 462, further comprising removing the loops between adjacent first segments of the first strand portion to define an outer edge of the plate.

Clause 464: The method of any of the preceding Clauses, further comprising forming the first strand portion from a first tow of fibers.

Clause 465: The method of Clause 464, wherein forming the first strand portion from a first tow of fibers includes forming the first strand portion from at least one of carbon fibers, aramid fibers, boron fibers, glass fibers, and polymer fibers.

Clause 466: The method of any of the preceding Clauses, wherein applying the first strand portion to a base layer includes positioning adjacent first segments closer to one another across the width of the plate between the medial side and the lateral side at the midfoot region of the plate than at a forefoot region of the plate.

Clause 467: Further comprising incorporating the plate into an article of footwear.

Clause 468: A method of forming a plate for an article of footwear, the method comprising applying a first strand portion to a base layer including positioning adjacent first segments of the first strand portion closer to one another across a width of the plate between a medial side and a lateral side at a midfoot region of the plate than at a forefoot region of the plate to form a first layer on the base layer, and applying at least one of heat and pressure to the first strand portion and to the base layer to conform the first strand portion and the base layer to a predetermined shape.

Clause 469: The method of Clause 468, further comprising removing portions of the first segments to define an outer edge of the plate.

Clause 470: The method of Clause 469, wherein removing portions of the first segments includes severing the first strand portion at a first end of each first segment and severing the first strand portions at a second end of each first segment located at an opposite end of the respective first strand portions than the first end.

Clause 471: The method of Clause 469, wherein removing portions of the first segments includes removing loops of the first strand portion connecting adjacent first segments.

Clause 472: The method of Clause 468, wherein applying the first strand portion to a base layer includes applying the first strand portion to a second layer having a plurality of fibers and/or to a second layer formed from unidirectional tape.

Clause 473: The method of Clause 468, wherein applying the first strand portion to a base layer includes applying the first strand portion to a substrate.

Clause 474: The method of any of the preceding Clauses, wherein applying the first strand portion to a base layer includes attaching the first strand portion to the base layer via stitching.

Clause 475: The method of any of the preceding Clauses, wherein applying the first strand portion to a base layer includes applying a continuous strand.

Clause 476: The method of Clause 475, wherein applying a continuous strand of the first strand portion includes forming loops of the first strand portion.

Clause 477: The method of Clause 476, further comprising removing the loops between adjacent first segments of the first strand portion to define an outer edge of the plate.

Clause 478: The method of any of the preceding Clauses, further comprising forming the first strand portion from a first tow of fibers.

Clause 479: The method of Clause 478, wherein forming the first strand portion from a first tow of fibers includes forming the first strand portion from at least one of carbon fibers, aramid fibers, boron fibers, glass fibers, and polymer fibers.

Clause 480: The method of any of the preceding Clauses, wherein applying the first strand portion to a base layer includes positioning adjacent first segments closer to one another across the width of the plate between the medial side and the lateral side at the midfoot region of the plate than at a heel region of the plate.

Clause 481: Further comprising incorporating the plate into an article of footwear.

Clause 482: The method of any of Clauses 440-481, further comprising consolidating fibers of the first strand portion with a polymeric resin.

Clause 483: The method of Clause 482, wherein consolidating the fibers with a polymeric resin is performed during the application of heat and/or pressure.

Clause 484: A plate for an article of footwear, the plate comprising a first layer including first high tensile strength fibers, a second layer including second high tensile strength fibers, a third layer including third high tensile strength fibers, and a polymeric resin consolidating the first high tensile strength fibers, the second high tensile strength fibers, and the third high tensile strength fibers, wherein the plate includes a forefoot region, a heel region, and a midfoot region disposed between the forefoot region and the heel region, the forefoot region including a stiffness of about 80 N/mm to about 90 N/mm.

Clause 485: The plate of Clause 484, wherein a stiffness of the heel region is about 20 N/mm to about 30 N/mm.

Clause 486: The plate of Clause 484, wherein a stiffness of the midfoot region is about 75 N/mm to about 120 N/mm.

Clause 487: The plate of Clause 484, wherein a stiffness of the heel region is about 50 N/mm to about 60 N/mm.

Clause 488: The plate of Clause 484, wherein a stiffness of the midfoot region is about 20 N/mm to about 55 N/mm.

Clause 489: The plate of any of the preceding clauses, wherein at least one of the first high tensile strength fibers, the second high tensile strength fibers, and the third high tensile strength fibers include at least one of carbon fibers, aramid fibers, boron fibers, glass fibers, and polymer fibers.

Clause 490: The plate of any of the preceding clauses, wherein the polymeric resin is a thermoset resin or a thermoplastic resin.

Clause 491: The plate of any of the preceding clauses, wherein at least one of the first high tensile strength fibers, the second high tensile strength fibers, and the third high tensile strength fibers are applied in a unidirectional tape.

Clause 492: The plate of any of the preceding clauses, wherein at least one of the first high tensile strength fibers, the second high tensile strength fibers, and the third high tensile strength fibers are applied as a strand of fibers stitched down to a base layer.

Clause 493: The plate of Clause 484, wherein at least two of the first high tensile strength fibers, the second high tensile strength fibers, and the third high tensile strength fibers are applied in a unidirectional tape and the other the first high tensile strength fibers, the second high tensile strength fibers, and the third high tensile strength fibers is applied as a strand of fibers stitched down to a base layer.

Clause 494: The plate of Clause 484, wherein the first high tensile strength fibers, the second high tensile strength fibers, and the third high tensile strength fibers are applied as strands of fibers stitched down to a base layer and each including a different pattern.

Clause 495: The plate of Clause 484, wherein at least one of the first high tensile strength fibers, the second high tensile strength fibers, and the third high tensile strength fibers are applied as a strand of fibers stitched down to a base layer.

Clause 496: The plate of Clause 495, wherein adjacent segments of the strand of fibers are positioned closer to one another across a width of the plate between a medial side and a lateral side at the midfoot region of the plate than at the heel region of the plate to form the first layer.

Clause 497: The plate of Clause 495, wherein adjacent segments of the strand of fibers are positioned closer to one another across a width of the plate between a medial side and a lateral side at the midfoot region of the plate than at the forefoot region of the plate to form the first layer.

Clause 498: A plate for an article of footwear, the plate comprising a first layer including first high tensile strength fibers, a second layer including second high tensile strength fibers, a third layer including third high tensile strength fibers, and a polymeric resin consolidating the first high tensile strength fibers, the second high tensile strength fibers, and the third high tensile strength fibers, wherein the plate includes a forefoot region, a heel region, and a midfoot region disposed between the forefoot region and the heel region, the midfoot region including a stiffness of about 60 N/mm to about 70 N/mm.

Clause 499: The plate of Clause 498, wherein a stiffness of the heel region is about 20 N/mm to about 30 N/mm.

Clause 500: The plate of Clause 498, wherein a stiffness of the forefoot region is about 95 N/mm to about 105 N/mm.

Clause 501: The plate of Clause 498, wherein a stiffness of the heel region is about 50 N/mm to about 60 N/mm.

Clause 502: The plate of Clause 498, wherein a stiffness of the forefoot region is about 75 N/mm to about 120 N/mm.

Clause 503: The plate of any of the preceding clauses, wherein at least one of the first high tensile strength fibers, the second high tensile strength fibers, and the third high tensile strength fibers include at least one of carbon fibers, aramid fibers, boron fibers, glass fibers, and polymer fibers.

Clause 504: The plate of any of the preceding clauses, wherein the polymeric resin is a thermoset resin or a thermoplastic resin.

Clause 505: The plate of any of the preceding clauses, wherein at least one of the first high tensile strength fibers, the second high tensile strength fibers, and the third high tensile strength fibers are applied in a unidirectional tape.

Clause 506: The plate of any of the preceding clauses, wherein at least one of the first high tensile strength fibers, the second high tensile strength fibers, and the third high tensile strength fibers are applied as a strand of fibers stitched down to a base layer.

Clause 507: The plate of Clause 498, wherein at least two of the first high tensile strength fibers, the second high tensile strength fibers, and the third high tensile strength fibers are applied in a unidirectional tape and the other the first high tensile strength fibers, the second high tensile strength fibers, and the third high tensile strength fibers is applied as a strand of fibers stitched down to a base layer.

Clause 508: The plate of Clause 498, wherein the first high tensile strength fibers, the second high tensile strength fibers, and the third high tensile strength fibers are applied as strands of fibers stitched down to a base layer and each including a different pattern.

Clause 509: The plate of Clause 498, wherein at least one of the first high tensile strength fibers, the second high tensile strength fibers, and the third high tensile strength fibers are applied as a strand of fibers stitched down to a base layer.

Clause 510: The plate of Clause 509, wherein adjacent segments of the strand of fibers are positioned closer to one another across a width of the plate between a medial side and a lateral side at the midfoot region of the plate than at the heel region of the plate to form the first layer.

Clause 511: The plate of Clause 509, wherein adjacent segments of the strand of fibers are positioned closer to one another across a width of the plate between a medial side and a lateral side at the midfoot region of the plate than at the forefoot region of the plate to form the first layer.

Clause 512: A plate for an article of footwear, the plate comprising a first layer including first high tensile strength fibers, a second layer including second high tensile strength fibers, a third layer including third high tensile strength fibers and a polymeric resin consolidating the first high tensile strength fibers, the second high tensile strength fibers, and the third high tensile strength fibers, wherein the plate includes a forefoot region, a heel region, and a midfoot region disposed between the forefoot region and the heel region, the heel region including a stiffness of about 35 N/mm to about 45 N/mm.

Clause 513: The plate of Clause 512, wherein a stiffness of the midfoot region is about 20 N/mm to about 55 N/mm.

Clause 514: The plate of Clause 512, wherein a stiffness of the forefoot region is about 95 N/mm to about 105 N/mm.

Clause 515: The plate of Clause 512, wherein a stiffness of the midfoot region is about 75 N/mm to about 120 N/mm.

Clause 516: The plate of Clause 512, wherein a stiffness of the forefoot region is about 75 N/mm to about 120 N/mm.

Clause 517: The plate of any of the preceding clauses, wherein at least one of the first high tensile strength fibers, the second high tensile strength fibers, and the third high tensile strength fibers include at least one of carbon fibers, aramid fibers, boron fibers, glass fibers, and polymer fibers.

Clause 518: The plate of any of the preceding clauses, wherein the polymeric resin is a thermoset resin or a thermoplastic resin.

Clause 519: The plate of any of the preceding clauses, wherein at least one of the first high tensile strength fibers, the second high tensile strength fibers, and the third high tensile strength fibers are applied in a unidirectional tape.

Clause 520: The plate of any of the preceding clauses, wherein at least one of the first high tensile strength fibers, the second high tensile strength fibers, and the third high tensile strength fibers are applied as a strand of fibers stitched down to a base layer.

Clause 521: The plate of Clause 512, wherein at least two of the first high tensile strength fibers, the second high tensile strength fibers, and the third high tensile strength fibers are applied in a unidirectional tape and the other first high tensile strength fibers, the second high tensile strength fibers, and the third high tensile strength fibers is applied as a strand of fibers stitched down to a base layer.

Clause 522: The plate of Clause 512, wherein the first high tensile strength fibers, the second high tensile strength fibers, and the third high tensile strength fibers are applied as strands of fibers stitched down to a base layer and each including a different pattern.

Clause 523: The plate of Clause 512, wherein at least one of the first high tensile strength fibers, the second high tensile strength fibers, and the third high tensile strength fibers are applied as a strand of fibers stitched down to a base layer.

Clause 524: The plate of Clause 523, wherein adjacent segments of the strand of fibers are positioned closer to one another across a width of the plate between a medial side and a lateral side at the midfoot region of the plate than at the heel region of the plate to form the first layer.

Clause 525: The plate of Clause 523, wherein adjacent segments of the strand of fibers are positioned closer to one another across a width of the plate between a medial side and a lateral side at the midfoot region of the plate than at the forefoot region of the plate to form the first layer.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method of forming an article of footwear, the method comprising:
    attaching a first strand portion to a flexible substrate via first stitching that crosses over the first strand portion and penetrates the substrate at first attachment locations that are spaced apart from the first strand portion to form a first layer on the substrate;

positioning a second strand portion on the first layer to form a second layer on the first layer in a plurality of discrete regions on the substrate;

attaching the second strand portion to the flexible substrate via second stitching that crosses over the second strand portion, extends through the first strand portion, and penetrates the substrate at second attachment locations disposed in the discrete regions of the substrate;

positioning the substrate on a first mold surface to change a shape of the substrate;

applying at least one of heat and pressure to the first strand portion, the second strand portion, and the substrate to conform the substrate to the shape of the first mold surface and to form traction elements from the second strand portion at each of the discrete regions, whereby applying heat and pressure includes subjecting the first strand portion, the second strand portion, and the substrate to at least one of vacuum molding and compression molding and further includes at least one of (i) activating a polymeric resin incorporated into the first strand portion and the second strand portion, and (ii) infusing the first strand portion, the second strand portion, and the substrate with a liquid, thermoset material; and incorporating the substrate into an article of footwear.

2. The method of claim 1, wherein positioning the substrate on the first mold surface includes aligning cavities formed into the first mold surface with the discrete regions of the substrate.

3. The method of claim 1, further comprising forming the second strand portion from a plurality of different strands of fibers each corresponding to one of the discrete regions.

4. The method of claim 1, further comprising forming at least one of the first strand portion and the second strand portion of the same, continuous strand.

5. The method of claim 1, further comprising forming the first strand portion from a first tow of fibers including at least one of carbon fibers, boron fibers, glass fibers, and polymeric fibers.

6. The method of claim 1, further comprising forming the second strand portion from a second tow of fibers including at least one of carbon fibers, boron fibers, glass fibers, and polymeric fibers.

7. The method of claim 1, further comprising:

providing the first strand portion with looped portions disposed proximate to a peripheral edge of the substrate, the looped portions connecting adjacent first segments; and removing at least one of the looped portions that extends outside the peripheral edge of the substrate.

8. The method of claim 1, further comprising providing the first layer and the second layer with segments having different densities.

9. The method of claim 1, wherein attaching the first strand portion includes applying first segments of the first strand portion to the substrate in a first shape and positioning the second strand portion includes applying second segments of the second strand portion to the first layer in a second shape different than the first shape.

10. The method of claim 1, further comprising forming the substrate from a thermoplastic film.

11. The method of claim 1, wherein incorporating the substrate into the article of footwear includes attaching the substrate to an upper of the article of footwear.

12. The method of claim 1, further comprising positioning a third strand portion on the substrate between the plurality of traction elements.

13. The method of claim 12, wherein positioning a third strand portion on the substrate between the traction elements includes wrapping the third strand portion around the traction elements.

14. The method of claim 1, further comprising positioning a traction element tips into corresponding cavities formed into the first mold surface and wherein applying at least one of heat and pressure to the first strand portion, the second strand portion, and the substrate comprises applying at least one of heat and pressure to the first strand portion, the second strand portion, the substrate, and the traction element tips.

15. The method of claim 14, further comprising attaching the traction element tips to respective ones of the traction elements.

* * * * *